United States Patent
Zou et al.

(10) Patent No.: US 8,270,693 B2
(45) Date of Patent: *Sep. 18, 2012

(54) ANATOMICAL VISUALIZATION AND MEASUREMENT SYSTEM

(75) Inventors: Hui Zou, New York, NY (US); David Chen, Wrentham, MA (US)

(73) Assignee: M2S, West Lebanon, NH (US)

( * ) Notice: Subject to any disclaimer, the term of this patent is extended or adjusted under 35 U.S.C. 154(b) by 649 days.

This patent is subject to a terminal disclaimer.

(21) Appl. No.: 12/368,078

(22) Filed: Feb. 9, 2009

(65) Prior Publication Data

US 2010/0016658 A1    Jan. 21, 2010

Related U.S. Application Data

(63) Continuation-in-part of application No. 11/732,291, filed on Apr. 3, 2007.

(60) Provisional application No. 61/063,992, filed on Feb. 7, 2008.

(51) Int. Cl.
*G06K 9/00* (2006.01)

(52) U.S. Cl. ........................................ 382/128; 600/101

(58) Field of Classification Search .................. 382/128, 382/130, 131, 133, 171, 173; 600/407, 410, 600/416, 101; 623/1.11, 1.13, 23.72
See application file for complete search history.

(56) References Cited

U.S. PATENT DOCUMENTS

| 7,043,290 B2 * | 5/2006 | Young et al. | 600/416 |
| 2008/0132774 A1 * | 6/2008 | Milstein et al. | 382/128 |

* cited by examiner

*Primary Examiner* — Duy M Dang
(74) *Attorney, Agent, or Firm* — PatentGC LLC

(57) ABSTRACT

A method for deploying a device in a tortuous vessel, comprising:
creating a virtual representation of the tortuous vessel;
placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;
measuring length along the perimeter of the virtual generalized-cylinder at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline;
determining the maximum measured length;
selecting a device based upon the maximum measured length; and
deploying the device in the tortuous vessel.

13 Claims, 73 Drawing Sheets

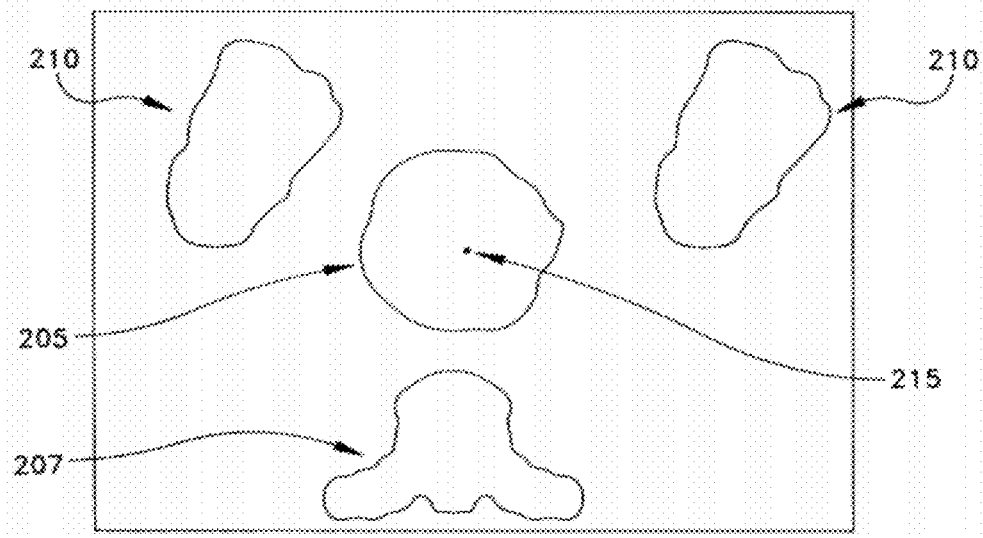
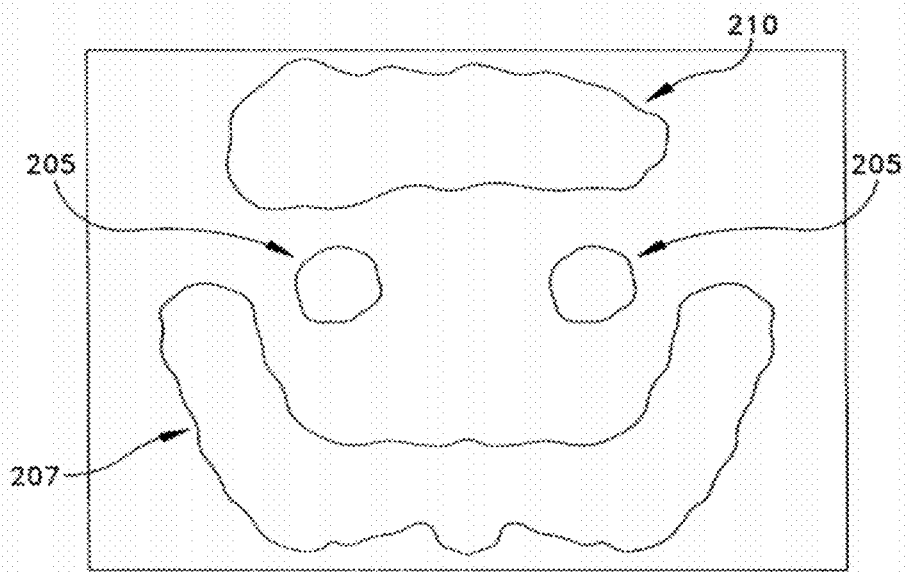

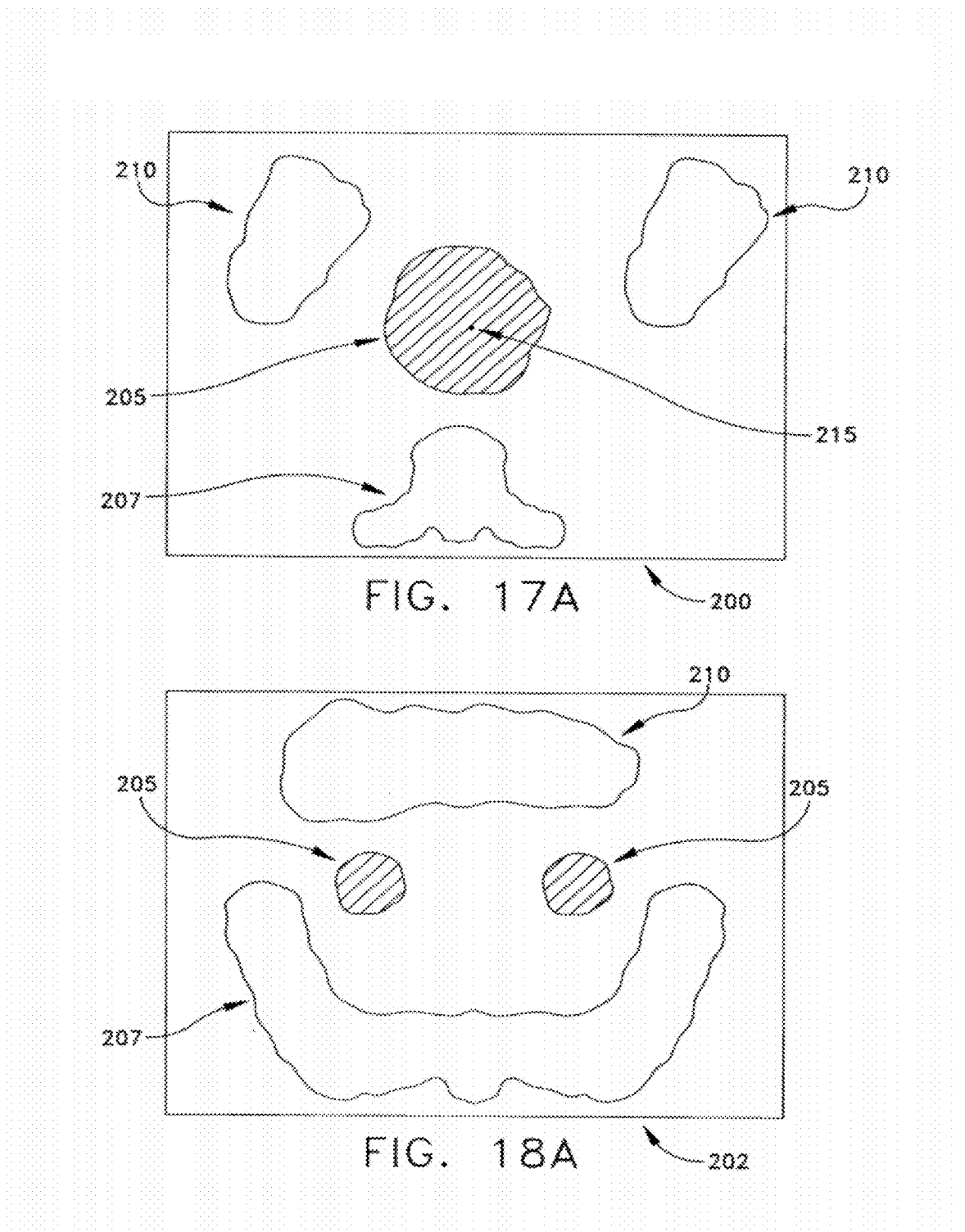

CUMULATIVE SUM TABLE (LENGTHS)

| INDEX | SUM OF LENGTHS |
|---|---|
| $c_0$ | 0 |
| $c_1$ | 1.5 |
| $c_2$ | 2 |
| $c_3$ | 4 |
| ⋮ | ⋮ |

CUMULATIVE SUM TABLE (VOLUME)

| INDEX | SUM OF VOLUMES |
|---|---|
| $c_0$ | 1.5 |
| $c_1$ | 4 |
| $c_2$ | 5.2 |
| $c_3$ | 6 |
| ⋮ | ⋮ |

Preview 2.0-style Virtual Graft

MSVG after docking of contralateral limb

MSVG before docking of contralateral limb

Yellow Zone represents 'oversizing'

☐ Add Parts to Graft Order ☒

GORE EXCLUDER Device (US) Product Listing

Trunk-Ipslateral Binar Component
23x12x16    PCT231216 [0]
23x12x18    PCT231218 [0]
23x14.5x16  PCT231416 [0]
23x14.5x18  PCT231418 [0]
26x12x16    PCT261216 [0]
26x12x18    PCT261218 [0]
26x14.5x16  PCT261416 [0]
26x14.5x18  PCT261418 [0]
28.5x12x16  PCT281216 [0]
28.5x12x18  PCT281218 [0]
28.5x14.5x16 PCT281416 [0]
28.5x14.5x18 PCT281418 [0]

Contralateral Leg Component
12x10.0   PCC121080 [0]
12x12.0   PCC121280 [0]
12x14.0   PCC121480 [0]
14.5x10.0 PCC141080 [0]
14.5x12.0 PCC141280 [0]
14.5x14.0 PCC141480 [0]
16x9.5    PCC161080 [0]
16x11.5   PCC161280 [0]
16x13.5   PCC161480 [0]
18x9.5    PCC181080 [0]
18x11.5   PCC181280 [0]
18x13.5   PCC181480 [0]
20x9.5    PCC201080 [0]
20x11.5   PCC201280 [0]
20z13.5   PCC201480 [0]

Iliac Extender Component
10x7.0 PCL 161807  [0]
12x7.0 PCL 161207  [0]
14.5x7.0 PCL 161407 [0]

Aortic Extender Component
23x3.3 PCA238380   [0]
16x3.3 PCA268380   [0]
28.5x3.3 PCA288380 [0]

Introducer Sheaths
12x30.0 PG123080 [0]
18x30.0 PG183080 [0]

[ Cancel ]  [ Continue>> ]

Preview 2.1 Product Listing

FIG. 39

Preview 2.1 Order Form PDF

FIG. 40 resultant Virtual Graft™

'Twist Lines'

The difference between Preview 2.2 (L) and 2.3 (R) Twisteroo. Both grafts are rotated 0 degrees, in an anatomy with a 53 degree Native Iliac Rotation.

Blood flow (red), calcified plaque (yellow), and thrombus (white).

Volume region defined by two oblique MPR planes.

The surface model of target volume

The surface models for the start and end plane are 65 and 360, respectively.

The original surface models of TAA data before the oblique volume removal.

The volume oblique removal with incorrect result by using a single flood.

The difficult case if the start and end planes are 115 and 360, respectively.

Detail of transition region from ascending to descending arch of TAA.

AP view of surface model with cut plane after volume oblique removal.

The graphical user interface (GUI) for volume oblique measurement.

```
NUM_SIDES = N;
LENGTH_SO_FAR[NUM_SIDES]

for(I from START to END)

LAST_POINT[NUM_SIDES]

for(J from 0 to NUM_SIDES)

//calculate angle
                ANGLE = J * 360 / SIDES

//Create a new point object that we'll push out as a spoke
                CL_ORIENT = CENTERLINE[I]

//Cross the orientation vector with 0,1,0
                //to get a perpendicular spoke
                SPOKE = CL_ORIENT x YVEC //rotate our perpendicular spoke around the orient
                SPOKE = SPOKE rotate ANGLE //push the point from the center out to the edge along the
                POINT = SPOKE extendto RADIUS //calculateLength to last point from this side
                LENGTH_SO_FAR += POINT - LAST_POINT[J]

//store this point as last point on its side
                LAST_POINT[J] = POINT
    MAX = 0
    MIN = 9999
    for(J from 0 to NUM_SIDES)
        MAX = (LENGTH_SO_FAR[J] > MAX) ? LENGTH_SO_FAR[J]  : MAX
        MIN = (LENGTH_SO_FAR[J] < MIN) ? LENGTH_SO_FAR[J]  : MIN
```

Pseudo Code of algorithm to calculate length
along the longitude of a cylinder.

FIG. 79

```
Function calcCurvesLength()
    num_of_spoke_ponint <- slice2 - slice1 + 1
    num_of_longitidue <- N
    curveLengthes[num_of_longitidue]

for each longitude i
        pathLength <- 0.0;
        for each spoke ponit j
            //get two ajacent point along the longitude
            current_point <- i + j * num_of_longitidue
            if (current_point equal i)
                previous_point <- current_point
            else
                previous_point <- i + (j-1)* num_of_longitidue distance <- calculate distance between two pints
            pathLength <- pathLength + distance
            curveLengthes[i] <- pathLength //getting the longest path
            if pathLength > MAX_PATH
                MAX_PATH <- pathLength;
                OUTER_CURVE <- i
            //getting the shortest path
            if pathLength < MIN_PATH
                MIN_PATH = pathLength
                INNER_CURVE <- i
```

FIG. 80

ANATOMICAL VISUALIZATION AND MEASUREMENT SYSTEM

REFERENCE TO PENDING PRIOR PATENT APPLICATIONS

This patent application:
(i) is a continuation-in-part of pending prior U.S. patent application Ser. No. 11/732,291, filed Apr. 3, 2007 by David Chen et al. for ANATOMICAL VISUALIZATION AND MEASUREMENT SYSTEM; and
(ii) claims benefit of U.S. Provisional Patent Application Ser. No. 61/063,992, filed Feb. 7, 2008 by Hui Zou et al. for PREVIEW 2.9 INNER AND OUTER CURVE CALCULATION.

The two above-identified patent applications are hereby incorporated herein by reference.

FIELD OF THE INVENTION

This invention relates to medical apparatus in general, and more particularly to anatomical visualization and measurement systems.

BACKGROUND OF THE INVENTION

Many medical procedures must be carried out at an interior anatomical site which is normally hidden from the view of the physician. In these situations, the physician typically uses some sort of scanning device to examine the patient's anatomy at the interior site prior to, and in preparation for, conducting the actual medical procedure. Such scanning devices typically include CT scanners, MRI devices, X-ray machines, ultrasound devices and the like, and essentially serve to provide the physician with some sort of visualization of the patient's interior anatomical structure prior to commencing the actual medical procedure. The physician can then use this information to plan the medical procedure in advance, taking into account patient-specific anatomical structure.

In addition to the foregoing, the physician can also use the information obtained from such preliminary scanning to more precisely identify the location of selected structures (e.g., tumors and the like) which may themselves be located within the interior of internal organs or other internal body structures. As a result, the physician can then more easily "zero in" on such selected structures during the subsequent medical procedure.

Furthermore, in many cases, the anatomical structures of interest to the physician may be quite small and/or difficult to identify with the naked eye. In these situations, preliminary scanning of the patient's interior anatomical structure using high resolution scanning devices can help the physician locate various structures of interest during the subsequent medical procedure.

In addition to the foregoing, scanning devices of the sort described above are frequently also used in purely diagnostic procedures. For example, scanning devices of the sort described above might be used to look for stenosis in a blood vessel, or the buildup of plaque in a blood vessel, or a thinning of the aorta wall, etc.

In general, scanning devices of the sort described above tend to generate two-dimensional (i.e., "2D") images of the patient's anatomical structure. In many cases, the scanning devices are adapted to provide a set of 2D images, with each 2D image in the set being related to every other 2D image in the set according to some pre-determined relationship. For example, CT scanners typically generate a series of 2D images, with each 2D image corresponding to a specific plane or "slice" taken through the patient's anatomical structure. Furthermore, with many scanning devices, the angle and spacing between adjacent image planes or slices is very well defined, e.g., each image plane or slice may be set parallel to every other image plane or slice, and adjacent image planes or slices may be spaced a pre-determined distance apart. By way of example, the parallel image planes might be set 1 mm apart.

In a system of the sort just described, the physician can view each 2D image individually and, by viewing a series of 2D images in proper sequence, can mentally generate a three-dimensional (i.e., "3D") impression of the patient's interior anatomical structure.

Some scanning devices include, as part of their basic system, associated computer hardware and software for building a 3D database of the patient's scanned anatomical structure using a plurality of the aforementioned 2D images. For example, some CT and MRI scanners include such associated computer hardware and software as part of their basic system. Alternatively, such associated computer hardware and software may be provided independently of the scanning devices, as a sort of "add-on" to the system; in this case, the data from the scanned 2D images is fed from the scanning device to the associated computer hardware and software in a separate step. In either case, a trained operator using such apparatus can create a set of scanned 2D images, assemble the data from these scanned 2D images into a 3D database of the scanned anatomical structure, and then generate various additional images of the scanned anatomical structure using the 3D database. This feature has been found to be a very powerful tool, since it essentially permits a physician to view the patient's scanned anatomical structure from a wide variety of different viewing positions. As a result, the physician's understanding of the patient's scanned anatomical structure is generally greatly enhanced.

In addition, scanning systems of the sort described above often include hardware and/or software tools to allow measurements to be made of the patient's scanned anatomical structure. By way of example, many of these systems let a physician overlay lines on an image of the patient's anatomical structure, and then calculate the length of these lines so as to indicate the size of the structure being viewed.

While the 2D slice images generated by the aforementioned scanning devices, and/or the 3D database images generated by the aforementioned associated computer hardware and software, are generally of great benefit to physicians, certain significant limitations still exist.

For one thing, with current systems, each scanned 2D slice image is displayed as a separate and distinct image, and each image generated from the 3D database is displayed as a separate and distinct image. Unfortunately, physicians can sometimes have difficulty correlating what they see on one image with what they see on another image. By way of example but not limitation, physicians can sometimes have difficulty correlating what they see on a particular scanned 2D slice image with what they see on a particular image generated from the 3D database.

For another thing, in many situations a physician may be viewing images of a patient's scanned anatomical structure in preparation for conducting a subsequent medical procedure in which a prosthetic device must be fitted in the patient. In these situations it can be relatively difficult and/or time-consuming for the physician to accurately measure and record all of the anatomical dimensions needed for proper sizing of the prosthetic device to the patient. By way of example, in certain situations a patient may develop an abdominal aortic aneurysm ("AAA") in the vicinity of the aorta's iliac branching, and repair or replacement of the affected vascular structure with a prosthetic device may be indicated. In this case it is extremely important for the physician to determine, prior to commencing the procedure, accurate length and cross-sectional dimensions for each affected portion of blood vessel so as to ensure proper sizing of the appropriate prosthetic device to the patient. Unfortunately, it can be difficult and/or impossible to make accurate anatomical measurements with existing visualization systems. This has proven to be particularly true when dealing with anatomical structures which extend along a tortuous path and/or which have a complex and varied branching structure, e.g., blood vessels.

Furthermore, in many cases it may be desirable to provide a physician with a particular oblique view of a specified portion of a patient's anatomical structure. For example, it may be desirable to provide a physician with a view taken perpendicular to the length of a blood vessel, with that view being taken at a very specific location along that blood vessel. Such a view might be desired for comprehensional and/or measurement purposes. Unfortunately, it can be difficult and/or impossible to accurately generate such a view using existing visualization systems.

In addition to the foregoing, in many situations a physician may be interested in accurately calculating a volume associated with a specific part of a patient's anatomy. By way of example but not limitation, a physician might wish to track the volume of a thrombus in an aorta over time, or the size of a tumor during chemotherapy, etc. Unfortunately, it can be difficult and/or impossible to accurately make such a calculation using existing visualization systems.

Also, in many situations a physician may be interested in modeling how a particular endoluminal prosthesis will deploy in the patient's anatomy. Unfortunately, current visualization systems do not provide simple and effective features for providing such modeling.

OBJECTS OF THE INVENTION

Accordingly, one object of the present invention is to provide an improved anatomical visualization and measurement system for visualizing and measuring anatomical structures.

Another object of the present invention is to provide an improved anatomical visualization and measurement system wherein a scanned 2D slice image can be appropriately combined with an image generated from a 3D database so as to create a single composite image.

Another object of the present invention is to provide an improved anatomical visualization and measurement system wherein a marker can be placed onto a 2D slice image displayed on a screen, and this marker will be automatically incorporated, as appropriate, into a 3D computer model maintained by the system, as well as into any other 2D slice image data maintained by the system.

Still another object of the present invention is to provide an improved anatomical visualization and measurement system wherein a margin of pre-determined size can be associated with a marker of the sort described above, and further wherein the margin will be automatically incorporated into the 3D computer model, and into any other 2D slice image data, in association with that marker.

Yet another object of the present invention is to provide an improved anatomical visualization and measurement system wherein the periphery of objects contained in a 3D computer model maintained by the system can be automatically identified in any 2D slice image data maintained by the system, and further wherein the periphery of such objects can be highlighted as appropriate in 2D slice images displayed by the system.

Another object of the present invention is to provide an improved anatomical visualization and measurement system wherein patient-specific anatomical dimensions such as length and/or cross-sectional dimensions can be quickly, easily and accurately determined.

Still another object of the present invention is to provide an improved anatomical visualization and measurement system which is particularly well adapted to determine patient-specific anatomical dimensions for structures which have a tortuous and/or branching configuration, e.g., blood vessels.

And another object of the present invention is to provide an improved anatomical visualization and measurement system wherein an appropriate set of scanned 2D images can be assembled into a 3D database, information regarding patient-specific anatomical structures can be segmented from the information contained in this 3D database, and this segmented information can then be used to determine anatomical features such as a centerline for the anatomical structure which has been segmented.

Still another object of the present invention is to provide an improved anatomical visualization and measurement system which is able to easily and accurately present a physician with a particular oblique view of a specified portion of a patient's anatomical structure, e.g., a view taken perpendicular to the length of a blood vessel, with that view being taken at a very specific location along that blood vessel.

Another object of the present invention is to provide an improved anatomical visualization and measurement system wherein patient-specific anatomical volumes can be quickly, easily and accurately determined.

And another object of the present invention is to provide an improved anatomical visualization and measurement system wherein an appropriate set of scanned 2D images can be assembled into a 3D database, information regarding patient-specific anatomical structures can be segmented from the information contained in this 3D database, and this segmented information can then be used to calculate desired patient-specific anatomical volumes.

Another object of the present invention is to provide an improved method for visualizing and measuring anatomical structures.

And another object of the present invention is to provide an improved method wherein patient-specific anatomical dimensions such as length and/or cross-sectional dimensions can be quickly, easily and accurately determined.

Still another object of the present invention is to provide an improved method wherein an appropriate set of scanned 2D images can be assembled into a 3D database, information regarding patient-specific anatomical structures can be segmented from the information contained in this 3D database, and this segmented information can then be used to determine anatomical features such as a centerline for the anatomical structure which has been segmented.

And another object of the present invention is to provide a method for easily and accurately presenting a physician with a particular oblique view of a specified portion of a patient's anatomical structure, e.g., a view taken perpendicular to the length of a blood vessel, with that view being taken at a very specific location along that blood vessel.

Yet another object of the present invention is to provide an improved method for quickly, easily and accurately determining patient-specific anatomical volumes.

And another object of the present invention is to provide an improved system for modeling how a particular endoluminal prosthesis will deploy in the patient's anatomy.

SUMMARY OF THE INVENTION

These and other objects are addressed by the present invention, which comprises an anatomical visualization and measurement system comprising a first database which comprises a plurality of 2D slice images generated by scanning an anatomical structure. These 2D slice images are stored in a first data format. A second database is also provided which comprises a 3D computer model of the scanned anatomical structure. This 3D computer model comprises a first software object which is representative of the scanned anatomical structure and which is defined by a 3D geometry database.

In one embodiment of the present invention, means are provided for selecting a particular 2D slice image from the first database. Means are also provided for inserting a second software object into the 3D computer model so as to augment the 3D computer model. The second software object is also defined by a 3D geometry database, and includes a planar surface. In this embodiment of the invention, the second software object is inserted into the 3D computer model at the position which corresponds to the position of the selected 2D slice image relative to the scanned anatomical structure. Means for texture mapping the specific 2D slice image onto the planar surface of the second software object are also provided. Means are also provided for displaying an image of the augmented 3D computer model so as to simultaneously provide a view of both the first software object and the specific 2D slice image which has been texture mapped onto the planar surface of the second software object.

In another embodiment of the invention, the system comprises a first database which comprises a plurality of 2D slice images generated by scanning an anatomical structure. These 2D slice images are stored in a first data format. A second database is also provided which comprises a 3D computer model of the scanned anatomical structure. This 3D computer model comprises a first software object which is representative of the scanned anatomical structure and which is defined by a 3D geometry database. In this second embodiment of the invention, means are also provided for inserting a second software object into the 3D computer model so as to augment the 3D computer model. The second software object is also defined by a 3D geometry database, and includes a planar surface. Furthermore, means are also provided for determining the specific 2D slice image which corresponds to the position of the planar surface of the second software object which has been inserted into the augmented 3D computer model. In this embodiment of the invention, means are also provided for texture mapping the specific 2D slice image corresponding to the position of that planar surface onto the planar surface of the second software object. In this embodiment of the invention, display means are also provided for displaying an image of the augmented 3D computer model to a physician so as to simultaneously provide a view of the first software object and the specific 2D slice image which has been texture mapped onto the planar surface of the second software object.

In each of the foregoing embodiments of the present invention, the 3D geometry database may comprise a surface model.

Likewise, the system may further comprise means for inserting a marker into the first database, whereby the marker will be automatically incorporated into the second database, and further wherein the marker will be automatically displayed where appropriate in any image displayed by the system.

Also, the system may further comprise a margin of predetermined size associated with the aforementioned marker.

Additionally, the system may further comprise means for automatically identifying the periphery of any objects contained in the second database and for identifying the corresponding data points in the first database, whereby the periphery of such objects can be highlighted as appropriate in any image displayed by the system.

Often, the scanned structure will comprise an interior anatomical structure.

In yet another form of the present invention, the visualization and measurement system may incorporate means for determining patient-specific anatomical dimensions, such as length and/or cross-sectional dimensions, using appropriate scanned 2D image data. More particularly, the visualization and measurement system may include means for assembling an appropriate set of scanned 2D images into a 3D database, means for segmenting information regarding patient-specific anatomical structures from the information contained in the 3D database, means for determining from this segmented information anatomical features such as a centerline for the anatomical structure which has been segmented, means for specifying a measurement to be made based on the determined anatomical feature, and means for calculating the measurements so specified.

In a more particular form of the present invention, the visualization and measurement system is particularly well adapted to determine patient-specific anatomical dimensions for structures which have a tortuous and/or branching configuration, e.g., blood vessels. In this form of the invention, the visualization and measurement system is adapted to facilitate (1) assembling an appropriate set of scanned 2D images into a 3D database; (2) segmenting the volumetric data contained in the 3D database into a set of 3D locations corresponding to the specific anatomical structure to be measured; (3) specifying, for each branching structure contained within the specific anatomical structure of interest, a branch line in the volumetric data set that uniquely indicates that branch structure, with the branch line being specified by selecting appropriate start and end locations on two of the set of scanned 2D images; (4) calculating, for each branching structure contained within the specific anatomical structure of interest, a centroid path in the volumetric data set for that branching structure, with the centroid path being determined by calculating, for each scanned 2D image corresponding to the branch line, the centroid for the branch structure contained in that particular scanned 2D image; (5) applying a curve-fitting algorithm to the centroid paths determined above so as to supply data for any portions of the anatomical structure which may lie between the aforementioned branch lines, and for "smoothing out" any noise that may occur in the system; and (6) applying known techniques to the resulting space curves so as to determine the desired anatomical dimensions.

In still another form of the present invention, the visualization and measurement system may incorporate means for easily and accurately presenting a physician with a particular oblique view of a specified portion of a patient's anatomical structure, e.g., a view taken perpendicular to a blood vessel, at a very specific location along that blood vessel.

In another form of the present invention, the visualization and measurement system may incorporate means for more accurately measuring the dimensions of an anatomical structure by utilizing one or more oblique views taken along the length of that anatomical structure.

In yet another form of the present invention, the visualization and measurement system may incorporate means for determining patient-specific anatomical volumes using appropriate scanned 2D image data. More particularly, the visualization and measurement system may include means for assembling an appropriate set of scanned 2D images into a 3D database, means for segmenting information regarding patient-specific anatomical structures from the information contained in the 3D database, means for determining from this segmented information anatomical volumes from the anatomical structure which has been segmented, means for specifying a structure of interest, and means for calculating the volume of the specified structure.

The present invention also comprises an improved method for visualizing and measuring anatomical structures.

The present invention also comprises a method for calculating patient-specific anatomical dimensions using appropriate scanned 2D image data. In one form of the present invention, the method comprises the steps of (1) assembling an appropriate set of scanned 2D images into a 3D database; (2) segmenting information regarding patient-specific anatomical structures from the information contained in the 3D database, (3) determining for this segmented information anatomical features such as a centerline for the anatomical structure which has been segmented; (4) specifying a measurement to be made based on the determined anatomical feature; and (5) calculating the measurement so specified.

The present invention also comprises a method for easily and accurately presenting a physician with a particular oblique view of a specified portion of a patient's anatomical structure, e.g., a view taken perpendicular to a blood vessel, at a very specific location along that blood vessel.

The present invention also comprises a method for calculating patient-specific anatomical volumes using appropriate scanned 2D image data. In one form of the present invention, the method comprises the steps of (1) assembling an appropriate set of scanned 2D images into a 3D database; (2) segmenting information regarding patient-specific anatomical structures from the information contained in the 3D database, (3) determining from this segmented information volumes for the anatomical structure which has been segmented, (4) specifying a structure of interest, and (5) calculating the volume of the specified structure.

In another form of the invention, there is provided a computer-based visualization system for visualizing anatomical structure and a graft implant which is to be deployed adjacent the anatomical structure, comprising:

a 3D computer model of the anatomical structure which is to be visualized, said 3D computer model comprising at least one first software object, wherein said at least one first software object corresponds to the anatomical structure which is to be visualized;

a database of second software objects, wherein at least one of said second software objects corresponds to a graft implant which is to be deployed adjacent the anatomical structure;

selection apparatus for permitting a user to select said at least one of said second software objects;

registration apparatus for positioning said selected at least one of said second software objects into said 3D computer model so as to create an augmented 3D computer model, with said selected at least one of said second software objects being positioned in said augmented 3D computer model in proper registration with said at least one first software object contained in said augmented 3D model; and processing apparatus for generating an image of said augmented 3D computer model so as to simultaneously provide a view of said at least one first software object and said selected at least one second software object.

In another form of the invention, there is provided a method for visualizing anatomical structure and a graft implant which is to be deployed adjacent the anatomical structure, comprising:

providing a 3D computer model of the anatomical structure which is to be visualized, said 3D computer model comprising at least one first software object, wherein said at least one first software object corresponds to the anatomical structure which is to be visualized;

providing a database of second software objects, wherein at least one of said second software objects corresponds to a graft implant which is to be deployed adjacent the anatomical structure;

selecting said at least one of said second software objects;

positioning said selected at least one of said second software objects into said 3D computer model so as to create an augmented 3D computer model, with said selected at least one of said second software objects being positioned in said augmented 3D computer model in proper registration with said at least one first software object contained in said augmented 3D model; and generating an image of said augmented 3D computer model so as to simultaneously provide a view of said at least one first software object and said selected at least one second software object.

In another form of the invention, there is provided a visualization system comprising:

a first database comprising a plurality of 2-D slice images generated by scanning an anatomical structure, said 2-D slice images being stored in a first data format;

a second database comprising a 3D computer model of said scanned anatomical structure, said 3D computer model comprising at least one first software object, said at least one first software object being defined by a 3-D geometry database;

insertion apparatus for selectively inserting a second software object into said 3D computer model so as to augment said 3D computer model, said second software object being defined by a 3D geometry database and including a planar surface;

determining apparatus for determining the specific 2D slice image associated with the position of said planar surface of said second software object when said second software object is inserted within said augmented 3D computer model;

texture mapping apparatus for texture mapping said specific 2-D slice image onto said planar surface of said second software object when said second software object is inserted within said augmented 3D computer model;

a third database of third software objects, wherein at least one of said third software objects corresponds to a graft implant which is to be deployed adjacent the scanned anatomical structure;

selection apparatus for permitting a user to select said at least one of said third software objects;

registration apparatus for selectively positioning said selected at least one of said third software objects into said augmented 3D computer model, with said selected at least one of said third software objects being positioned in said augmented 3D computer model in proper registration with said at least one first software object contained in said augmented 3D model; and display apparatus for displaying an image of said augmented 3D computer model so as to simultaneously provide a view of said (i) first software object; (ii) said specific 2D slice image texture mapped onto said planar surface of said second software object when said second software object is inserted within said augmented 3D computer model; and (iii) said at least one of said third software objects when said at least on one of said third software objects is positioned within said augmented 3D computer model.

In another form of the invention, there is provided a method for visualizing structure, comprising:

providing a first database comprising a plurality of 2-D slice images generated by scanning an anatomical structure, said 2-D slice images being stored in a first data format;

providing a second database comprising a 3D computer model of said scanned anatomical structure, said 3D computer model comprising at least one first software object, said at least one first software object being defined by a 3-D geometry database;

providing insertion apparatus for selectively inserting a second software object into said 3D computer model so as to augment said 3D computer model, said second software object being defined by a 3D geometry database and including a planar surface;

providing determining apparatus for determining the specific 2D slice image associated with the position of said planar surface of said second software object when said second software object is inserted within said augmented 3D computer model;

providing texture mapping apparatus for texture mapping said specific 2-D slice image onto said planar surface of said second software object when said second software object is inserted within said augmented 3D computer model;

providing a third database of third software objects, wherein at least one of said third software objects corresponds to a graft implant which is to be deployed adjacent the scanned anatomical structure;

selecting said at least one of said third software objects;

positioning said selected at least one of said third software objects into said augmented 3D computer model, with said selected at least one of said third software objects being positioned in said augmented 3D computer model in proper registration with said at least one first software object contained in said augmented 3D model; and displaying an image of said augmented 3D computer model so as to simultaneously provide a view of (i) said first software object; (ii) said at least one of said third software objects; and (iii) said specific 2D slice image texture mapped onto said planar surface of said second software object when said second software object is inserted within said augmented 3D computer model.

In another form of the invention, there is provided a method for deploying a device in a tortuous vessel, comprising:

placing a virtual generalized-cylinder within a virtual representation of the tortuous vessel;

measuring length along the perimeter of the virtual generalized-cylinder at a set numbers of longitudes;

determining the maximum measured length;

selecting a device based upon the maximum measured length; and deploying the device in the tortuous vessel.

In another form of the invention, there is provided a method for measuring a length along a tortuous vessel, comprising:

placing a virtual generalized-cylinder within a virtual representation of the tortuous vessel;

measuring length along the perimeter of the virtual generalized-cylinder at a set numbers of longitudes; and determining at least one of the maximum measured length and the minimum measured length.

In another form of the invention, there is provided an apparatus for use in measuring a length along a tortuous vessel, comprising:

a first component for placing a virtual generalized-cylinder within a virtual representation of the tortuous vessel;

a second component for measuring length along the perimeter of the virtual device at a set numbers of longitudes; and a third component for determining at least one of the maximum measured length and the minimum measured length.

In another form of the invention, there is provided a method for calculating vessel volume along a medial curve, comprising:

determining a region of interest from a medical image that defines the vessel volume to be measured;

partitioning the volume of the region of interest into sub-volumes;

removing selected sub-volumes from the volume of the region of interest; and calculating the vessel volume by combining the remaining sub-volumes after removal of the previously selected sub-volumes.

In another form of the invention, there is provided a method for deploying a device in a tortuous vessel, comprising:

creating a virtual representation of the tortuous vessel;

placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;

measuring length along the perimeter of the virtual generalized-cylinder at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline;

determining the maximum measured length;

selecting a device based upon the maximum measured length; and deploying the device in the tortuous vessel.

In another form of the invention, there is provided a method for measuring a length along a tortuous vessel, comprising:

creating a virtual representation of the tortuous vessel;

placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;

measuring length along the perimeter of the virtual generalized-cylinder at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline; and determining at least one of the maximum measured length and the minimum measured length.

In another form of the invention, there is provided an apparatus for use in measuring a length along a tortuous vessel, comprising:

a first component for creating a virtual representation of the tortuous vessel;

a second component for placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;

a third component for measuring length along the perimeter of the virtual device at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline; and a fourth component for determining at least one of the maximum measured length and the minimum measured length.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 17 is a schematic illustration showing various anatomical structures on a 2D slice image, where that 2D slice image has been taken axially through the abdomen of a patient, at a location above the aortic/iliac branching;

FIG. 18 is a schematic illustration showing various anatomical structures on another 2D slice image, where that 2D slice image has been taken through the abdomen of the same patient, at a location below the aortic/iliac branching;

FIGS. 17A and 18A are schematic illustrations like those of FIGS. 17 and 18, respectively, except that segmentation has been performed in the 3D database so as to highlight the patient's vascular structure;

FIG. 39 is a schematic representation of a Manufacturer Specific Virtual Graft (MSVG) Product Listing;

FIG. 40 is a schematic representation of an Order Form PDF;

FIG. 79 is a pseudo code of an algorithm used to calculate length along the longitude of a virtual generalized cylinder; and FIG. 80 is a pseudo code of an algorithm for calculating inner and outer curves.

DETAILED DESCRIPTION OF THE PREFERRED EMBODIMENT

1. Basic System

Figure 1:
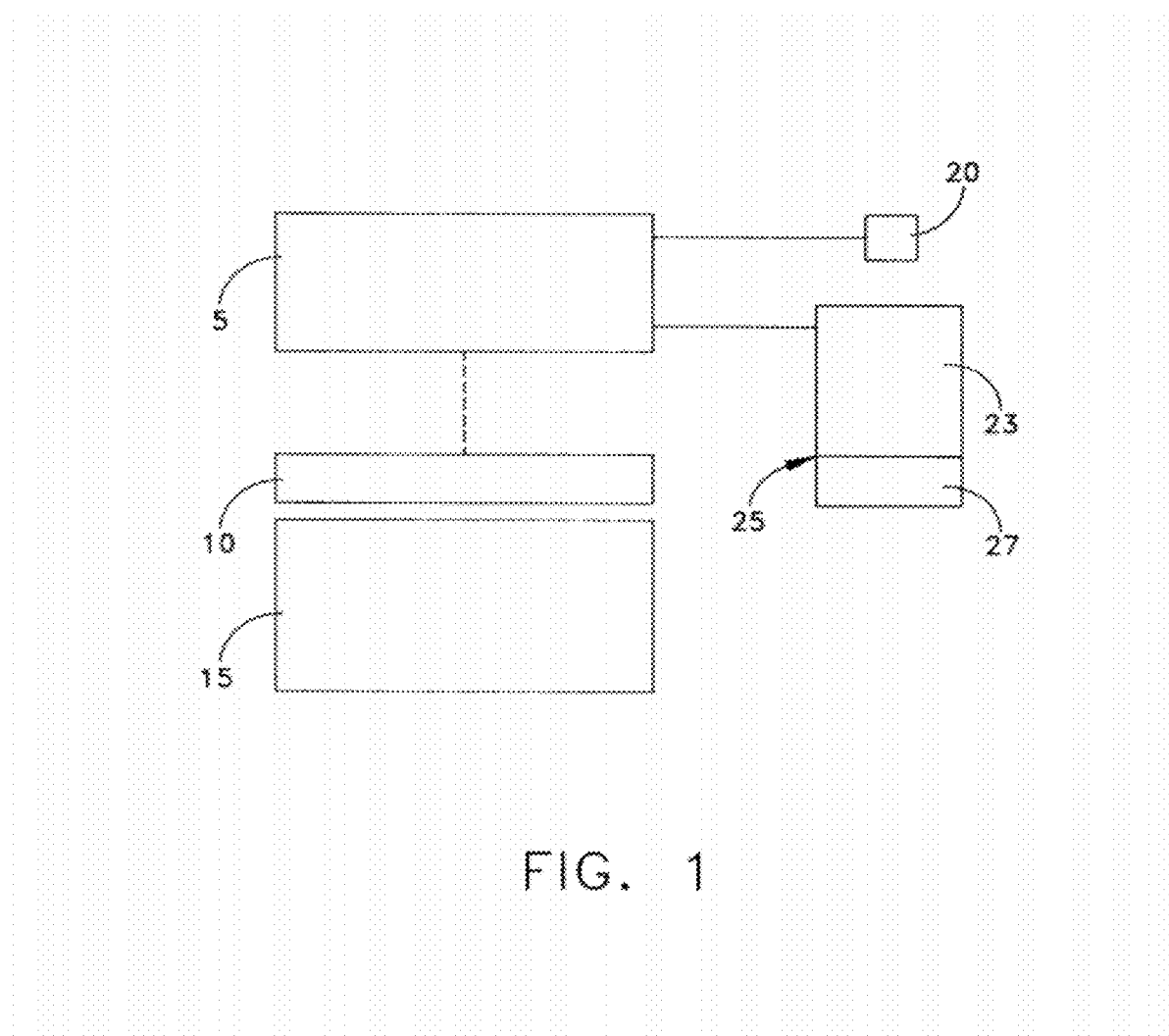
FIG. 1 is a schematic view showing a scanning device for generating a set of 2D images of the anatomy of a patient.

Looking first at FIG. 1, a scanning device 5 is shown as it scans the interior anatomical structure of a patient 10, as that patient 10 lies on a scanning platform 15.

Scanning device 5 is of the sort adapted to generate scanning data corresponding to a series of 2D images, where each 2D image corresponds to a specific viewing plane or "slice" taken through the patient's body. Furthermore, scanning device 5 is adapted so that the angle and spacing between adjacent image planes or slices can be very well defined, e.g., each image plane or slice may be set parallel to every other image plane or slice, and adjacent image planes or slices may be spaced a pre-determined distance apart. By way of example, the parallel image planes might be set 1 mm apart.

The scanning data obtained by scanning device 5 can be displayed as a 2D slice image on a display 20, and/or it can be stored in its 2D slice image data form in a first section 23 of a data storage device or medium 25. Furthermore, additional information associated with the scanning data (e.g., patient name, age, etc.) can be stored in a second section 27 of data storage device or medium 25.

By way of example, scanning device 5 might comprise a CT scanner of the sort manufactured by GE Medical Systems of Milwaukee, Wis.

Figure 2:
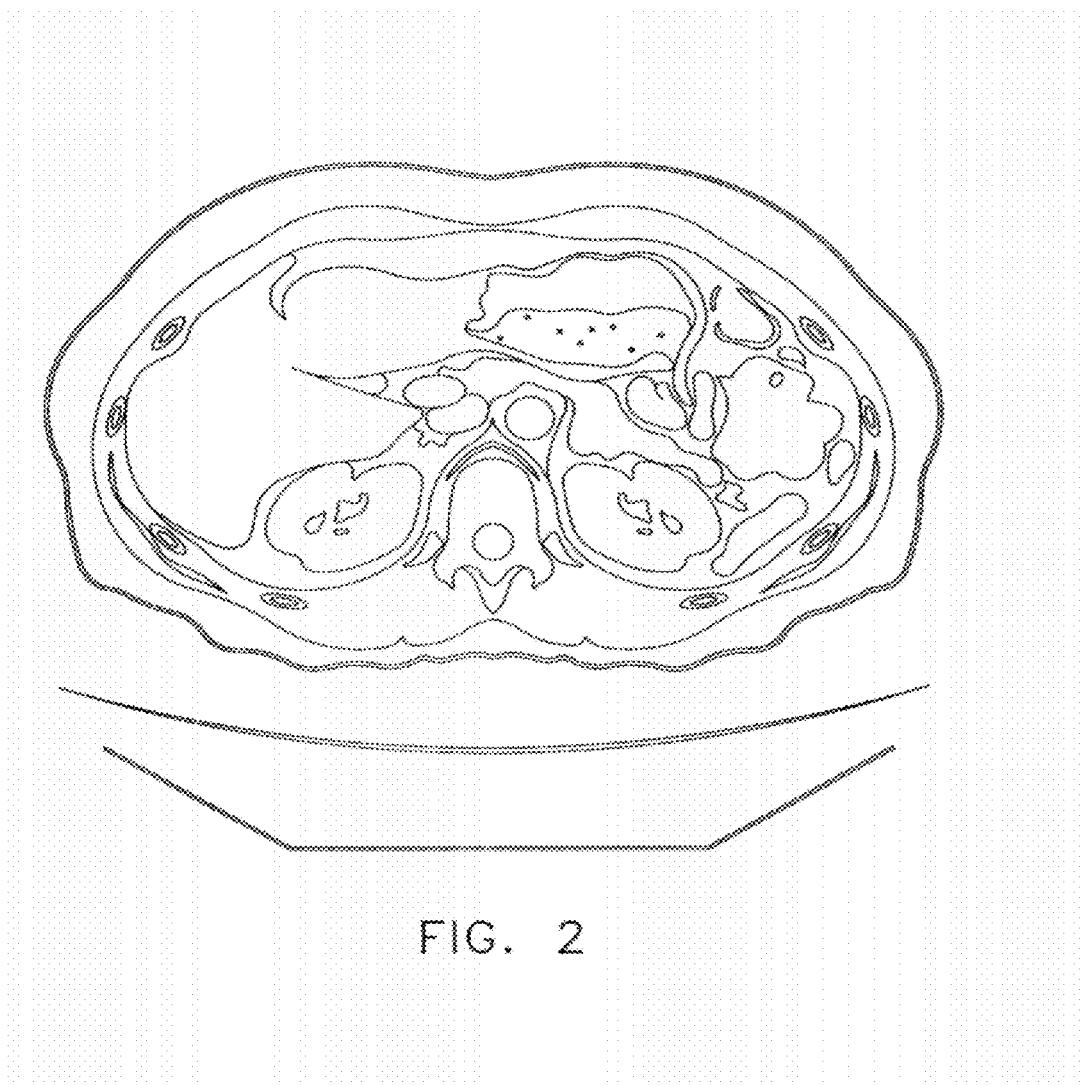
FIG. 2 is a 2D slice image corresponding to an axial slice taken through the abdomen of an individual.

By way of further example, a 2D slice image of the sort generated by scanning device 5 and displayed on display 20 might comprise the 2D slice image shown in FIG. 2. In the particular example shown in FIG. 2, the 2D slice image shown corresponds to an axial slice taken through an individual's abdomen and showing, among other things, that individual's liver.

Scanning device 5 may format its scanning data in any one of a number of different data structures. By way of example, scanning device 5 might format its scanning data in the particular data format used by a CT scanner of the sort manufactured by GE Medical Systems of Milwaukee, Wis. More specifically, with such a scanning device, the scanning data is generally held as a series of data "frames", where each data frame corresponds to a particular 2D slice image taken through the patient's body. Furthermore, within each data frame, the scanning data is generally organized so as to represent the scanned anatomical structure at a particular location within that 2D slice image. Such a data structure is fairly common for scanning devices of the sort associated with the present invention. However, it should be appreciated that the present invention is not dependent on the particular data format utilized by scanning device 5. For the purposes of the present invention, the scanning data provided by scanning device 5 can be formatted in almost any desired data structure, so long as that data structure is well defined, whereby the scanning data can be retrieved and utilized as will hereinafter be disclosed in further detail.

Figure 3:
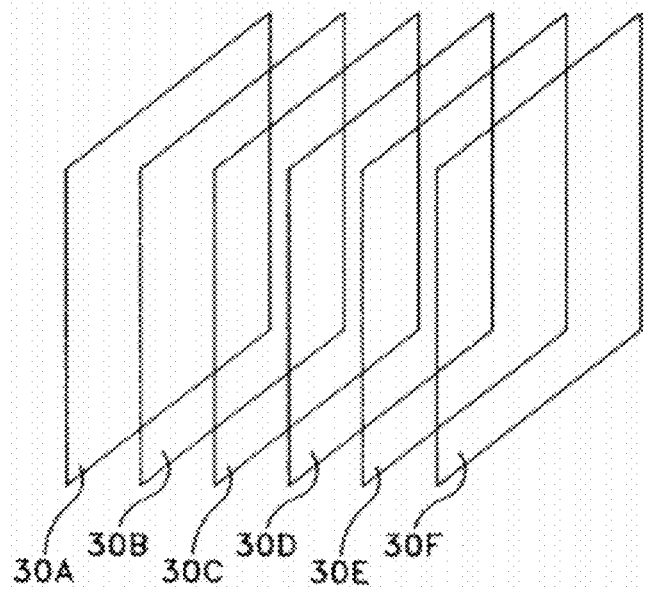
FIG. 3 shows a series of data frames corresponding to 2D slice images arranged in a parallel array.
Figure 4:
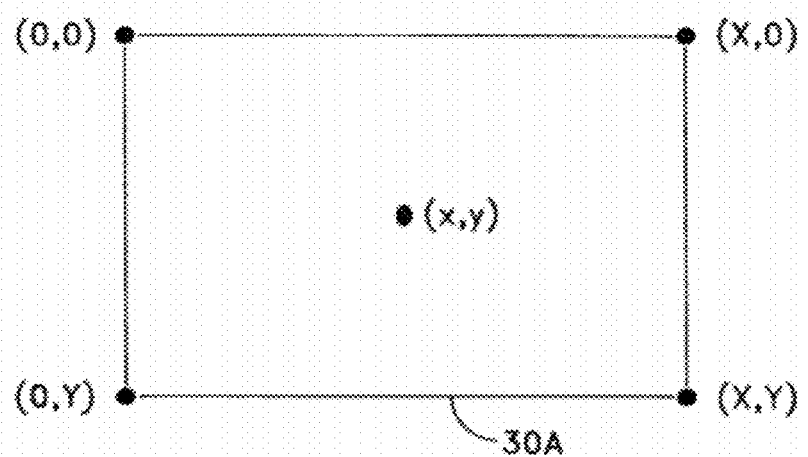
FIG. 4 is a schematic view showing the scanning data contained within an exemplary data frame.

For purposes of illustrating the present invention, it can be convenient to think of the scanning data generated by scanning device 5 as being organized in the data structures schematically illustrated in FIGS. 3 and 4.

More particularly, in FIG. 3, a series of data frames 30A, 30B, 30C, etc. are shown arranged in a parallel array. Each of these data frames 30A, 30B, 30C, etc. corresponds to a particular 2D slice image taken through the patient's body by scanning device 5, where the 2D slice images are taken parallel to one another. In addition, adjacent image planes or slices are spaced apart by a constant, pre-determined distance, e.g., 1 mm. It will be appreciated that data frames 30A, 30B, 30C, etc. collectively form a volumetric data set which is representative of the patient's scanned anatomical structure.

Furthermore, in FIG. 4, the scanning data contained within an exemplary data frame 30A is shown represented in an X-Y coordinate scheme so as to quickly and easily identify the scanned anatomical structure disposed at a particular location within that 2D slice image. Typically, the scanning data relating to a particular X-Y coordinate represents an image intensity value. This image intensity value generally reflects some attribute of the specific anatomical structure being scanned, e.g., the tissue density.

As noted above, the scanning data generated by scanning device 5 is stored in its 2D slice image data form in first section 23 of data storage device or medium 25, with the scanning data being stored in a particular data format as determined by the manufacturer of scanning device 5.

Figure 5:
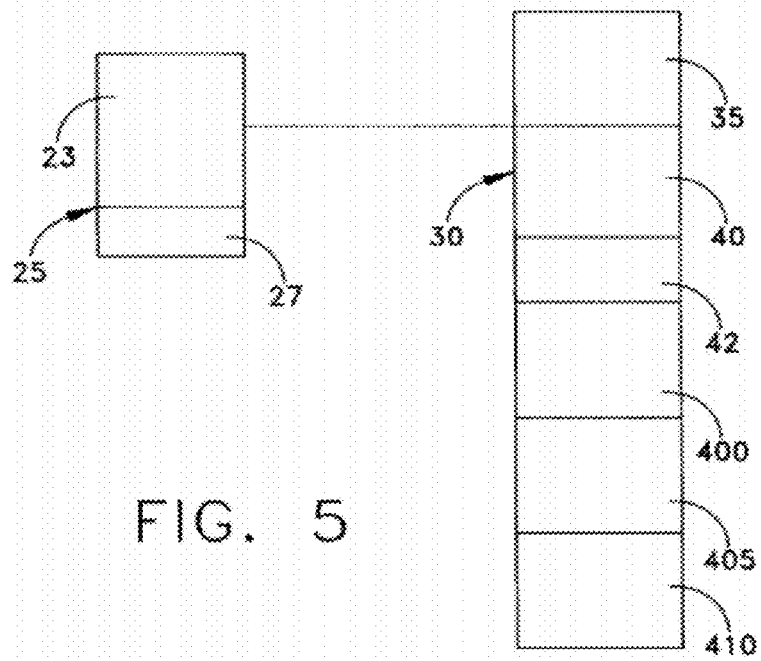
FIG. 5 shows scanning data stored in a first storage device or medium being retrieved, processed and then stored again in a second data storage device or medium.

In accordance with the present invention, and looking now at FIG. 5, the scanning data stored in first section 23 of data storage device or medium 25 is retrieved, processed and then stored again in a data storage device or medium 30.

More particularly, the scanning data stored in first section 23 of data storage device or medium 25 is retrieved and processed so as to convert the scanning data generated by scanning device 5 from its 2D slice image data form into a 3D computer model of the patient's anatomical structure. This 3D computer model is then stored in a first section 35 of data storage device or medium 30.

In addition, the scanning data stored in first section 23 of data storage device or medium 25 is retrieved and processed as necessary so as to convert the scanning data into a preferred data format for the 2D slice image data. The 2D slice image data is then stored in this preferred data format in second section 40 of data storage device or medium 30.

Furthermore, the additional information associated with the scanning data (e.g., patient name, age, etc.) which was previously stored in second section 27 of data storage device or medium 25 can be stored in a third section 42 of data storage device or medium 30.

In accordance with the present invention, once the 3D computer model has been stored in first section 35 of data storage device or medium 30, and the 2D slice image data has been stored in a preferred data format in second section 40 of data storage device or medium 30, a physician can then use an appropriately programmed computer to access the 3D computer model stored in first section 35 of data storage device or medium 30, and/or the 2D slice image data stored in second section 40 of data storage device or medium 30, to generate desired patient-specific images.

Figure 6:
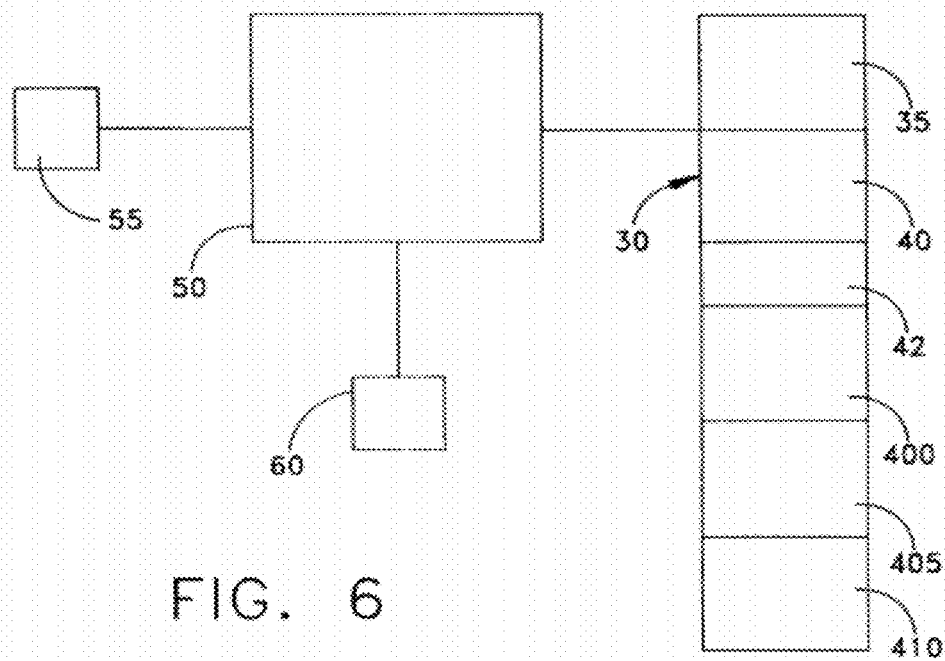
FIG. 6 is a schematic view of a system for retrieving and viewing scanning data.

More particularly, and looking now at FIG. 6, once the 3D computer model has been stored in first section 35 of data storage device or medium 30, and the 2D slice image data has been stored in a preferred data format in second section 40 of data storage device or medium 30, a physician can use an appropriately programmed computer 50, operated by input devices 55, to access the 3D computer model stored in first section 35 of data storage device or medium 30, and/or the 2D slice image data stored in second section 40 of data storage device or medium 30, so as to generate the desired patient-specific images and display those images on a display 60.

To this end, it will be appreciated that the specific data structure used to store the 3D computer model in first section 35 of data storage device or medium 30, and the specific data structure used to store the 2D slice image data in second section 40 of data storage device or medium 30, will depend on the specific nature of computer 50 and on the particular operating system and application software being run on computer 50.

Figure 7:
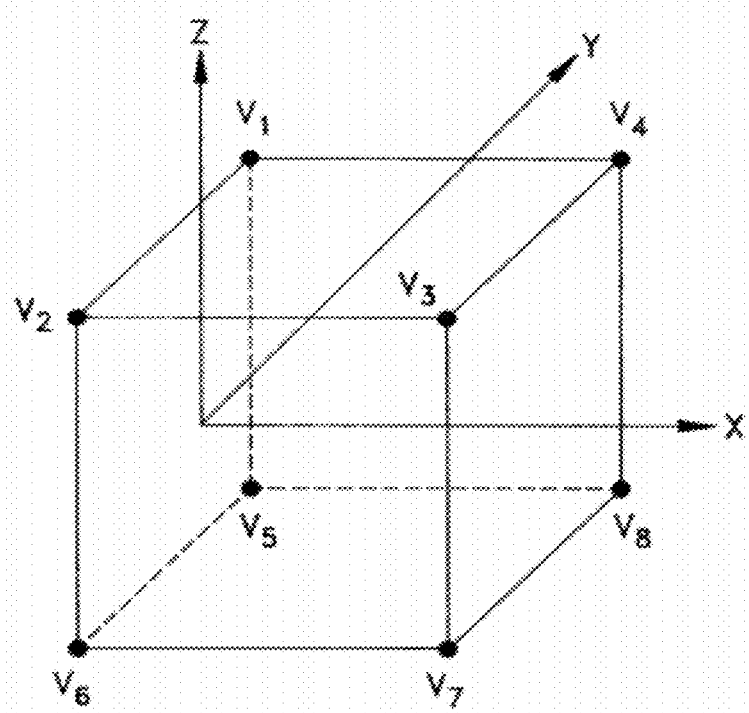
FIG. 7 is a schematic view of a unit cube for use in defining polygonal surface models.
Figure 8:
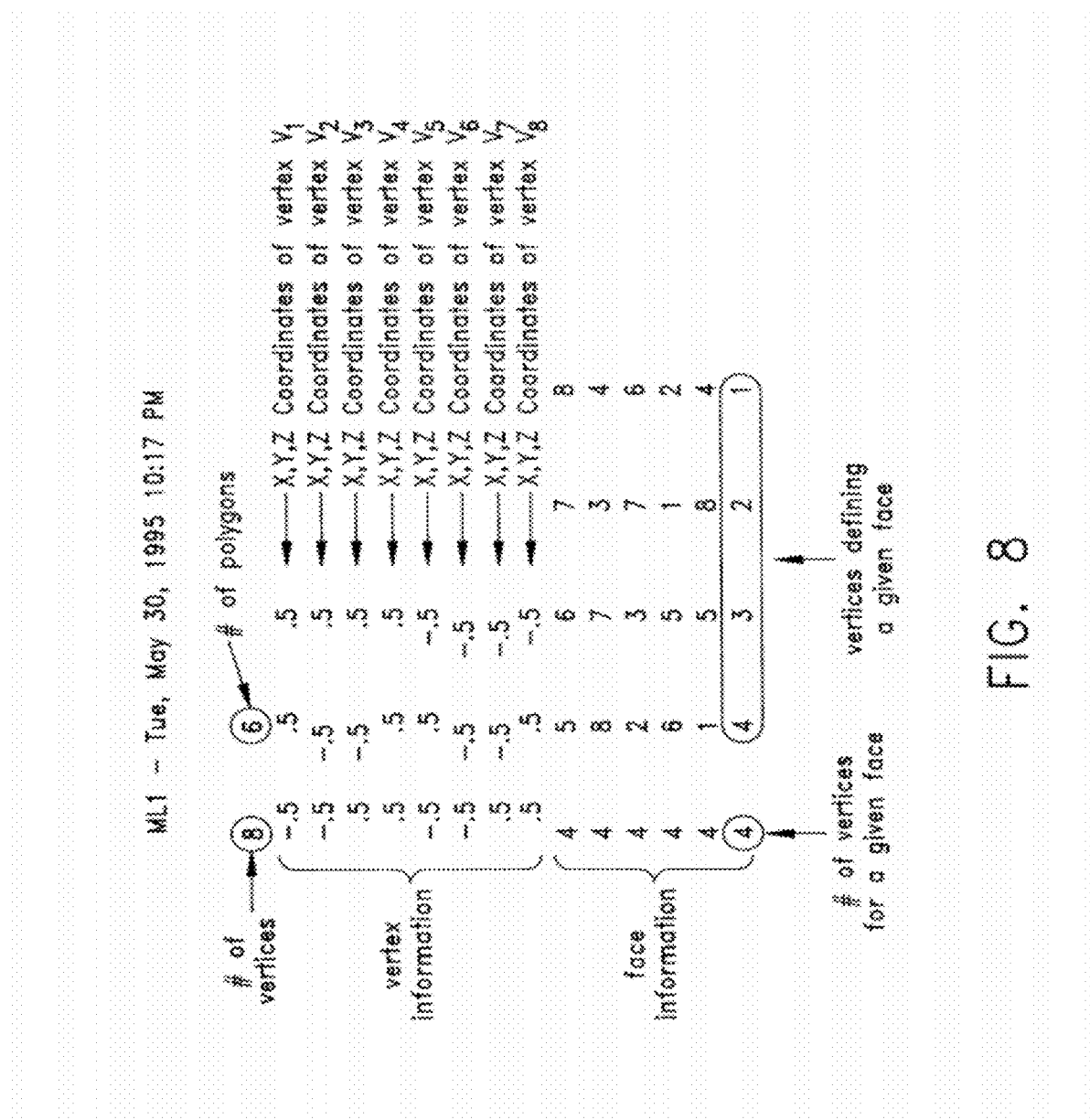
FIG. 8 illustrates the data file format of the polygonal surface model for the simple unit cube shown in FIG. 7.
Figure 9A:
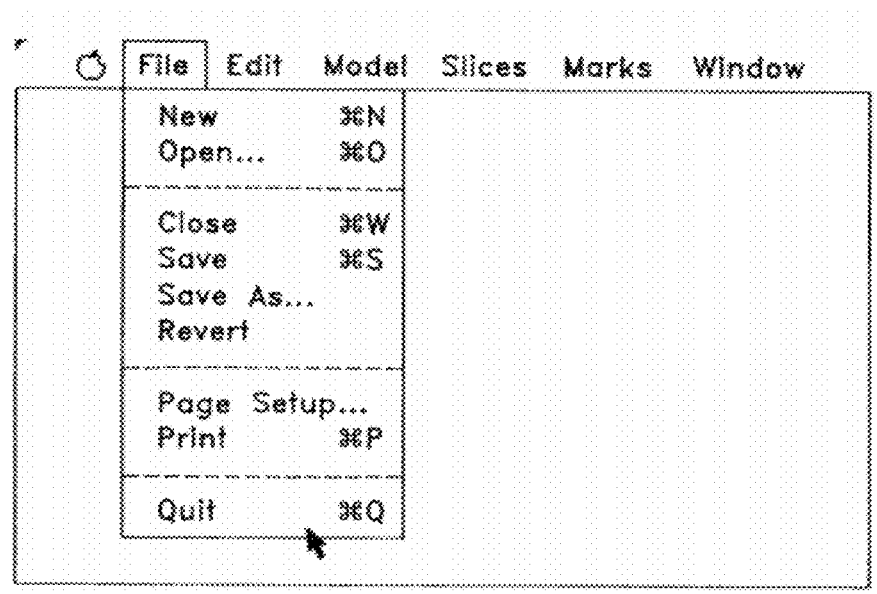
FIGS. 9A-9F illustrate a variety of menu choices which may be utilized in connection with the present invention.
Figure 9B:
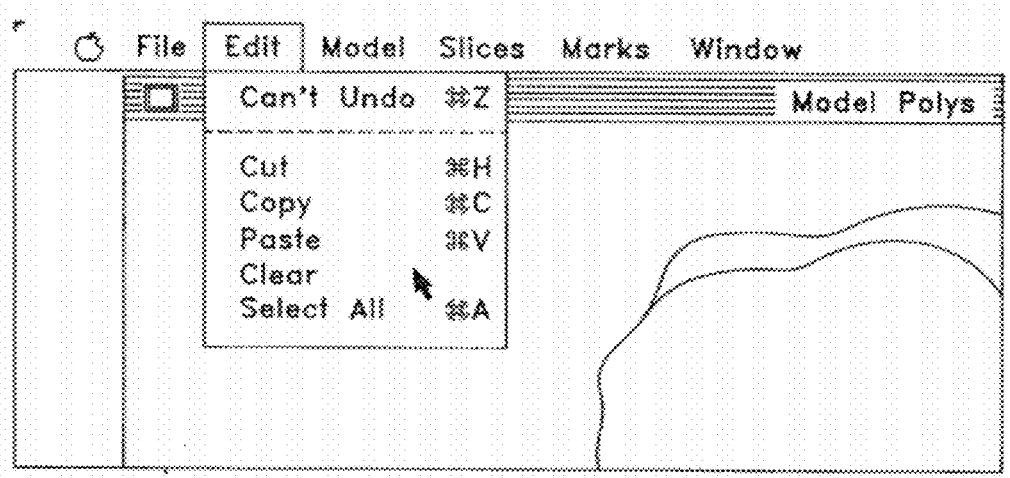
Figure 9C:
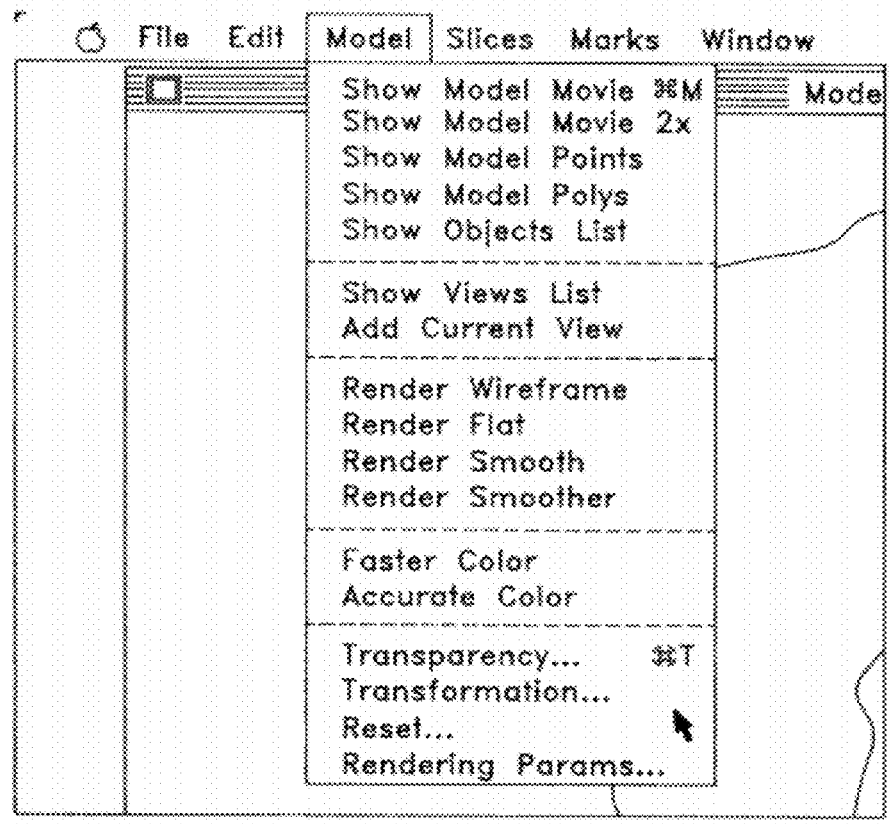
Figure 9D:
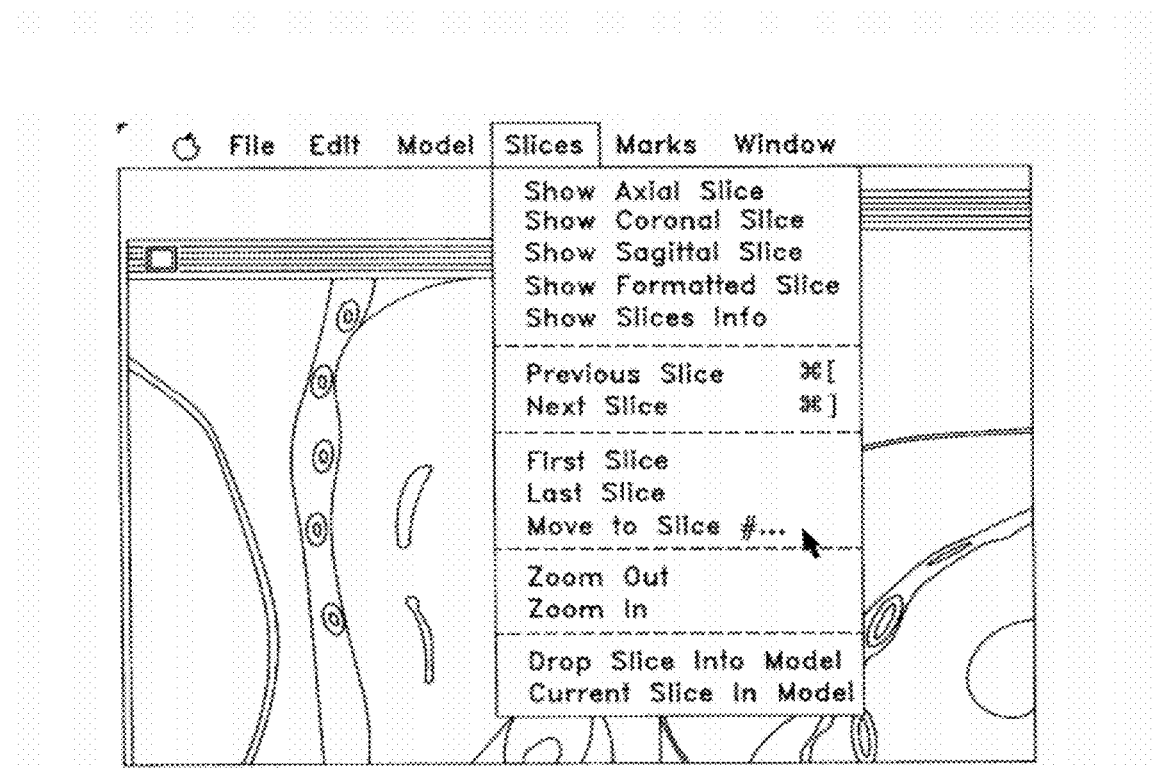
Figure 9E:
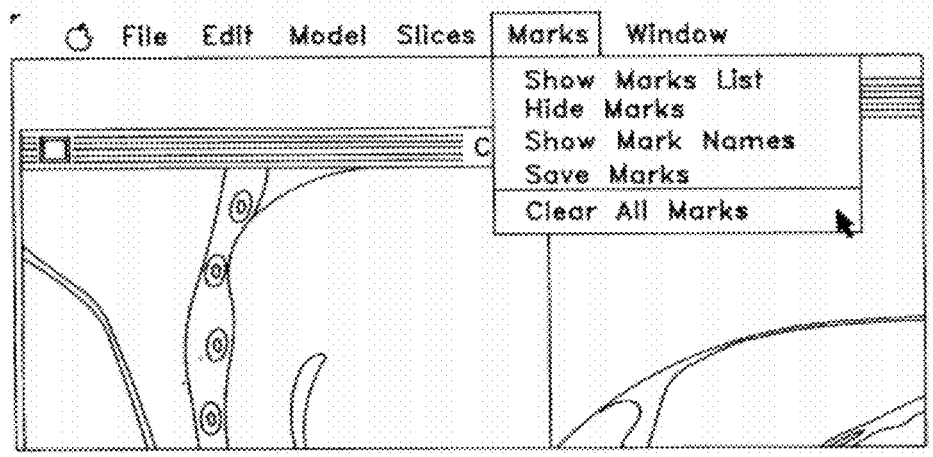
Figure 9F:
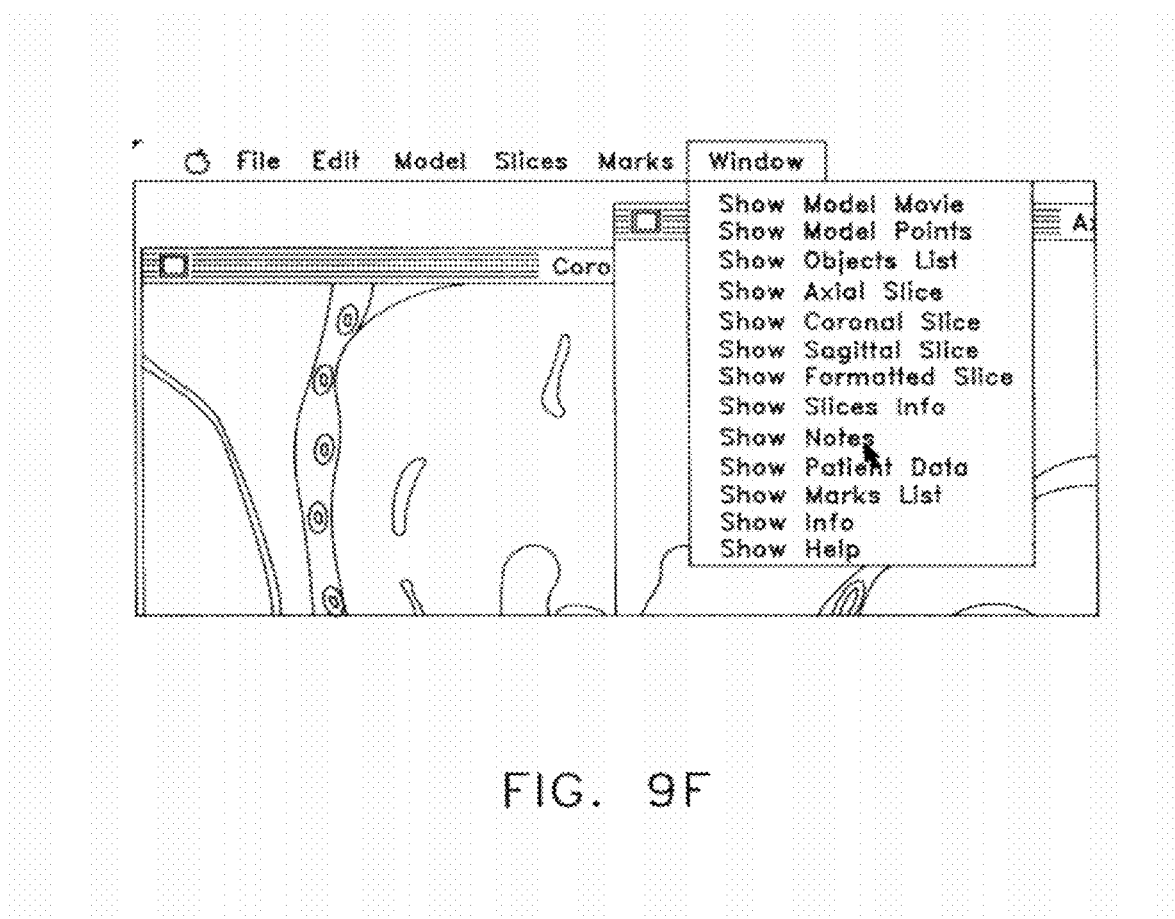

In general, however, the 3D computer model contained in first section 35 of data storage device or medium 30 is preferably structured as a collection of software objects, with each software object being defined by a polygonal surface model of the sort well known in the art. By way of example, a scanned anatomical structure such as a human liver might be modeled as three distinct software objects, with the outer surface of the general mass of the liver being one software object, the outer surface of the vascular structure of the liver being a second software object, and the outer surface of a tumor located in the liver being a third software object. By way of further example, FIGS. 7 and 8 illustrate a typical manner of defining a software object by a polygonal surface model. In particular, FIG. 7 illustrates the vertices of a unit cube set in an X-Y-Z coordinate system, and FIG. 8 illustrates the data file format of the polygonal surface model for this simple unit cube. As is well known in the art, more complex shapes such as human anatomical structure can be expressed in corresponding terms.

Furthermore, the 3D computer model contained in first section 35 of data storage device or medium 30 is created by analyzing the 2D slice image data stored in first section 23 of data storage device or medium 25 using techniques well known in the art. For example, the 2D slice image data stored in first section 23 of data storage device or medium 25 might be processed using the well known "Marching Cubes" algorithm, which is a so-called "brute force" surface construction algorithm that extracts isodensity surfaces from a volumetric data set, producing from one to five triangles within voxels that contain the surface. Alternatively, the 2D slice image data stored in first section 23 of data storage device or medium 25 might be processed into the 3D computer model stored in first section 35 of data storage device or medium 30 by some other appropriate modeling algorithm so as to yield the desired 3D computer model which is stored in first section 35 of data storage device or medium 30.

As noted above, the specific data structure used to store the 2D slice image data in second section 40 of data storage device or medium 30 will also depend on the specific nature of computer 50 and on the particular operating system and application software being run on computer 50.

In general, however, the 2D slice image data contained in second section 40 of data storage device or medium 30 is preferably structured as a series of data "frames", where each data frame corresponds to a particular 2D slice image taken through the patient's body, and where the scanning data within each data frame is organized so as to represent the scanned anatomical structure at a particular location within that 2D slice image.

In the present invention, it is preferred that computer 50 comprise a Power PC-based, Macintosh operating system ("Mac OS") type of computer, e.g. a Power PC Macintosh 8100/80 of the sort manufactured by Apple Computer, Inc. of Cupertino, Calif. In addition, it is preferred that computer 50 be running Macintosh operating system software, e.g. Mac OS Ver. 7.5.1, such that computer 50 can readily access a 3D computer model formatted in Apple's well-known QuickDraw 3D data format and display images generated from that 3D computer model, and such that computer 50 can readily access and display 2D images formatted in Apple's well-known QuickTime image data format. Input devices 55 preferably comprise the usual computer input devices associated with a Power PC-based, Macintosh operating system computer, e.g., input devices 55 preferably comprise a keyboard, a mouse, etc.

In view of the foregoing, in the present invention it is also preferred that the 3D computer model contained in first section 35 of data storage device or medium 30 be formatted in Apple's QuickDraw 3D data format, whereby the Mac OS computer 50 can quickly and easily access the 3D computer model contained in first section 35 of data storage device or medium 30 and display images generated from that 3D computer model on display 60.

In view of the foregoing, in the present invention it is also preferred that the 2D slice image data contained in second section 40 of data storage device or medium 30 be formatted in Apple's QuickTime image data format. In this way computer 50 can quickly and easily display the scanned 2D slice images obtained by scanning device 5. It will be appreciated that, to the extent that scanning device 5 happens to format its scanning data in the preferred QuickTime image data format, no reformatting of the 2D slice image data will be necessary prior to storing the 2D slice image data in second section 40 of data storage device or medium 30. However, to the extent that scanning device 5 happens to format its scanning data in a different data structure, reformatting of the 2D slice image data will be necessary so as to put it into the preferred QuickTime image data format. Such image data reformatting is of the sort well known in the art.

As a result of the foregoing, it will be seen that a physician operating computer 50 through input devices 55 can generate a desired image from the 3D computer model contained within first section 35 of data storage device or medium 30. In particular, the physician can use input devices 55 to (1) open a window on display 60, (2) instruct the computer as to the desired angle of view, (3) generate the corresponding image of the scanned anatomical structure from the desired angle of view, using the 3D computer model contained within first section 35 of data storage device or medium 30, and (4) display that image in the open window on display 60.

In addition, a physician operating computer 50 through input devices 55 can display a desired 2D slice image from the 2D slice image data contained within second section 40 of data storage device or medium 30. In particular, the physician can use input devices 55 to (1) open a window on display 60, (2) select a particular 2D slice image contained within second section 40 of data storage device or medium 30, and (3) display that slice image in the open window on display 60.

More particularly, and looking now at FIGS. 9A-9F, computer 50 is preferably programmed so as to provide a variety of pre-determined menu choices which may be selected by the physician operating computer 50 via input devices 55.

Figure 10:
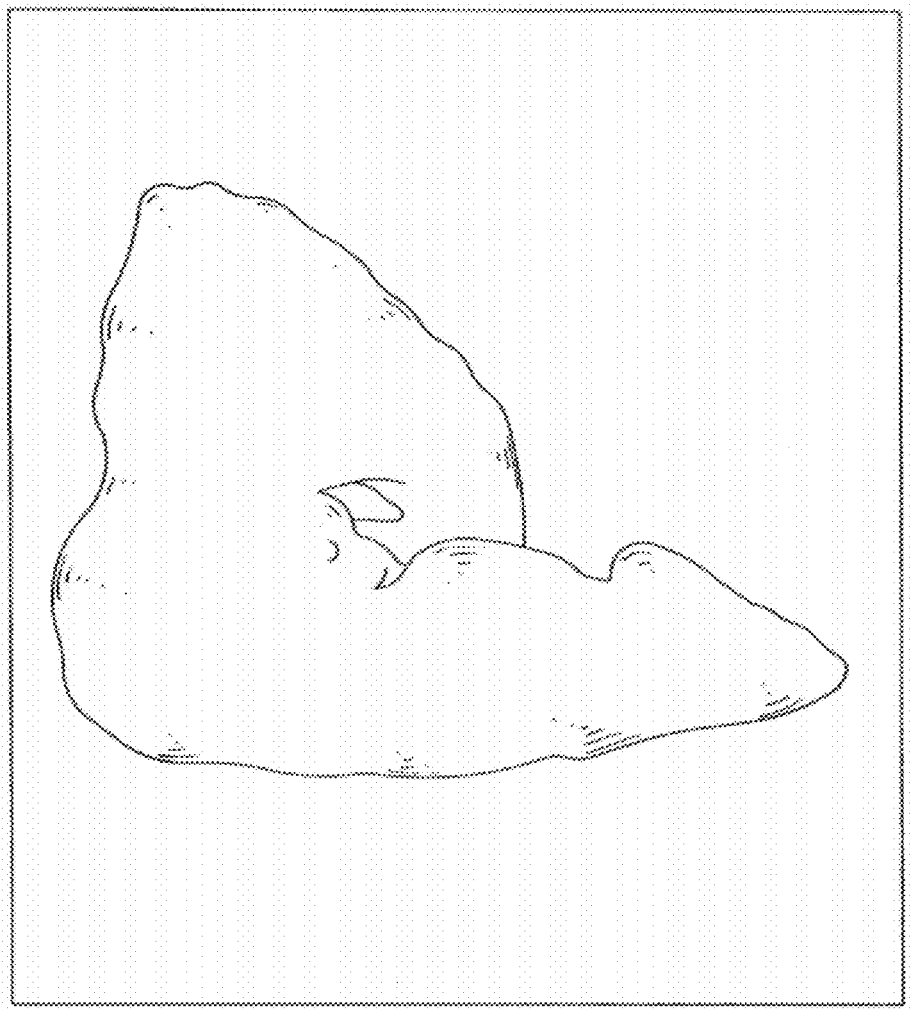
FIG. 10 illustrates an image drawn to a window using the data contained in the 3D computer model associated with the present invention.

Thus, for example, if the physician wishes to produce a desired image from the 3D computer model contained within first section 35 of data storage device or medium 30, the physician uses input devices 55 to invoke the command to display the 3D computer model; the software then creates a window to display the image, it renders an image from the 3D computer model contained within first section 35 of data storage device or medium 30, and then displays that image in the open window on display 60. By way of example, FIG. 10 illustrates an image drawn to a window using the data contained in the 3D computer model stored in first section 35 of data storage device or medium 30. The physician can use input devices 55 to instruct the image rendering software as to the specific angle of view desired. In particular, computer 50 is preferably programmed so that the physician can depress a mouse key and then drag on the object so as to rotate the object into the desired angle of view. Additionally, computer 50 is preferably programmed so that the physician can also use the keyboard and mouse to move the view closer in or further out, or to translate the object side to side or up and down relative to the image plane. Programming to effect such computer operation is of the sort well known in the art.

Figure 11:
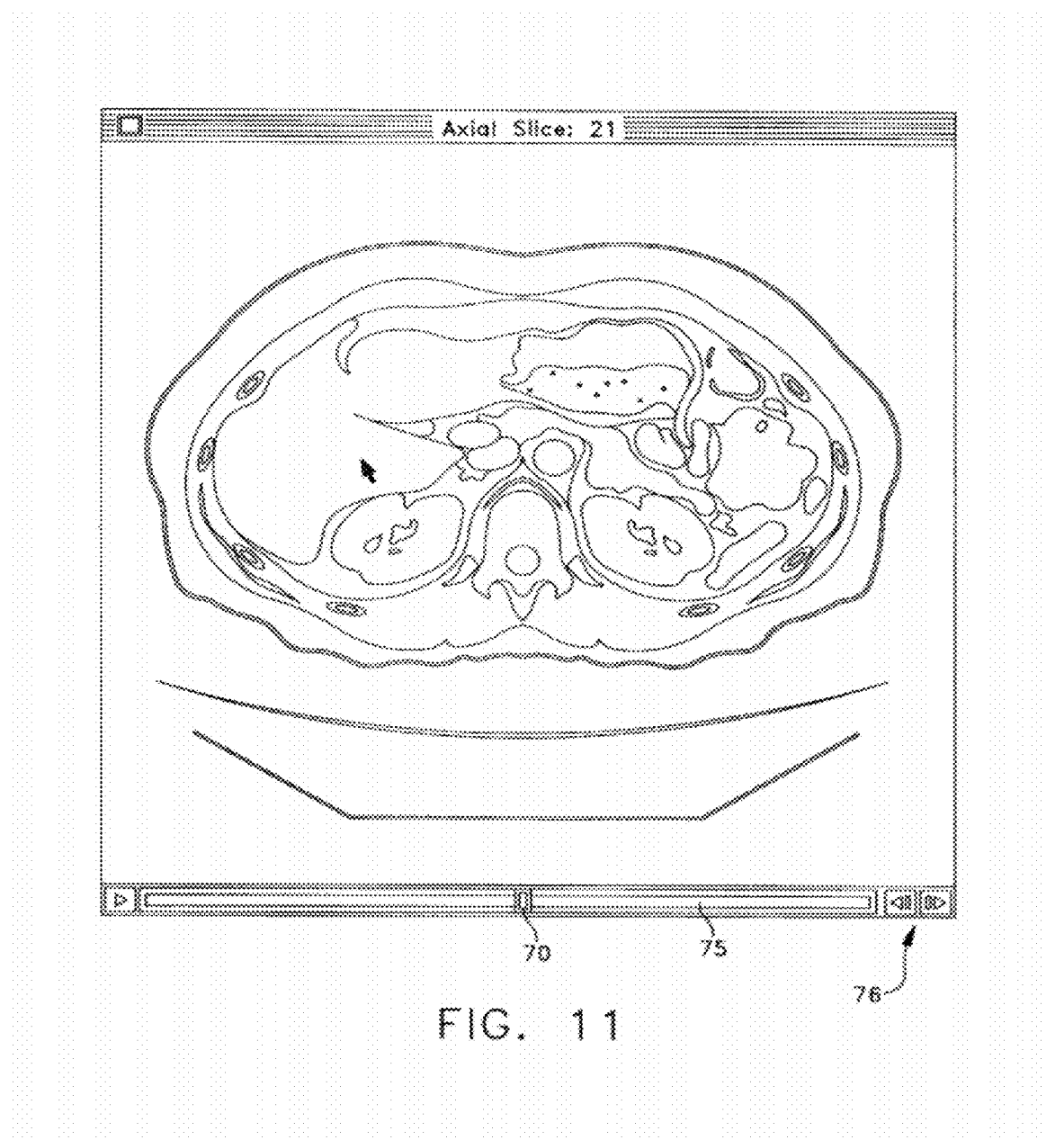
FIG. 11 illustrates a 2D slice image drawn to a window in accordance with the present invention.

In a similar manner, the physician can use menu choices such as those shown in FIGS. 9A-9F to open a window on the display 60 and then to display in that window a desired 2D slice image from second section 40 of data storage device or medium 30. Computer 50 is programmed so that the physician can select between different slice images by means of input devices 55. By way of example, FIG. 11 illustrates a 2D slice image drawn to a window by the operating system using the data contained in second section 40 of data storage device or medium 30. In this case, computer 50 is programmed so that, by dragging icon 70 back and forth along slider 75, the physician can "leaf" back and forth through the collection of axial slices, i.e., in the example of FIG. 11, in which axial slice #21 is displayed, dragging icon 70 to the left might cause axial slice #20 to be displayed, and dragging icon 70 to the right might cause axial slice #22 to be displayed. Additionally, computer 50 is preferably programmed so that the physician can also step the image from the current slice number to a previous or following slice number by using menu commands or by clicking the mouse cursor on the single step icons 76 set at the right side of slider 75. Computer 50 is preferably also programmed so that menu commands are provided to change the slice window display directly to the first or last slice image in the 2D slice image set, or to change the slice window display to a user-specified slice number. Programming to effect such computer operation is of the sort well known in the art.

Figure 12:
FIG. 12 illustrates a composite image formed from information contained in both the 3D computer model and the 2D slice image data structure.

As a consequence of using the aforementioned hardware and software architecture (i.e., the Macintosh computer, the Mac OS, the Apple QuickDraw 3D data format and software, and the Apple QuickTime image data format and software, or some equivalent hardware and software), it is possible to insert an additional software object into the 3D computer model contained within first section 35 of data storage device or medium 30. In particular, it is possible to insert an additional software object having a "blank" planar surface into the 3D computer model. Furthermore, using the computer's image rendering software, it is possible to texture map a 2D slice image from second section 40 of data storage device or medium 30 onto the blank planar surface of the inserted software object. Most significantly, since the 3D computer model is created out of the same scanning data as the 2D slice images, it is possible to determine the specific 2D slice image which corresponds to a given position of the blank planar surface within the 3D computer model. Accordingly, with the present invention, when an image is generated from the 3D computer model, both 3D model structure and 2D slice image structure can be simultaneously displayed in proper registration with one another, thereby providing a single composite image of the two separate images. See, for example, FIG. 12, which shows such a composite image. Again, computer 50 is programmed so that the physician can use input devices 55 to instruct the operating system's image rendering software as to where the aforementioned "additional" software object is to be inserted into the model and as to the particular angle of view desired. Programming to effect such computer operation is of the sort well known in the art.

Additionally, computer 50 is also programmed so that (1) the physician can use input devices 55 to select a particular 2D slice image from the second section 40 of data storage device or medium 30, and (2) the computer will then automatically insert the aforementioned additional software object into the 3D computer model so that the object's "blank" planar surface is located at the position which corresponds to the position of the selected 2D slice image relative to the scanned anatomical structure. Again, programming to effect such computer operation is of the sort well known in the art.

In the foregoing description of the present invention, the 2D slice image data generated by scanning device 5 has generally been discussed in the context of the standard "axial" slice images normally generated by scanning devices of the type associated with this invention. However, it is to be appreciated that the present invention is also adapted to utilize sagittal and/or coronal 2D slice images. Furthermore, it is also to be appreciated that the present invention is adapted to utilize oblique slice images of the type hereinafter described.

Figure 13:
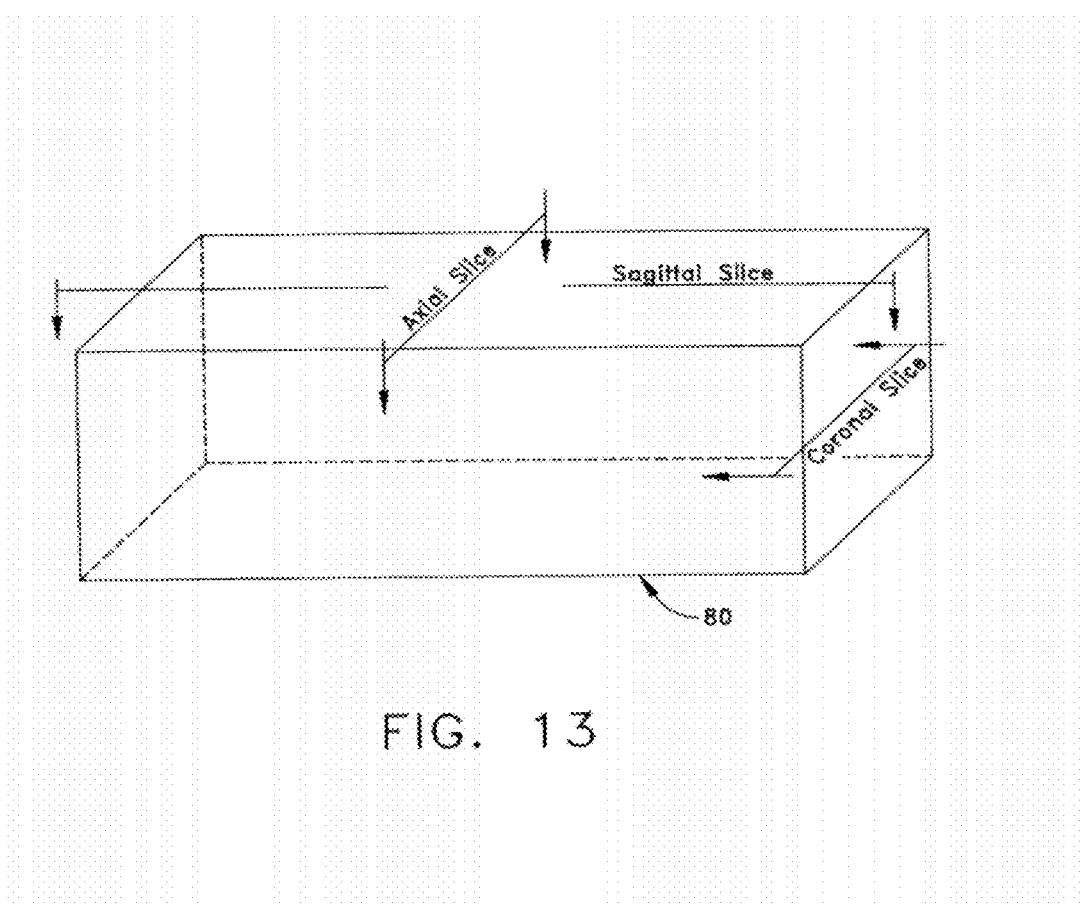
FIG. 13 is a schematic illustration showing the relationship between axial slices, sagittal slices and coronal slices.

More particularly, and looking next at FIG. 13, the relative orientation of axial, sagittal and coronal slice images are shown in the context of a schematic view of a human body 80. Scanning device 5 will normally generate axial slice image data when scanning a patient. In addition, in many cases scanning device 5 will also assemble the axial slice data into a 3D database (i.e., a volumetric data set) of the scanned anatomical structure, and then use this 3D database to generate a corresponding set of sagittal and/or coronal 2D slice images. In the event that scanning device 5 does not have the capability of generating the aforementioned sagittal and/or coronal 2D slice images, such sagittal and/or coronal 2D slice images may be generated from a set of the axial 2D images in a subsequent operation, using computer hardware and software of the sort well known in the art. Alternatively, if desired, computer 50 may be programmed to render such sagittal and/or coronal 2D slices "on the fly" from the 2D slice image data contained in second section 40 of data storage device or medium 30.

Figure 14:
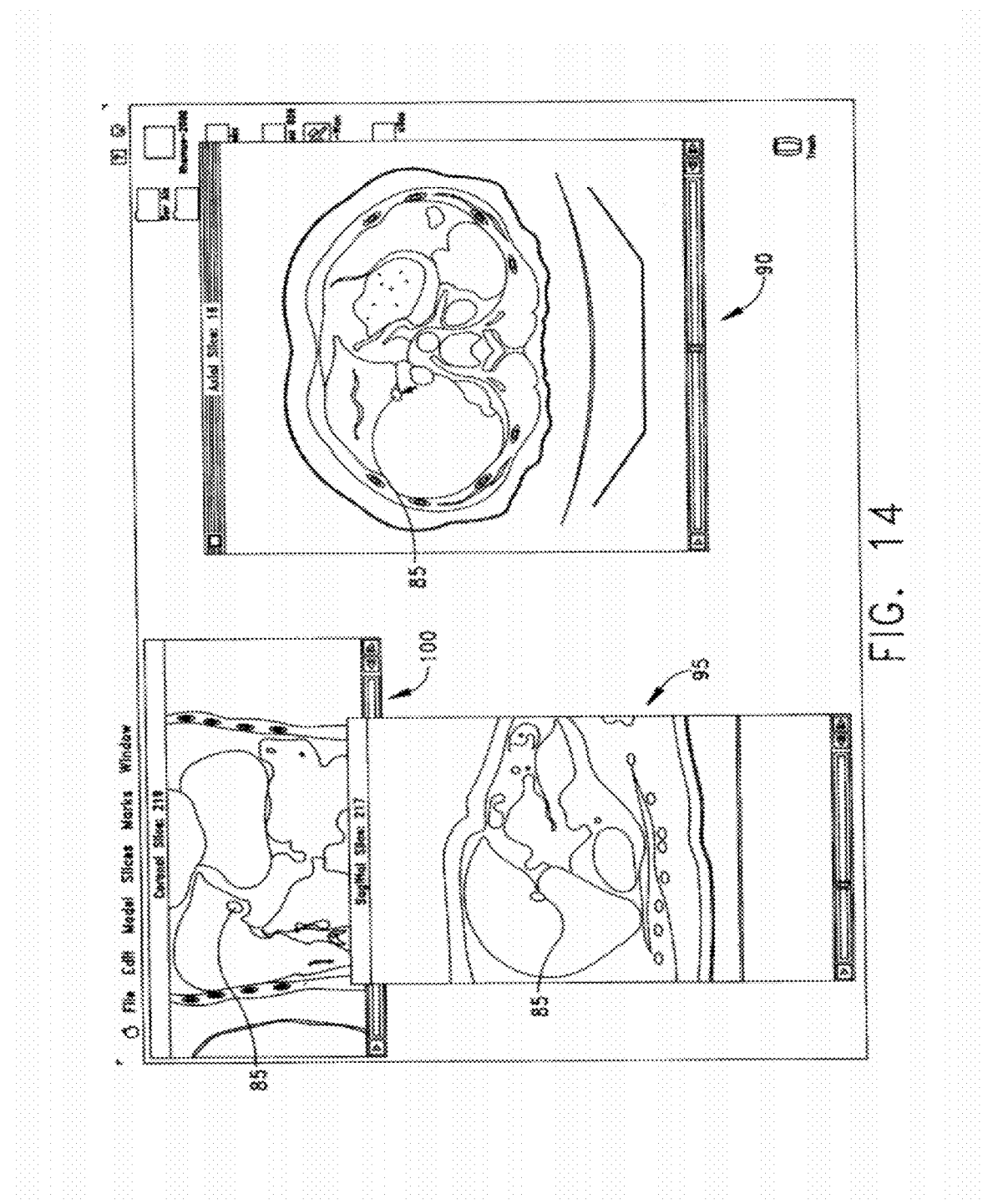
FIG. 14 illustrates three different images being displayed on a computer screen at the same time, with a marker being incorporated into each of the images.

In connection with the present invention, the sagittal and coronal 2D slice image data may be stored with the axial slice image data in second section 40 of data storage device or medium 30. Preferably these sagittal and coronal slice images are stored in exactly the same data format as the 2D axial slice images, whereby they may be easily accessed by computer 50 and displayed on display 60 in the same manner as has been previously discussed in connection with axial 2D slice images. As a result, axial, sagittal and coronal 2D slice images can be displayed on display 60, either individually or simultaneously in separate windows, in the manner shown in FIG. 14. Furthermore, when generating a composite image of the sort shown in FIG. 12 (i.e., an image generated from both the 3D computer model contained in first section 35 of data storage device or medium 30 and a 2D slice image contained in second section 40 of data storage device or medium 30), the composite image can be created using axial, sagittal or coronal 2D slice images, as preferred.

It is also to be appreciated that the system of the present invention is also configured so as to generate and utilize oblique 2D slice image data in place of the axial, sagittal and coronal slice image data described above. More particularly, computer 50 is programmed so that a physician can use input devices 55 to specify the location of the oblique 2D slice image desired, and then computer 50 generates that 2D slice image from the volumetric data set present in second section 40 of data storage device or medium 30 (i.e., from the collection of 2D slice images contained in second section 40 of data storage device or medium 30).

It should be appreciated that data storage device or medium 30 can comprise conventional storage media (e.g., a hard disk, a CD ROM, a tape cartridge, etc.), which can be located either onsite or at a remote location linked via appropriate data transfer means.

2. Markers and Margins

In a further aspect of the present invention, computer 50 is programmed so that a physician can display a specific 2D slice image in a window opened on display 60, place a marker into that specific 2D slice image using a mouse or other input device 55, and then have that marker automatically incorporated into both (i) the 3D computer model contained in first section 35 of data storage device or medium 30, and (ii) any appropriate 2D slice image data contained in second section 40 of data storage device or medium 30. As a result, when images are thereafter generated from the 3D computer model contained in first section 35 of data storage device or medium 30, and/or from the 2D slice image data contained in second section 40 of data storage device or medium 30, these subsequent images will automatically display the marker where appropriate. See, for example, FIG. 14, which shows one such marker 85 displayed in its appropriate location in each of the three displayed 2D slice images, i.e., in axial slice image 90, sagittal slice image 95, and coronal slice image 100. It is to be appreciated that it is also possible for marker 85 to be displayed where appropriate in an image generated from the 3D computer model contained in first section 35 of data storage device or medium 30; see, for example, FIG. 15, which shows such a marker 85 being displayed in the image.

Figure 15:
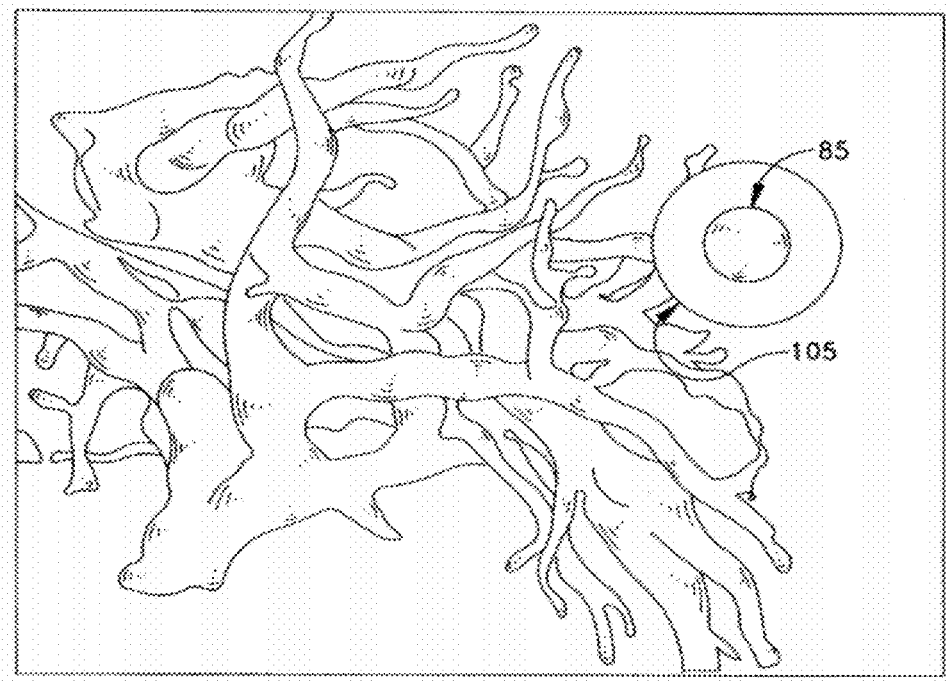
FIG. 15 illustrates a marker shown in an image generated from the 3D computer model, with the marker being surrounded by a margin of pre-determined size.

In yet another aspect of the present invention, computer 50 is programmed so that a physician can generate a "margin" of some predetermined size around such a marker. Thus, for example, in FIG. 15, a margin 105 has been placed around marker 85. In this respect it is to be appreciated that margin 105 will appear as a 3-dimensional spherical shape around marker 85, just as marker 85 appears as a 3-dimensional shape, since the view of FIG. 15 is generated from the 3D computer model contained in first section 35 of data storage device or medium 30. Alternatively, where marker 85 and margin 105 are displayed in the context of 2D slice images, the marker and margin will appear as simple circles. Margin 105 can be used by a physician to determine certain spatial relationships in the context of the anatomical structure being displayed on the computer.

3. Peripheral Highlighting

Figure 16:
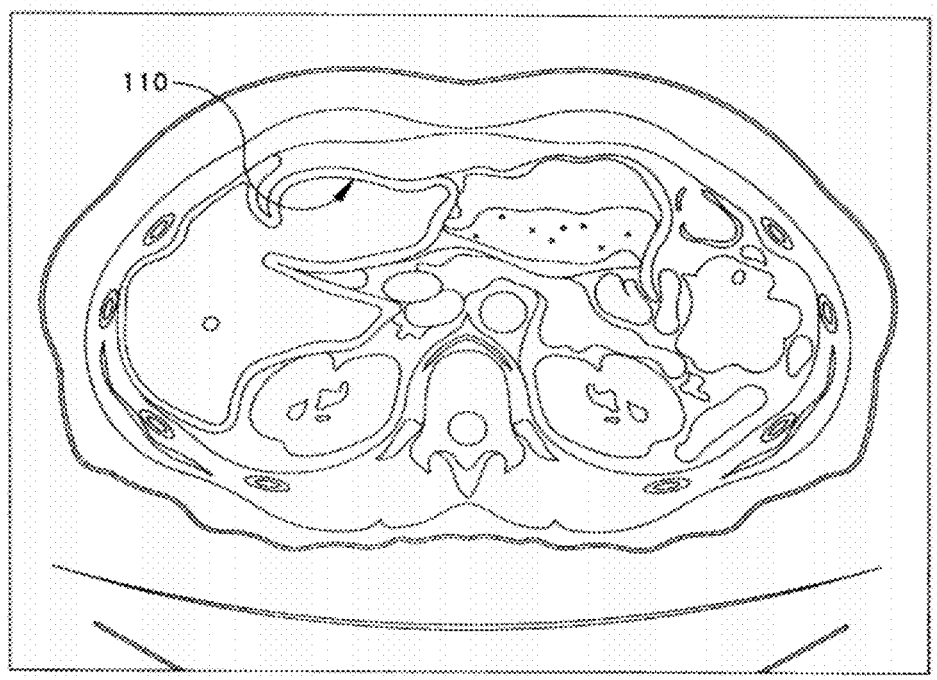
FIG. 16 illustrates a 2D slice image, wherein the periphery of an object has been automatically highlighted by the system.

It is also to be appreciated that, inasmuch as the 3D computer model contained in first section 35 of data storage device or medium 30 constitutes a plurality of software objects defined by polygonal surface models, it is possible to identify the periphery of any such objects in any corresponding 2D slice image data contained in second section 40 of data storage device or medium 30. As a result, it is possible to highlight the periphery of any such object in any 2D slice images displayed on display 60. Thus, in another aspect of the invention, computer 50 is programmed so that a physician can select one or more anatomical structures using an input device 55, and the computer will then highlight the periphery of that structure in any corresponding 2D slice images displayed on display 60. See, for example, FIG. 16, where a boundary 110 is shown outlining the periphery of an object 115 displayed in a 2D slice image.

4. Other Modifications of the Basic System

Furthermore, while in the foregoing description the present invention has been described in the context of an anatomical visualization system being used by a physician, it is also to be appreciated that the system could be used in conjunction with inanimate objects being viewed by a non-physician, e.g., the system could be used to visualize substantially any object for which a 3D computer model and a collection of 2D slice image data can be assembled.

It is also anticipated that one might replace the polygonal surface model discussed above with some other type of surface model. Thus, as used herein, the term "surface model" is intended to include polygonal surface models, parametric surface models such as B-spline surface models, quadralateral meshes, etc.

5. Centerline Calculations

In yet another form of the present invention, the visualization and measurement system may incorporate means for determining patient-specific anatomical dimensions using appropriate scanned 2D image data.

For purposes of illustration but not limitation, this aspect of the present invention will be discussed in the context of measuring a patient's vascular structure in the region of the aortic/iliac branching. By way of further example, such measurement might be conducted in the course of repairing an aortic aneurysm through installation of a vascular prosthesis.

More particularly, using the aforementioned scanning device 5, a set of 2D slice images is first generated, where each 2D slice image corresponds to a specific viewing plane or "slice" taken through the patient's body. As noted above, on these 2D slice images, different types of tissue are typically represented by different image intensities. By way of example, FIG. 17 illustrates a 2D slice image 200 taken through the abdomen of a patient, at a location above the aortic/iliac branching; FIG. 18 illustrates a 2D slice image 202 taken through the abdomen of the same patient, at a location below the aortic/iliac branching. In these images, vascular tissue might be shown at 205, bone at 207, other tissue at 210, etc. An appropriate set of these 2D slice images is assembled into a 3D database so as to provide a volumetric data set corresponding to the anatomical structure of the patient. Referring back to the system illustrated in FIG. 6, the set of 2D slice images making up this 3D database might be stored in second section 40 of data storage device or medium 30. In this respect it is also to be appreciated that the 3D database being referred to now is not the same as the 3D computer model contained in first section 35 of data storage device or medium 30; rather, the 3D database being referred to now is simply a volumetric data set made up of the series of 2D slice images contained in second section 40 of data storage device or medium 30.

Next, using the appropriately programmed computer 50, the patient-specific volumetric data set (formed out of the collection of 2D slice images contained in the 3D database) is segmented so as to highlight the anatomical structure of interest.

This is preferably effected as follows. On the computer's display 60, the user is presented with 2D slice images from the 3D database, which images are preferably stored in second section 40 of data storage device or medium 30. As noted above, each of these 2D images corresponds to a specific viewing plane or "slice" taken through the patient's body; or, stated slightly differently, each of these 2D images essentially represents a plane cutting through the patient-specific volumetric data set contained in the 3D database. As also discussed above, with each of these 2D slice images, the different types of tissue will generally be represented by different image intensities. Using one or more of the input devices 55, e.g., a mouse, the user (who might or might not be a physician) selects a particular 2D slice image for viewing on display 60, e.g., "slice image #155". The user then uses one or more of the input devices 55 to select one or more points located within the anatomical structure of interest. For convenience, such user-selected points can be referred to as "seeds". See, for example, FIG. 17, where a seed point 215 has been selected within the interior of vascular tissue 205 so as to identify blood. The user also uses one or more of the input devices 55 to specify a range of image intensities that appear to correspond to the anatomical structure of interest in the volumetric data set, e.g., blood within the interior of a blood vessel.

In accordance with the present invention, the appropriately programmed computer 50 then applies a segmentation algorithm of the sort well known in the art to segment out related structure within the patient-specific 3D database. Preferably computer 50 is programmed to apply a 3D connected component search through the volumetric data set contained in second section 40 of data storage device or medium 30 so as to determine the set of volumetric samples that are (i) within the range specified for blood, and which (ii) can be connected along a connected path back to one of the seeds, where each of the locations along the path is also within the range specified for blood. The result of this 3D connected component search is a set of 3D locations in the volumetric data set which correspond to blood flowing through the blood vessel. For the purposes of the present illustration, this set of 3D locations can be characterized as the "blood region". The segmented anatomical structure (i.e., the blood in the blood region) can then be highlighted or otherwise identified on each of the 2D slice images. See, for example, FIGS. 17A and 18A, where the segmented blood region in vascular tissue 205 has been cross-hatched to represent such highlighting.

Next, the branches in the segmented anatomical structure are identified. For example, and looking now at FIG. 19, in the present illustration dealing with vascular structure in the region of the aortic/iliac branching, the aorta and the two iliac branches would be separately identified.

This is done in the following manner. For each of the vessel segments that are part of the branching structure of interest, the user specifies a branch line in the volumetric data set that uniquely indicates that vessel segment. This is accomplished by using one or more of the input devices 55 to select, for each branch line, an appropriate "start" location on one of the 2D slice images contained within second section 40 of data storage device or medium 30, and an appropriate "end" location on another one of the 2D slice images contained within second section 40 of data storage device or medium 30. It should be appreciated that these branch lines do not need to cover the entire length of interest of the vessel and, in practice, will tend to stop somewhat short of the junction where various branches converge with one another. At the same time, however, for improved accuracy of modeling the branching structure, the branch lines should extend close to the bifurcation point.

For each of the vessel branches, the start and end locations are used to subdivide the blood region as follows: the region for that vessel branch is the set of locations within the blood region that are between the start plane and the end plane, where the start plane for each vessel branch is the 2D image plane passing through the start location for the corresponding branch line, and the end plane for each vessel branch is the 2D image plane passing through the end location for each vessel branch.

Figure 19:
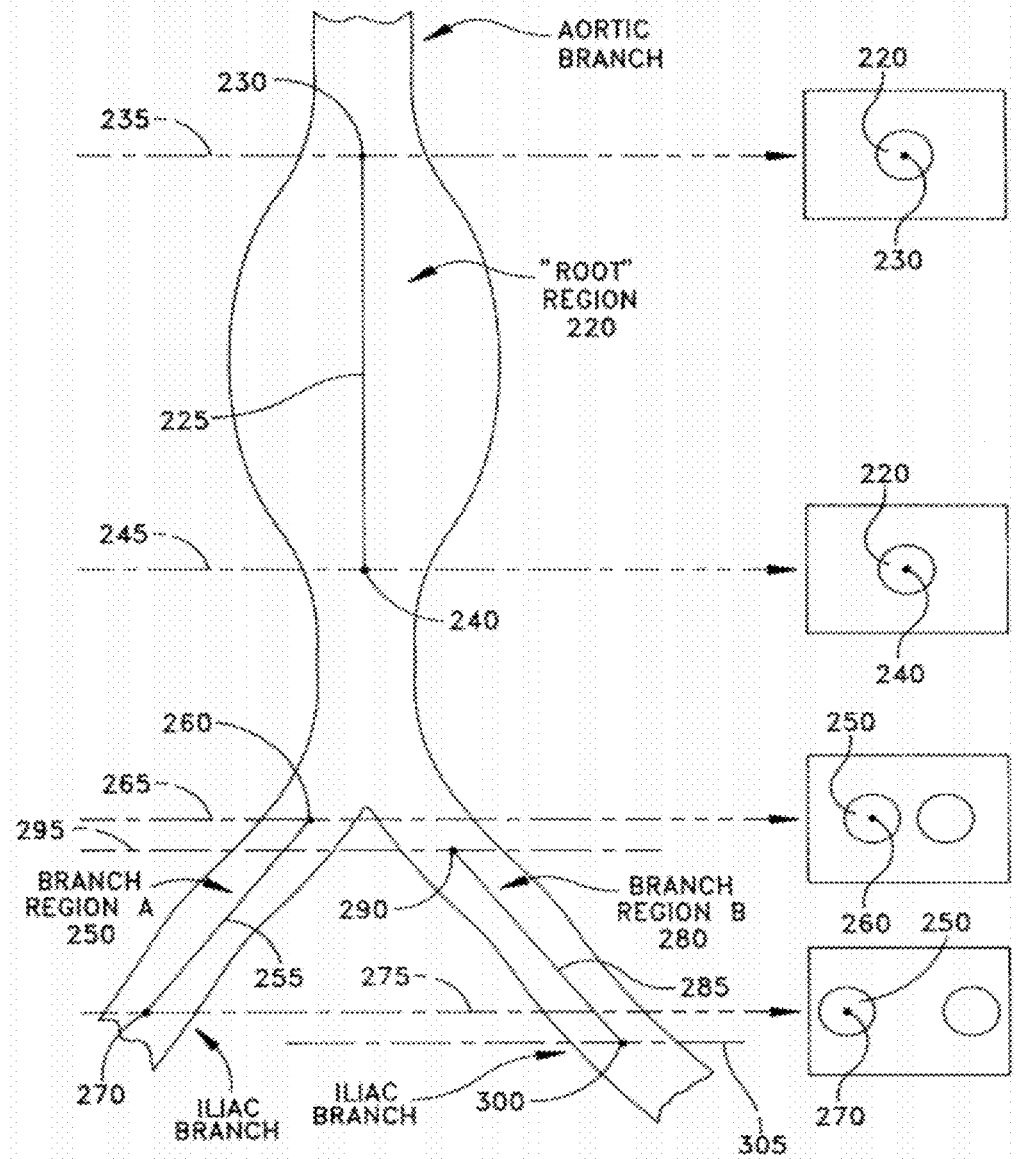
FIG. 19 is a schematic illustration showing that same patient's vascular structure in the region about the aortic/iliac branching, with branch lines having been specified for the patient's aorta and two iliac branches.

Although the invention could be used for a more complex branching structure through obvious extensions, it is useful to consider a vessel branch structure consisting of just three vessel segments coming together at a branch point, e.g., a vessel branch structure such as the aortic/iliac branching shown in FIG. 19. In this case, the user would designate one vessel region as the root region (e.g., the aortic region 220 defined by a branch line 225 having a start location 230 contained in a start plane 235, and an end location 240 contained in an end plane 245) and the other vessel regions as branch region A (e.g., the iliac region 250 defined by a branch line 255 having a start location 260 contained in a start plane 265, and an end location 270 contained in an end plane 275), and branch region B (e.g., the iliac region 280 defined by a branch line 285 having a start location 290 contained in a start plane 295, and an end location 300 contained in an end plane 305), respectively.

Figure 20:
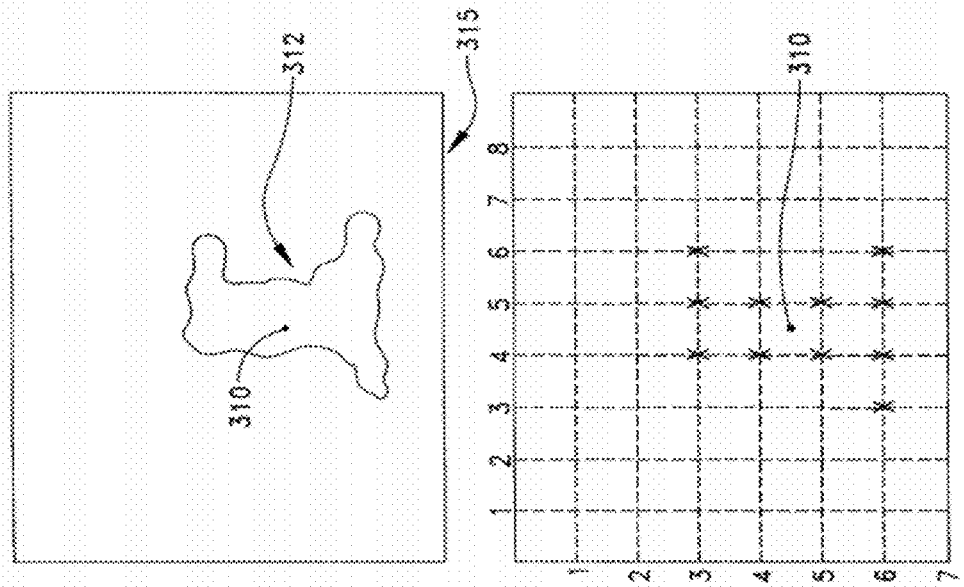
FIG. 20 is a schematic illustration showing how the centroid is calculated for the branch structure contained in a particular scanned 2D image.

For each of the vessel regions determined in the previous step, a centroid path is then calculated. This is accomplished in the following manner. First, at intervals along the vessel line corresponding to the volumetric location of each of the original 2D slice images contained in second section 40 of data storage device or medium 30, the centroid of the vessel region in that particular 2D slice image is calculated. This is done by averaging the image coordinates of all locations in that 2D slice image that are within the vessel region so as to yield a centroid point. See, for example, FIG. 20, which schematically illustrates the manner of calculating the centroid 310 for a representative vessel region 312 in a representative 2D slice image 315.

Figure 21:
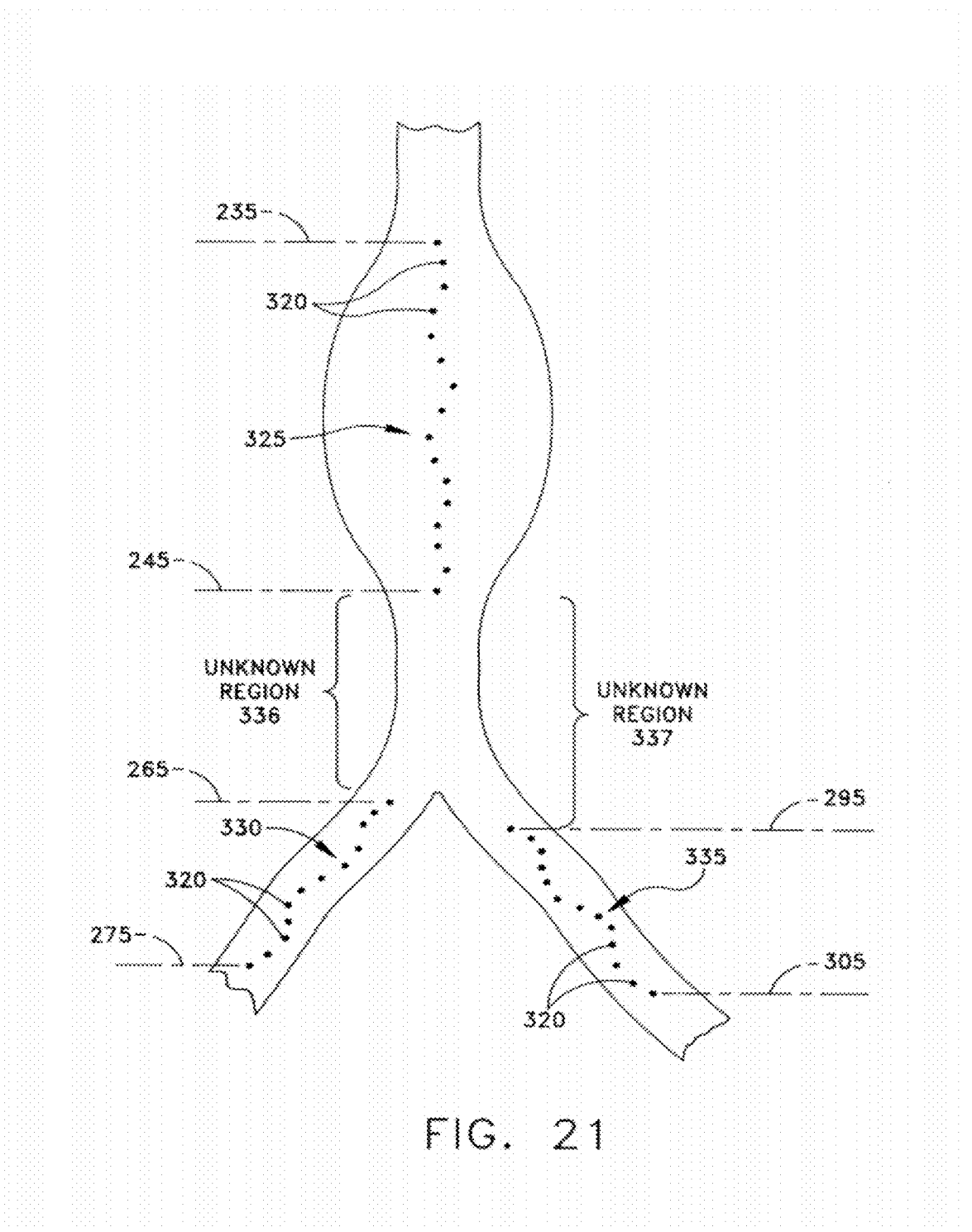
FIG. 21 is a schematic illustration showing the tortuous centroid path calculated for each of the respective branch lines shown in FIG. 19.

The centroid path for each vessel region is then established by the collective set of centroid points located along that vessel segment in three-dimensional space. The tortuous path corresponding to the root region is called the root centroid path and the tortuous paths corresponding to branch regions A and B are called branch centroid path A and branch centroid path B, respectively. See, for example, FIG. 21, which shows a plurality of centroids 320, a root centroid path generally indicated at 325, a branch centroid path A generally indicated at 330, and a branch centroid path B generally indicated at 335, all shown in the context of a vessel branch structure such as the aortic/iliac branching example discussed above. It is to be appreciated that no centroids will be defined in the "unknown" region 336 bounded by the end plane 245 and the start plane 265, and the "unknown" region 337 bounded by the end plane 245 and the start plane 295.

The system is programmed so that it will then apply a curve-fitting algorithm to the tortuous centroid paths determined above so as to supply estimated data for any portions of the anatomical structure which may lie between the aforementioned branch lines, and for "smoothing out" any noise that may occur in the system.

Figure 22:
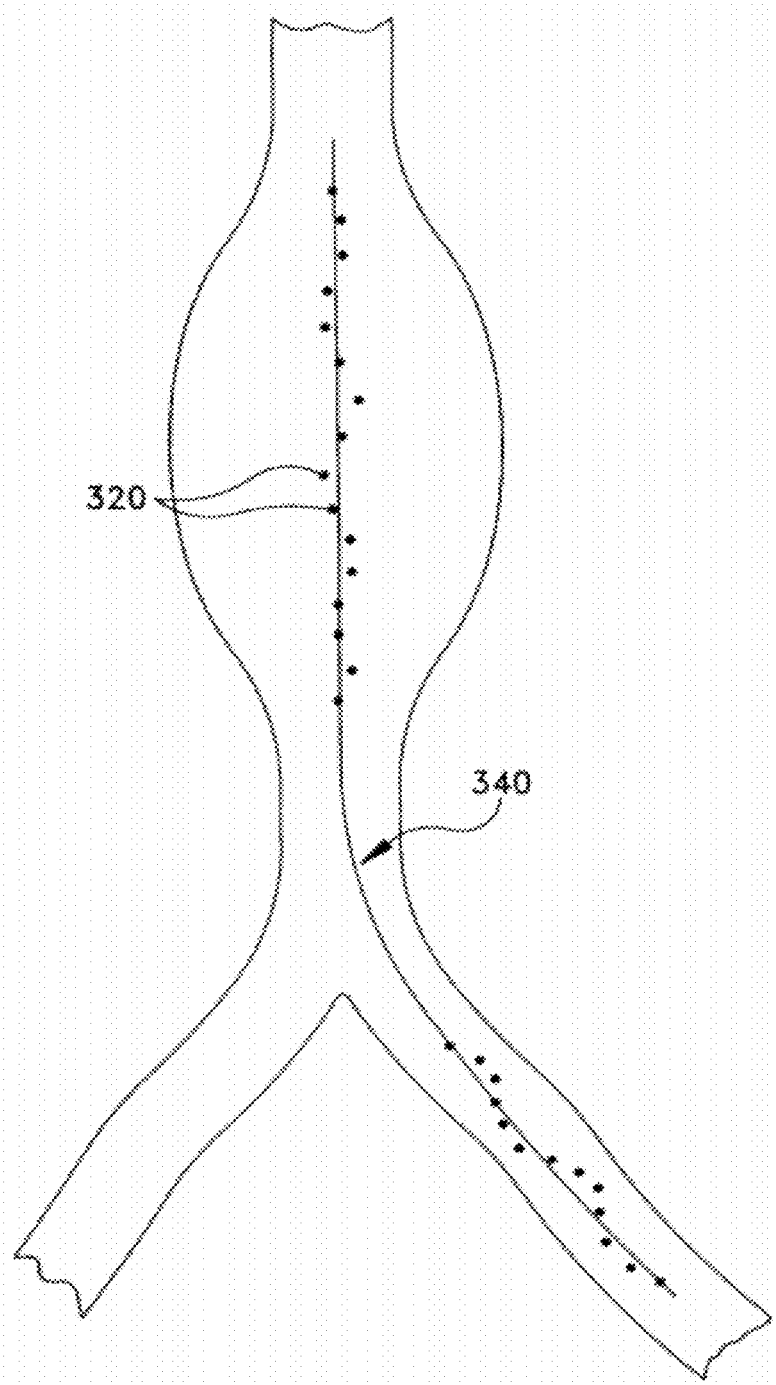
FIG. 22 is a schematic illustration showing the space curve determined by applying a curve-fitting algorithm to two of the centroid paths shown in FIG. 21, whereby the structure between the branch lines is filled out and the centroid data "smoothed" through a "best fit" interpolation technique.

This is preferably done through a spline fitting algorithm effected in the following manner. First, two new paths are created, by concatenating the points in the root centroid path 325 with the points in each of the two branch centroid paths 330 and 335, so as to create a path root-A and a path root-B. These two new paths are then used as the input to a spline fitting routine which selects the coefficients for a piecewise polynomial space curve that best approximates the points along the path in a least-squares sense. The number of pieces of the approximation and the order of polynomial may be varied by the user. The resulting curves may be called spline-root-A and spline-root-B. See, for example, FIG. 22, which illustrates the spline-root-B, generally indicated at 340.

Through numerical integration, the distance along the two splines (i.e., spline-root-A and spline-root-B) can then be calculated using standard, well-known techniques, and the result can be presented to the user. These calculations can be used for a variety of purposes, e.g., to help determine the appropriate size of a vascular prosthesis to be used in repairing an aneurysm at the aortic/iliac junction.

In addition, using well established mathematical techniques, at any point along the spline paths, a tangent vector and a perpendicular plane can be readily determined either by direct calculation or by definition in those cases where direct calculation would be undefined. By calculating the distance from the spline path to the points in the volumetric data set corresponding to the vessel branch region that are within an epsilon distance of the perpendicular plane, the shape of the vessel at that point can be determined, and the radius of a circle that best fits the cross-sectional area of the vessel at that point can also be readily calculated. Again, this result can be used to help determine that desired graft shape.

Figure 23:
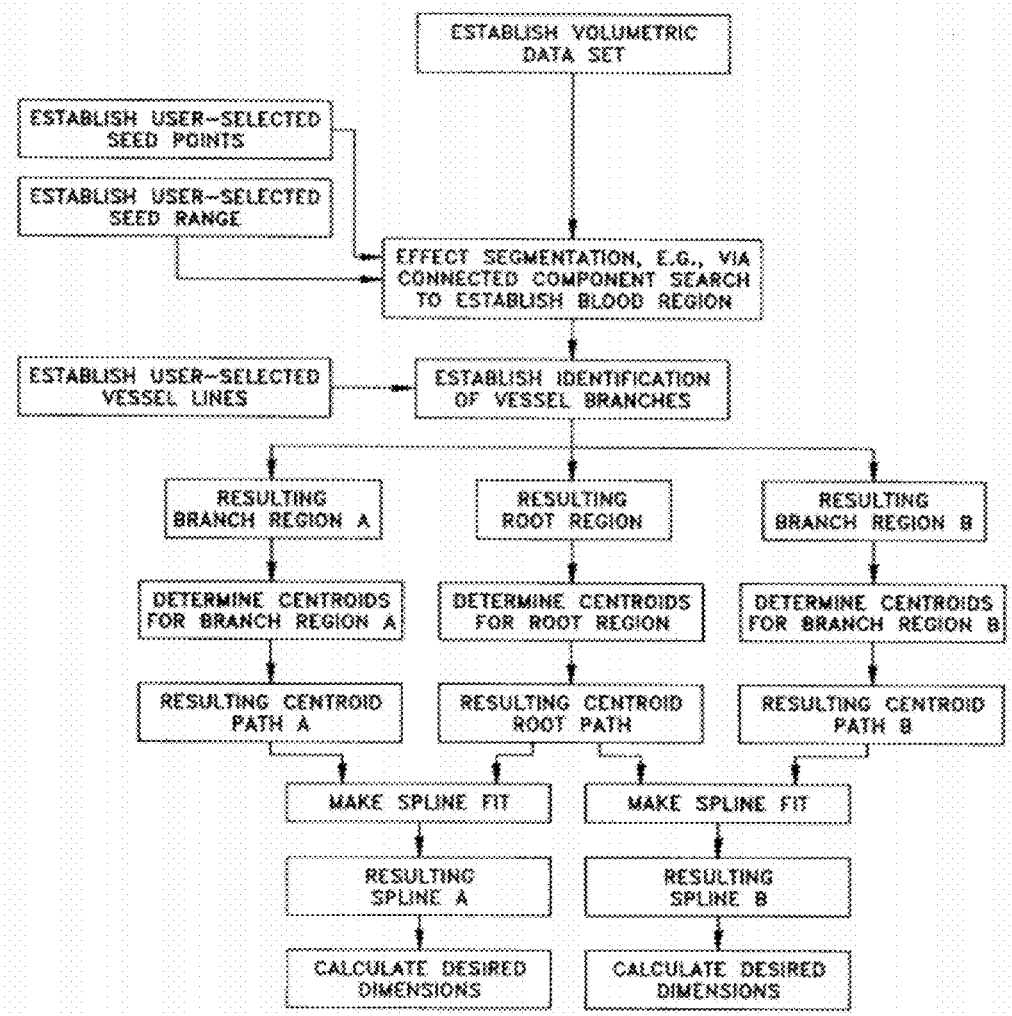
FIG. 23 is a flow chart illustrating how patient-specific anatomical dimensions can be determined from scanned 2D image data in accordance with the present invention.

FIG. 23 is a flow chart illustrating how patient-specific anatomical dimensions can be determined from scanned 2D data in accordance with the present invention.

In addition to the foregoing, it is possible to use the centerline derived above to generate additional views for the observer, and/or to make further anatomical calculations and measurements.

6. Oblique Slices Derived from the Centerline

Among other things, it is possible to use the centerline derived above to construct a series of oblique slices through the volumetric data set (which volumetric data set is formed out of the assembled scanned 2D slice images contained in second section 40 of data storage device or medium 30) such that the reconstructed oblique slices are disposed perpendicular to the centerline.

More particularly, oblique slices per se are generally well known in the art, to the extent that such oblique slices are arbitrary planar resamplings of the volumetric data set. However, the utility of these arbitrary oblique slices is limited for many applications, since there is no explicit, well-defined relationship between their position and anatomical structures of interest. By way of example, in the case of blood vessels, oblique slices taken perpendicular to the length of the blood vessel are of particular importance to the physician. However, when generating oblique slices using traditional techniques (e.g., by pointing with an input device 55 while viewing the display 60), it is very difficult for the physician to specify the oblique slice which is truly perpendicular to the blood vessel at a specified point. This problem is avoided with the present invention, which utilizes the centerline as derived above to generate the set of oblique slices lying perpendicular to the blood vessel. This set of oblique slices derived from the centerline is preferably stored in a fourth section 400 of data storage device or medium 30 (FIGS. 5 and 6).

In general, one way to think about generating any oblique slice is to consider a four-sided polygon that is placed in the space defined by the volumetric data set. This polygon is then scan converted to resample the axial images so as to generate the oblique slice desired. As used herein, the term "scan converted" is intended to refer to the well-known techniques of subdividing a polygon into regularly spaced intervals on a rectangular grid.

Figure 24:
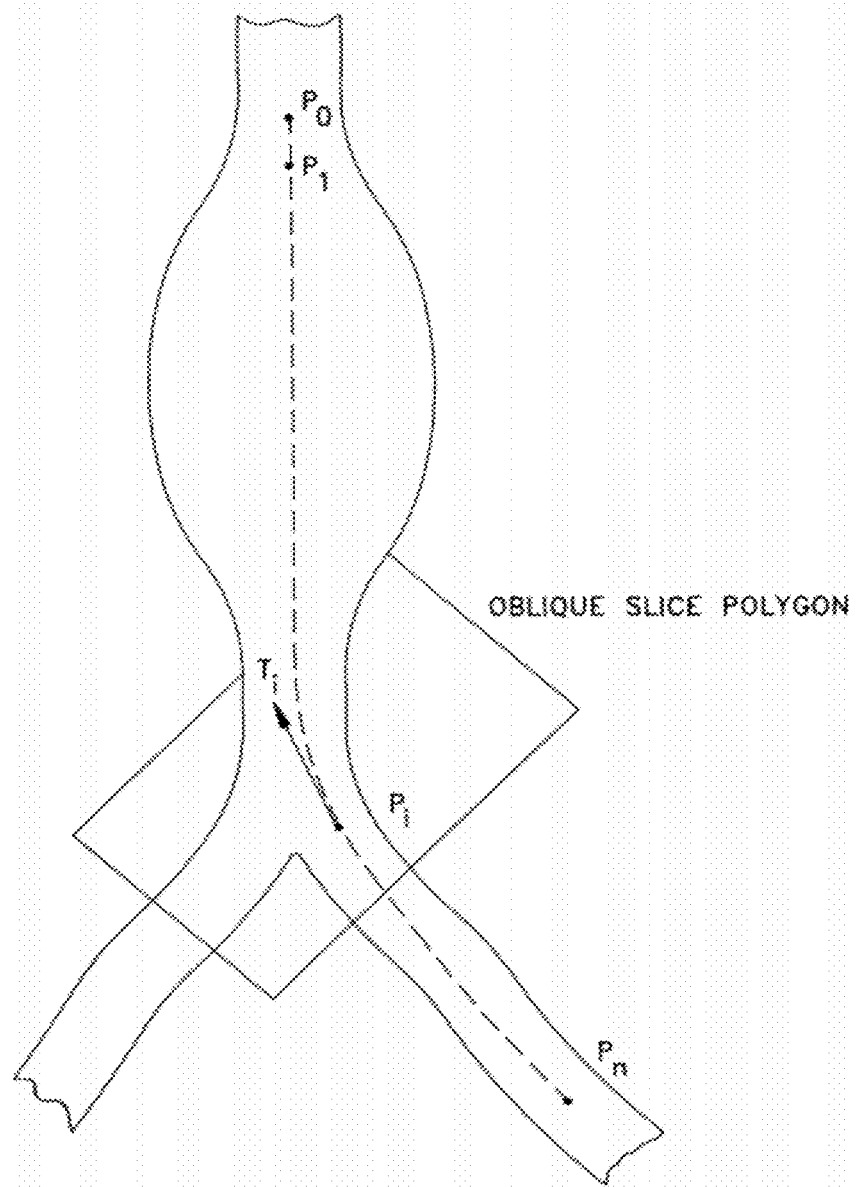
FIG. 24 is a schematic view showing an oblique slice polygon disposed perpendicular to the centerline of a blood vessel.

In the present invention a programmable computer is used to generate the specific set of oblique slices that is defined by the centerline derived above. This is accomplished as follows. First, the centerline is divided into n increments. This can be done with points $P_0, P_1, \ldots, P_n$, as shown in FIG. 24. A line $T_i$ is then derived for each of the points $P_i$, where $T_i$ is the tangent line at that point $P_i$. Finally a series of oblique slices are produced by constructing a series of four-sided polygons, each of which is centered at $P_i$ and normal to $T_i$. The locations of the corners of the polygon are selected such that the resulting image orientation is as close as possible to a preselected image orientation (e.g., axial). These four-sided polygons are then scan converted as described above so as to provide the set of oblique slice images lying perpendicular to the centerline. As noted above, this set of oblique slice images is stored in fourth section 400 of data storage device or medium 30. At the same time, the corner locations of each four-sided polygon associated with each oblique slice image is also stored in fourth section 400 of data storage device or medium 30, whereby the precise location of each oblique slice image within the volumetric data set is established.

As a result of the foregoing, the oblique slice images stored in fourth section 400 of data storage device or medium 30 is available to be accessed by computer 50 in exactly the same manner as the 2D axial slice images stored in second section 40 of data storage device or medium 30.

Furthermore, once the aforementioned oblique slices have been derived from the centerline, these oblique slices can then be used for a variety of additional purposes.

7. Measuring Diameters Along the Centerline

As noted above, the oblique slice images derived from the centerline can be accessed by computer 50 from fourth section 400 of data storage device or medium 30. The physician can then use input devices 55 to instruct computer 50 to access the oblique slice at a particular location along the blood vessel and measure the diameter of the same. In particular, the physician can use input devices 55 to access the particular oblique slice desired and then lay down two diametrically-opposed marks so as to define the diameter of the blood vessel; the computer is adapted in ways well known in the art to then calculate the distance between the two marks. In this respect it should be appreciated that since the aforementioned oblique slice images are, by definition, taken perpendicular to the blood vessel at each point along the blood vessel, the blood vessel diameters so measured will tend to be much more accurate than diameters calculated solely off axial slice images, and/or off coronal and/or sagittal and/or "standard", non-centerline-derived oblique slice images.

8. Measuring Distances with a Cumulative Sum Table

It has also been found that it can be advantageous to store the incremental distances between the centerline points $P_1$, $P_2, \ldots, P_n$ in a cumulative sum table in which the first entry, $C_0$, is 0; the second entry, $C_1$, is the distance between $P_1$ and $P_0$ (i.e., $C_1=P_1-P_0$); the third entry $C_2=C_1+(P_2-P_1)$; etc. Thus, the centerline distance between any two points $P_i$ and $P_j$ is simply $D_{ij}=C_i-C_j$.

Figures 25, 26:
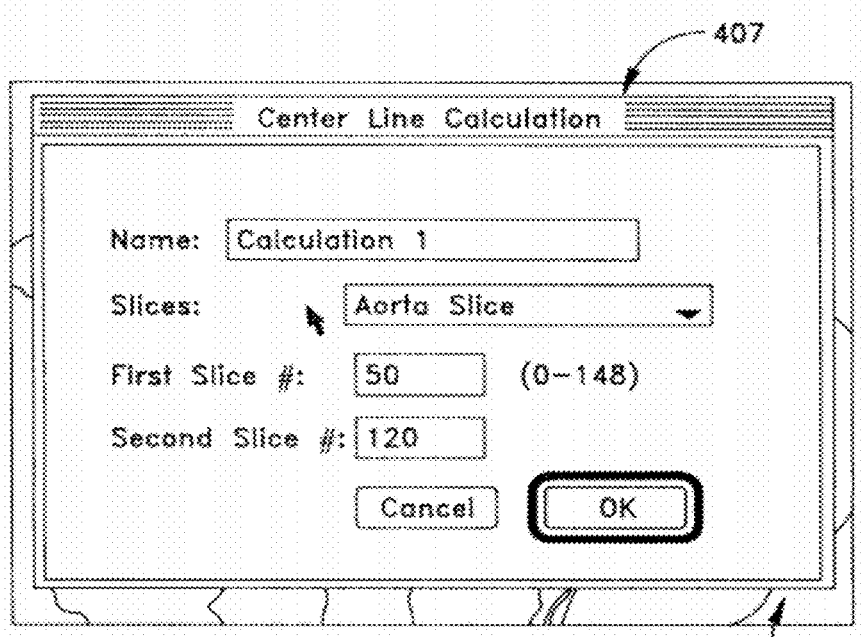
FIG. 25 is a cumulative sum table for calculating lengths along an anatomical structure.
FIG. 26 illustrates a centerline length calculation dialogue box drawn to a window in a display.

In the present invention, the cumulative sum table can be of the sort shown in FIG. 25. This cumulative sum table is preferably stored in a fifth section 405 of data storage device or medium 30 (FIGS. 5 and 6). Computer 50 is also programmed so that the user interface presents a centerline length calculation dialogue box 407 (FIG. 26) to the physician on display 60, by which the physician can specify (using input devices 55) two oblique slice images which are the end points of the length which is to be determined. Computer 50 is programmed so that it will then determine the length between the two chosen oblique slices by calculating the difference in their positions from the cumulative sum table.

Figure 27:
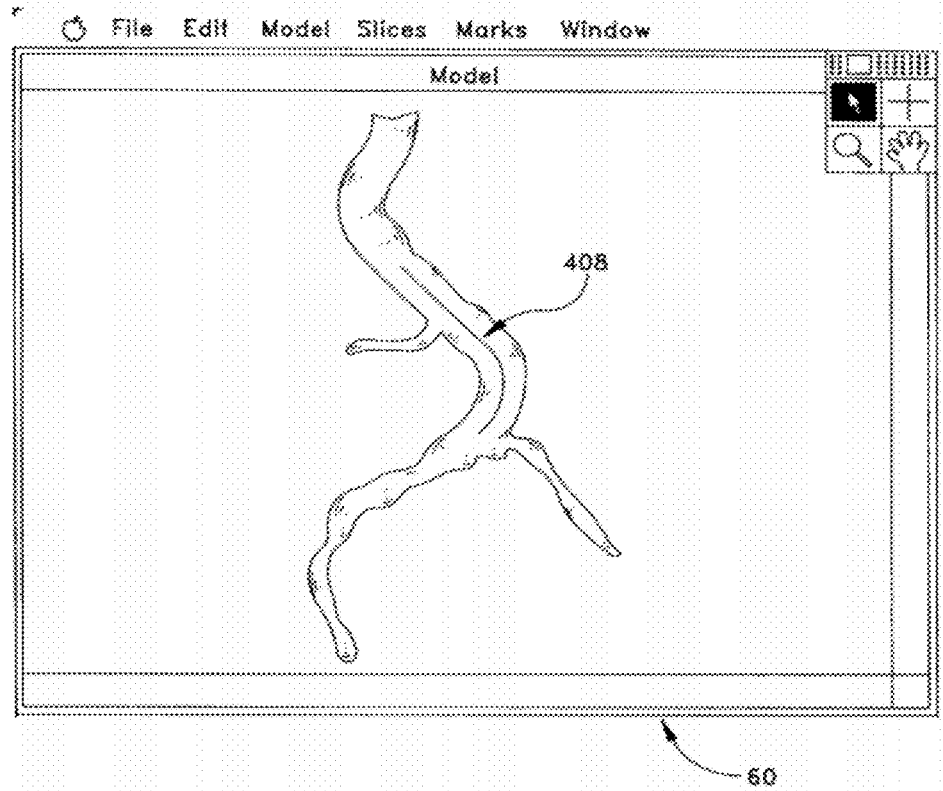
FIG. 27 illustrates a 3D graphical icon which has been inserted into the 3D model and which is visible on the display so as to show the portion of the centerline which has been specified by the physician for a length calculation.

Computer 50 is also programmed so that a 3D graphical icon 408 (FIG. 27) is inserted into the 3D model contained in first section 35 of data storage device or medium 30. This icon represents the portion of the vessel centerline which has been specified by the physician via the two oblique slice images which represent the length end points.

9. Calculating Volumes Using a Cumulative Sum Table

A cumulative sum table can also be used to calculate volumes with respect to an anatomical structure, in much the same way that a cumulative sum table can be used to calculate lengths along an anatomical structure. However, incremental slice volumes are more appropriately calculated in the axial direction rather than in the oblique slice direction. This is because the axial slices all lie parallel to one another, whereas the oblique slices (since they are generated from the centerline) do not.

Figures 28, 29:
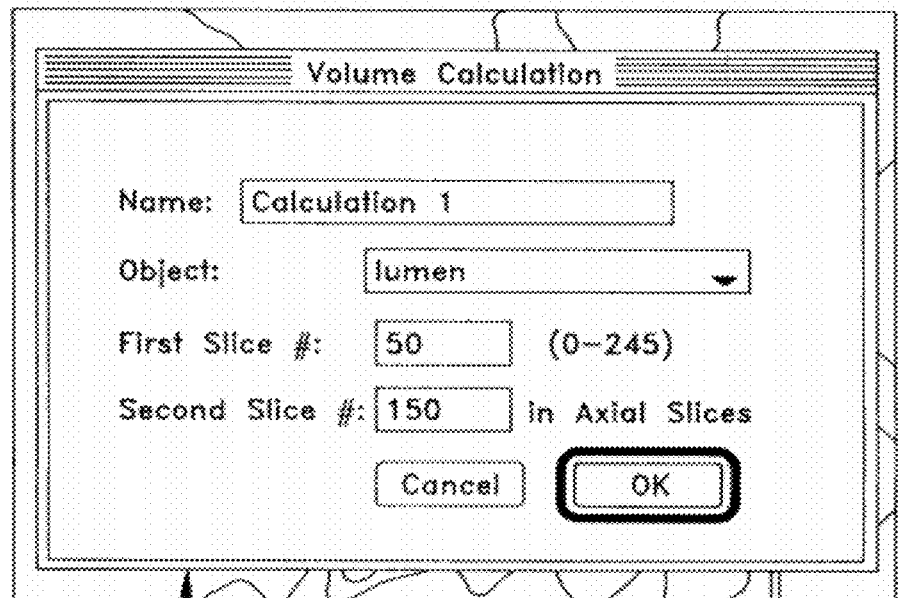
FIG. 28 is a cumulative sum table for calculating volumes with respect to an anatomical structure.
FIG. 29 illustrates a volume calculation dialogue box drawn to a window in a display.
Figure 30:
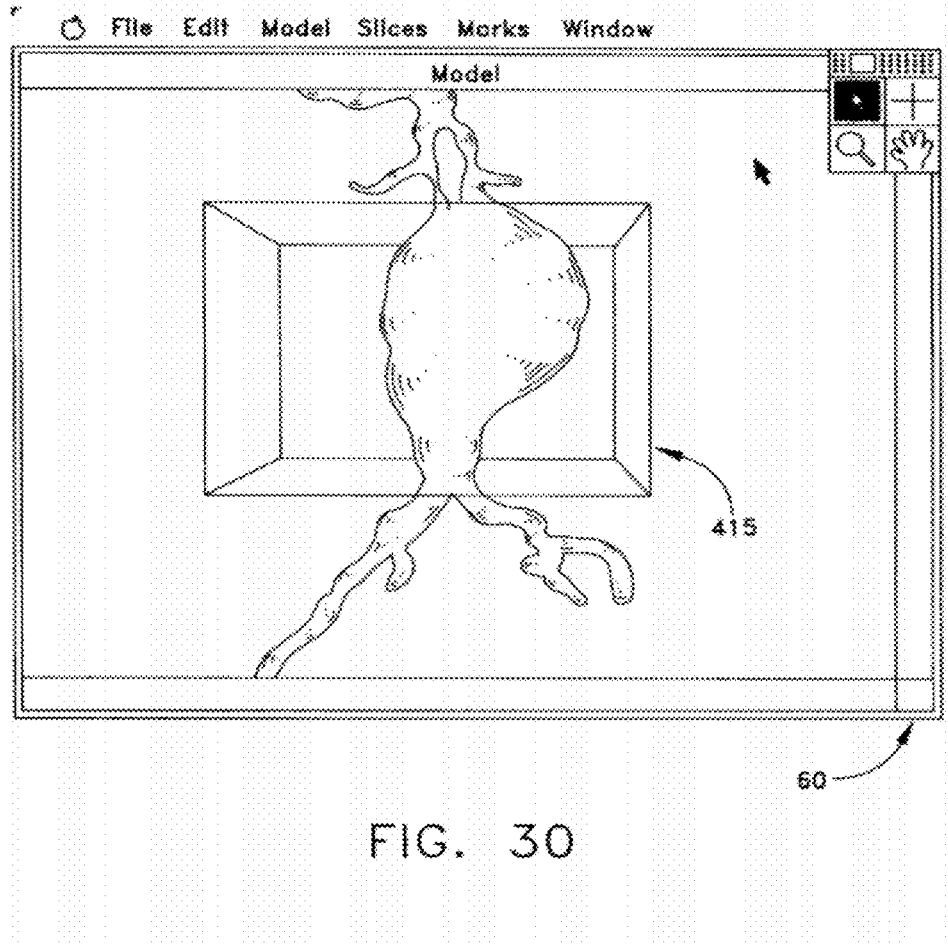
FIG. 30 illustrates a 3D graphical icon which has been inserted into the 3D model and which is visible on the display so as to show the volume which has been specified by the physician using the volume calculation dialogue box.

To this end, a computer is used to calculate the volume of each axial slice, $V_i$, by (1) determining the number of pixels in the segmented region of that axial slice, (2) scaling by the appropriate pixel-to-length factor, and then (3) multiplying by the slice thickness. A cumulative sum table is then generated, where the first entry, $C_0$, is $V_0$; the second entry, $C_1=C_0+V_1$; the third entry $C_2=C_1+V_2$; etc. In the present invention, this cumulative sum table can be of the sort shown in FIG. 28. This cumulative sum table is stored in sixth section 410 of data storage device or medium 30. Computer 50 is also programmed so that the user interface presents a volume calculation dialogue box 412 (FIG. 29) to the physician on display 60 that allows the physician to conveniently specify two axial slices as the end points of the volume to be determined. Computer 50 then calculates the volume for the region specified, using the cumulative sum table. Computer 50 is also programmed so as to place a 3D graphical icon 415 (FIG. 30) in the 3D model contained in the first section 35 of data storage device or medium 30. This icon represents the volume specified by the physician using the volume calculation dialogue box.

10. Virtual Grafts

In the preceding description, anatomical 3D computer models were created from software objects representing anatomical objects (e.g., a first software object to represent a liver, a second software object to represent an aorta, etc.); and additional software objects were created to represent non-anatomical objects (e.g., markers 85, margins 105, boundaries 110 and graphical icon 408); and the various software objects (representing both anatomical and non-anatomical objects) were placed into proper registration with one another using techniques well known in the art so as to form a cohesive database for the application program's image rendering software. Accordingly, the program's image rendering software can render images showing both anatomical objects and non-anatomical objects from various points of view, with the anatomical objects and the non-anatomical objects being in proper registration with one another.

In this respect it should be appreciated that it is also possible to create further software objects, in addition to those anatomical objects (e.g., liver, blood vessels, etc.) and non-anatomical objects (e.g., markers 85, margins 105, boundaries 110 and graphical icon 408) disclosed above, and to place those additional objects into the system's database for selective viewing by the system's image rendering software.

Of particular significance is the ability to create software objects representing surgical (including implantable) devices, and to place such software objects in registration with software objects representing a patient's anatomy, in advance of an actual surgery, whereby to enhance appropriate implant selection and facilitate surgical planning.

Figure 31:
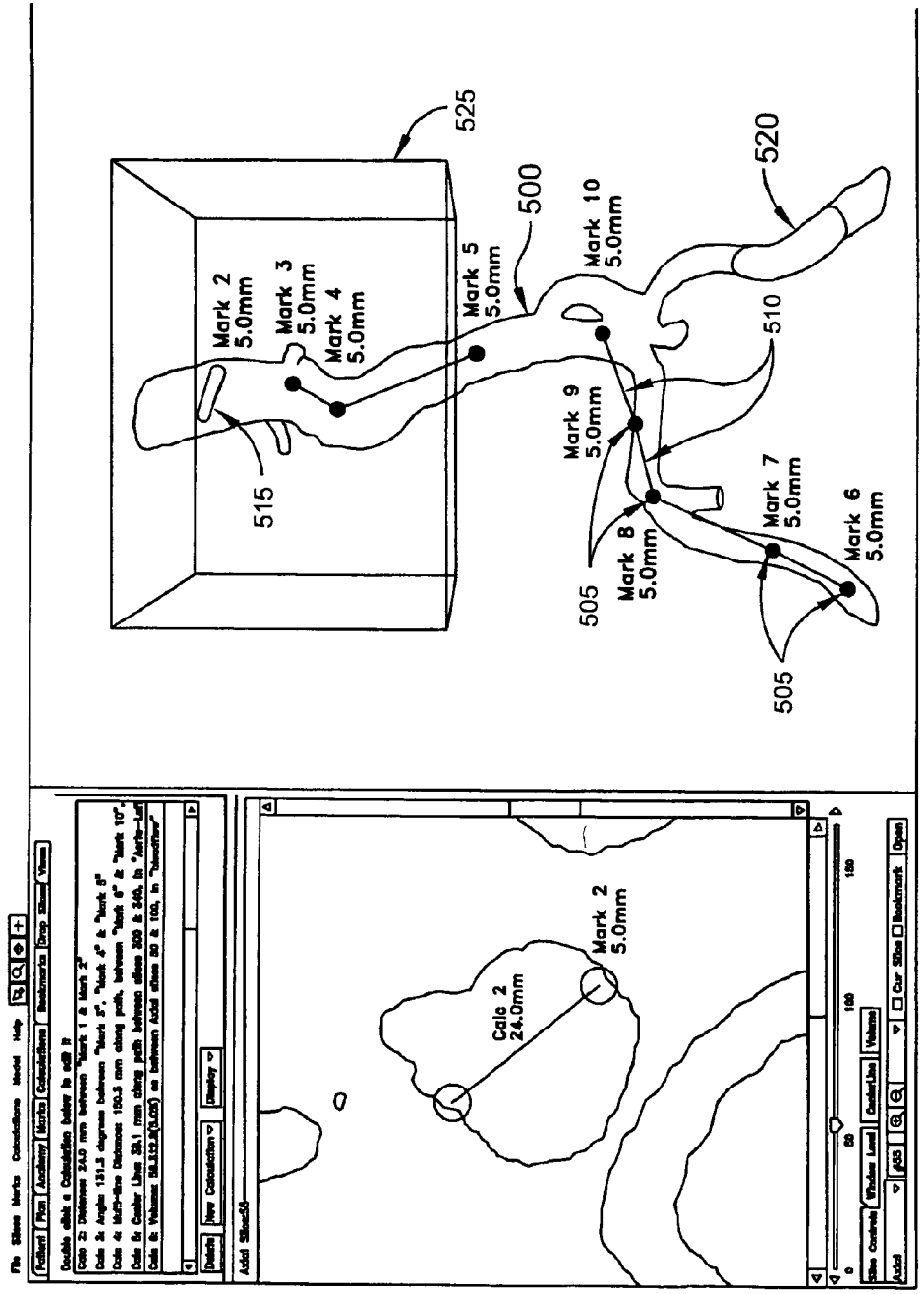
FIG. 31 is a schematic representation of a software object representing the aorta of a patient.

By way of example, and looking now at FIG. 31, there is shown a software object 500 representing the aorta of a patient. Also shown is a series of markers 505 placed into the system (e.g., by a human operator using a mouse) and a series of line segments 510 extending between selected ones of the markers 505. These markers 505 and line segments 510 may be used to plan a surgical procedure, to determine anatomical lengths or angles, etc.

Also shown is a straight tube 515 which may also be used for planning and measurement purposes, etc., a curved tube 520 which may be used for planning and measurement purposes, and a box 525 which may be used for planning and measurement purposes, e.g., for volume calculations.

Figure 32:
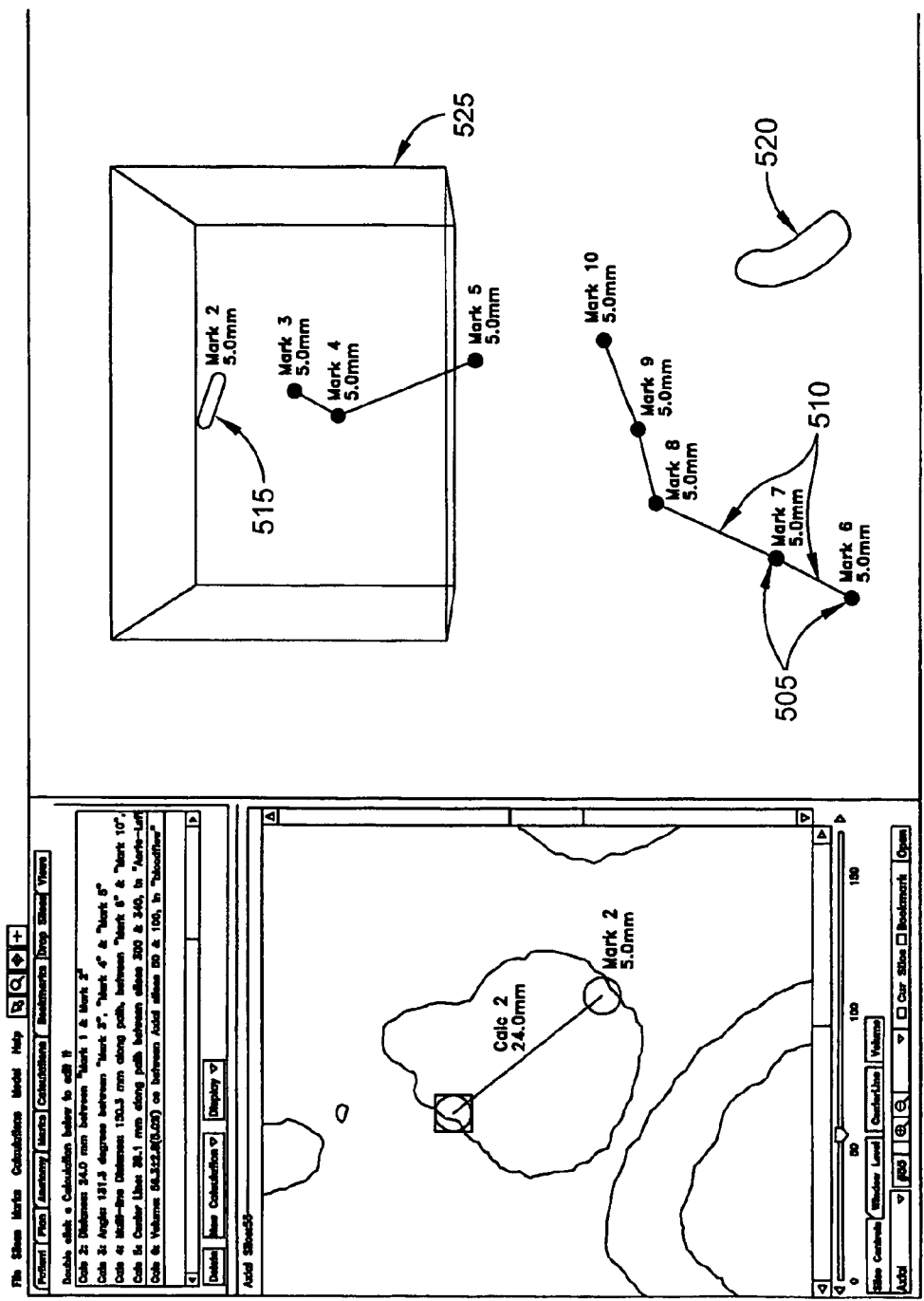
FIG. 32 is a schematic representation of the software object of FIG. 31 in which the aorta has been rendered transparent.

FIG. 32 is similar to FIG. 31, except that aorta 500 has been rendered transparent.

In addition, other geometric elements such as curved lines, intersecting lines, etc. may also be provided for planning and measurement purposes.

Figure 33:
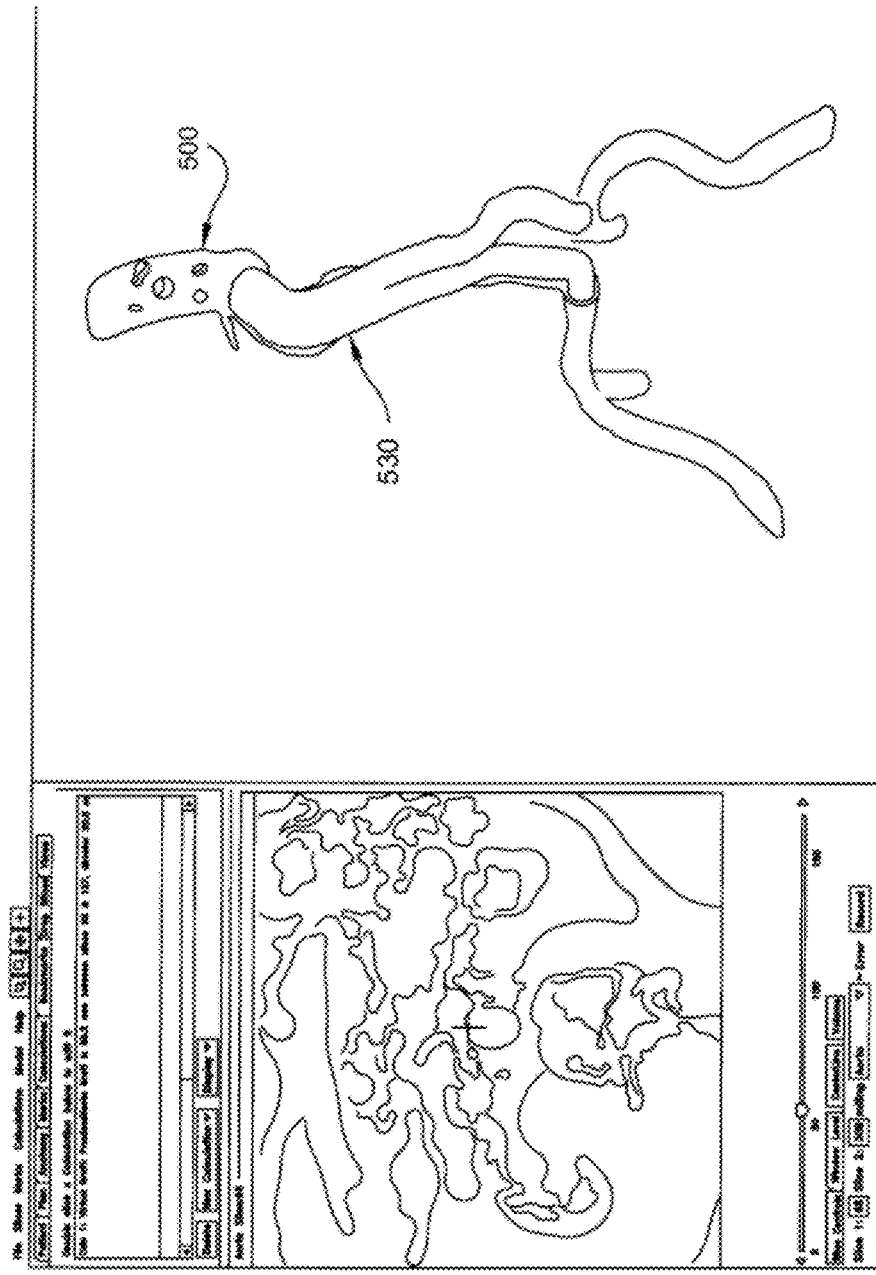
FIG. 33 is a schematic representation of a virtual graft deployed in the aorta of FIG. 31.

Significantly, it is also possible to insert into the system software objects representing virtual grafts, virtual implants, virtual devices, etc. By way of example, in FIG. 33 there is shown a virtual graft 530 which represents an arterial stent which may be deployed in the aorta, e.g., to treat an aortic aneurysm.

Figure 34:
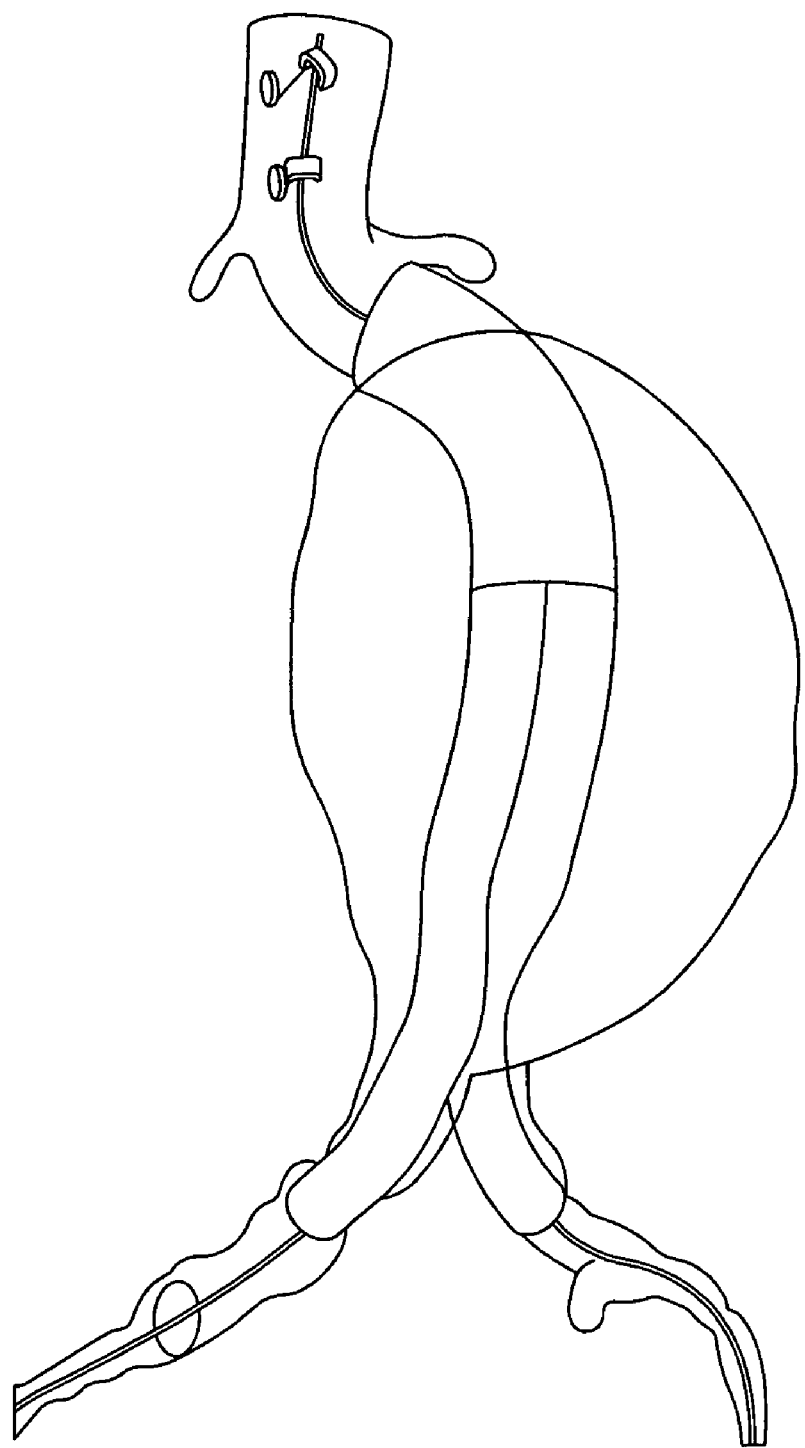
FIG. 34 is a schematic representation of a virtual graft deployed in the aorta.

11. Virtual Grafts (VG's), Manufacturer Specific Virtual Grafts (MSVG's), Twisteroo™, Native Iliac Rotation (NIR) and TwisterooNIR™ Click-Drag Distance Calculation and Mark Name/Type Dichotomy 11.1 Virtual Grafts (VG's). Looking next at FIG. 34, in simpler versions of the aforementioned Virtual Graft (VG) for aortic stent applications, users are able to place idealized tubes into the aorta model. The VG helps users visualize what the surgery will look like and stems from the more basic Centerline Calculations discussed above.

In one simple preferred construction, a VG consists of three tubes arranged like a pair of pants. One of these tubes represents the "trunk" of a bifurcated stent graft and the other two tubes represent the legs. Users are able to define the length and diameter of the three tubes but, in this simpler version of the system, must perform calculations on their own to calculate the overlap that is used in placing the parts during surgery. With this form of the invention, it is essential that the doctors be familiar with the dimensions of the product offerings from all Abdominal Aortic Aneurysm (AAA) implant manufacturers, because the doctors must add the lengths of the pieces themselves, account for overlap, etc.

11.2 Manufacturer Specific Virtual Grafts (MSVG's). In a more sophisticated form of the invention, Manufacturer Specific Virtual Grafts (MSVG) allow users to select and visualize actual stent graft devices within patient-specific 3D anatomy. This MSVG feature simplifies and enhances the vascular surgeon's experience in fitting an endoluminal implant in three principal ways.

(i) Accurate Graft Information. First, the user does not have to remember the graft pieces available from a given manufacturer. With the MSVG graft designer, users simply choose from a list of all available pieces for their chosen manufacturer. For example, rather than having to remember that W.L. Gore Excluders come in a 23 mm by 14 mm by 160 mm size with a product code of "PCT231216", the user will be able to choose this part from a list of all W.L. Gore parts and the software system will both display the correct piece and keep track of the selected part number. This feature prevents users from recording the wrong values and speeds their ability to evaluate how different parts will work in the anatomy. The software system internally keeps a catalog of manufacturer product codes, part geometries and compatibility criteria from component to component.

Figure 36:
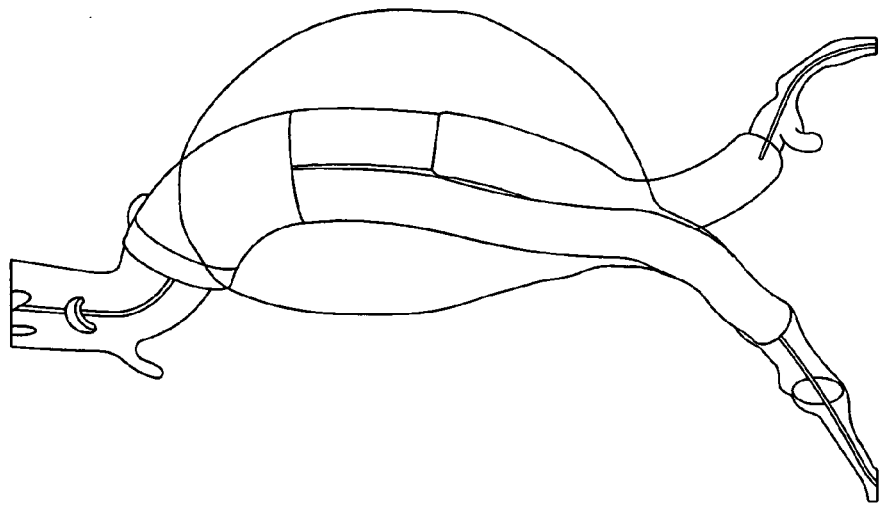
FIG. 36 is a schematic representation of a Manufacturer Specific Virtual Graft (MSVG) after docking of contralateral limb.
Figure 35:
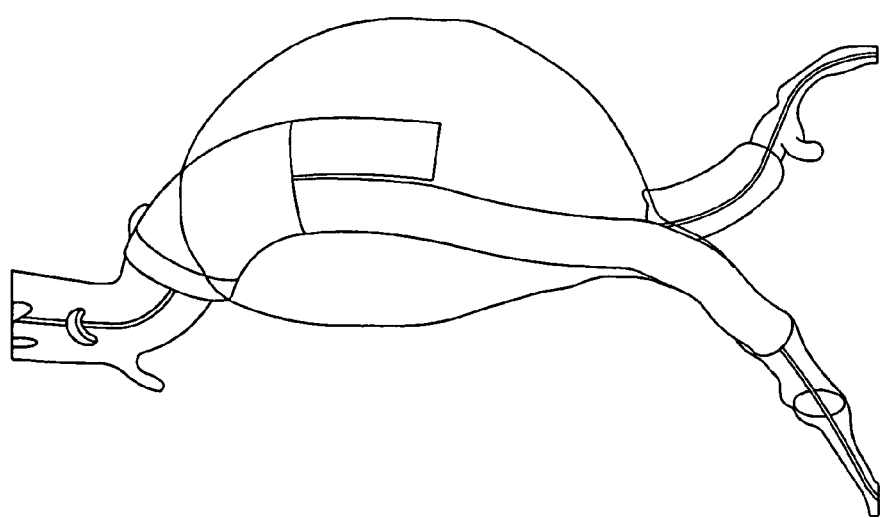
FIG. 35 is a schematic representation of a Manufacturer Specific Virtual Graft (MSVG) before docking of contralateral limb.

(ii) Detailed Graft Visualization. A second, and perhaps most important advance with the MSVG, is the more detailed representation of the grafts. Because endovascular AAA repair is a surgery that generally requires more than one surgical device to be implanted in the anatomy, the MSVG feature is also able to model multiple graft parts at one time, as well as the interaction of their overlap. AAA surgery usually requires, at the minimum, a separate stent graft or "docking limb" to be inserted up the contralateral side of the patient and deployed inside the previously-deployed bifurcated piece. See FIGS. 35 and 36, which show an MSVG before and after docking of a contralateral limb.

For most endovascular surgeries with docking limbs, it is important for the doctor to understand how much the pieces overlap because this distance is important to reduce the risk of slippage and/or endoleak. Each manufacturer will typically specify the amount of overlap that is required to safely deploy a given component pair. The software system is, in one preferred embodiment, able to model up to 9 different graft devices in the same patient, specifically: 1 bifurcated piece, 1 contralateral leg, 6 extenders and 1 aortic extender. To represent this aspect of surgery, the MSVG feature colors the pieces differently based on the amount they overlap each other and their respective sizes. See FIG. 37. The "yellow zone" in the figures represents "over-sizing" which is similar to the physical overlap but is, in some ways, a more accurate way to understand the interaction. More particularly, it can be a more useful indicator because it represents the amount of surface-to-surface contact that the pieces will have when deployed and this over-sizing is often what actually holds the pieces together.

Figure 37:
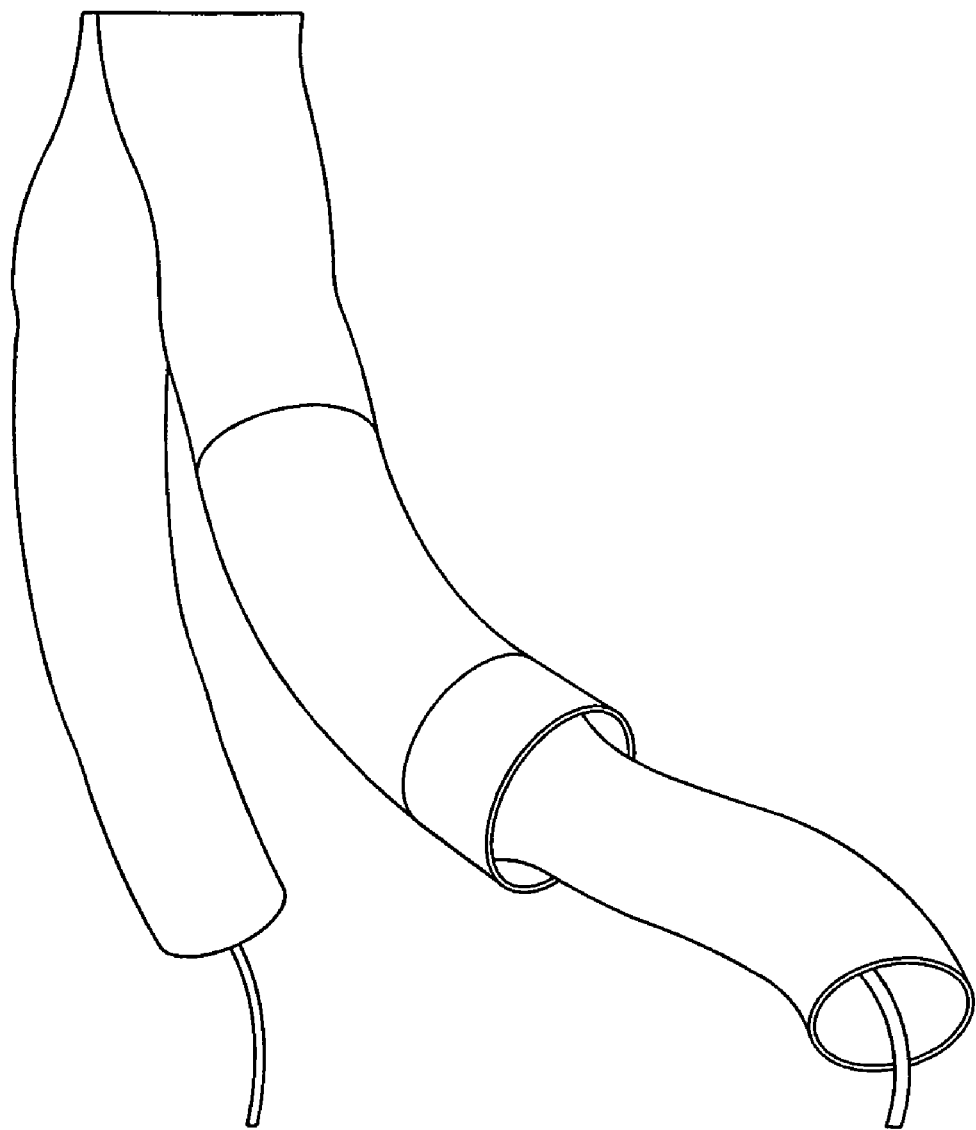
FIG. 37 is a schematic representation of a Manufacturer Specific Virtual Graft (MSVG), with the yellow zone representing "oversizing"

The difference between overlap and "over-sizing" can be seen in FIG. 37. Here there is a contralateral leg with a smaller, tapered, extender. Again, the yellow zone represents overlap, but note that the yellow zone does not extend all the way to the bottom of the leg. This is because the extender piece that has been inserted tapers to a diameter smaller than the enclosing piece. When this occurs, the extender piece will not actually press against the inside walls of the enclosing piece and thus will not be over-sized.

There are three additional significant improvements to the graft representations in a preferred MSVG feature. First, the grafts can have variable diameters along their lengths. These increasing or decreasing tapers come directly from the manufacturer specifications and are quite detailed. For example, a bifurcated piece such as the one in FIG. 35 can have a diameter change along the length of its leg, allowing for a "bell-bottomed" or tapered leg. While not all manufacturers' pieces will include such a diameter change, those that do are now modeled more precisely.

The last two visualization features are the inclusion of a representation for graft hooks and the ability to make a graft transparent. Graft hooks, which are typically metal prongs used to secure a graft to the blood vessel, can be displayed using the MSVG simulator as a red circle around the end of the graft. This allows doctors to judge the hook's location relative to the anatomy. Finally, transparent grafts can be used with a visible anatomy to judge the "over-sizing" of a graft relative to both the blood flow anatomy and the thrombus.

(iii) Increased Reliability. The third way that the MSVG enhances the user's experience is through the increased reliability of the system. From beginning to end, the user is aided in choosing the right parts and is less prone to transcription errors from planning to surgery, or problems that can arise due to incompatible parts.

Figure 38:
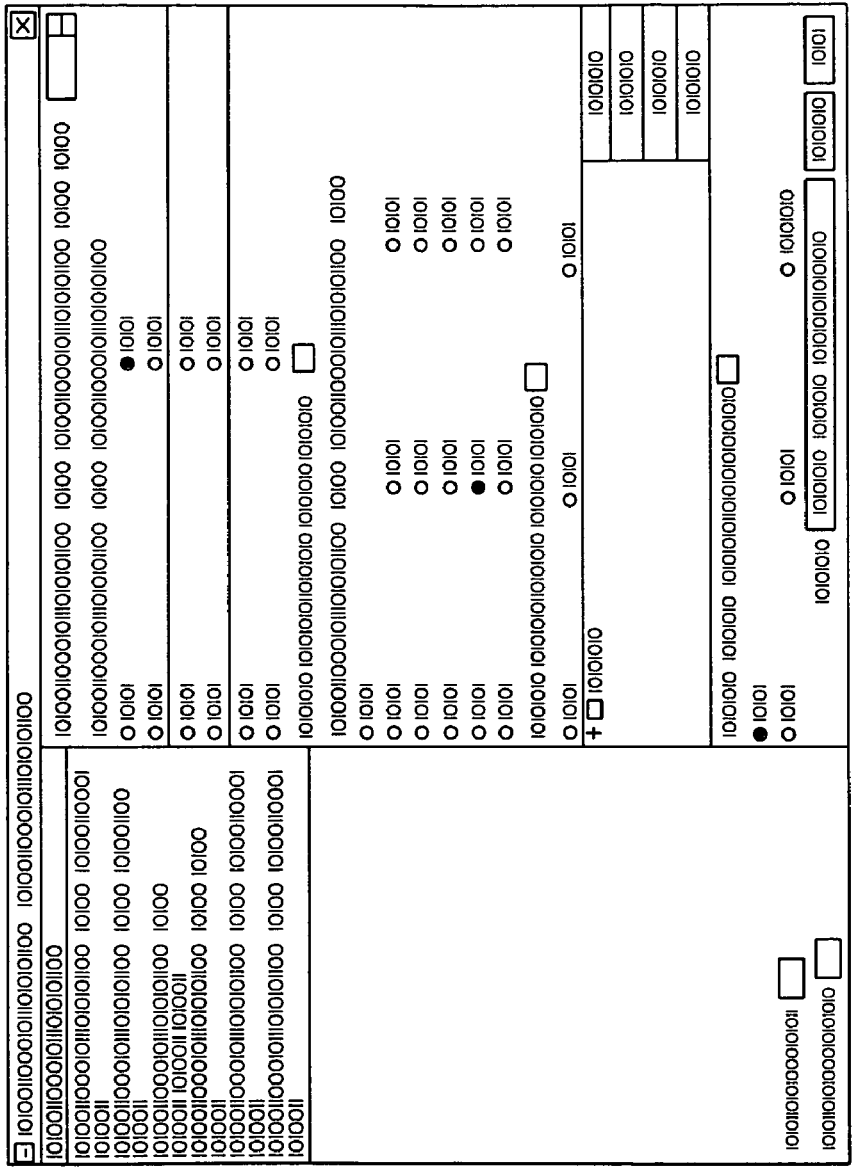
FIG. 38 is a schematic representation of a Manufacturer Specific Virtual Graft (MSVG) Designer.

Increased reliability starts with the new MSVG Designer (see FIG. 38). First of all, the Designer displays all of a user's relevant measurements from their session in the left hand pane. In the right hand pane, there is a list of bifurcated pieces sorted horizontally by length, vertically by iliac diameter and sectioned vertically by aortic diameter. There is also a list of contralateral legs and a tree for iliac extenders. All of the buttons dynamically change their enabled status depending on the user's selections. This interaction implies that checking is performed to make sure that all selected sizes are compatible. The MSVG Designer also checks to make sure that all of the indicated overlaps are within the manufacturer's guidelines for required overlap. The Designer software adds up the length of both the contralateral and ipsilateral sides, subtracting overlaps and displays this number in the two length boxes at the bottom left hand side of the measurement panel. The MSVG Designer also includes a cascading list for selecting the amount of "Twisteroo™" for the graft. This feature is discussed in detail below.

After the user clicks "Build", the program runs final checks to make sure that the selected grafts will display properly in the anatomy. If these pass, it is then on to the visualization module, where the product codes are turned into images and used as texture maps for the 3D creation of the graft. In this way, the vascular surgeon can tell immediately by looking at the Model Window which manufacturer components are being displayed.

In the Product Listing page (see FIG. 39), the user can add any more parts to include in their plan. Different endovascular devices require different sized sheaths for deployment, so users can also include these in the Product Listing dialog. Because all surgeries generally require these sheaths, this page will of course warn users of any attempt to continue without ordering sufficient and correctly sized sheaths.

Figure 40:
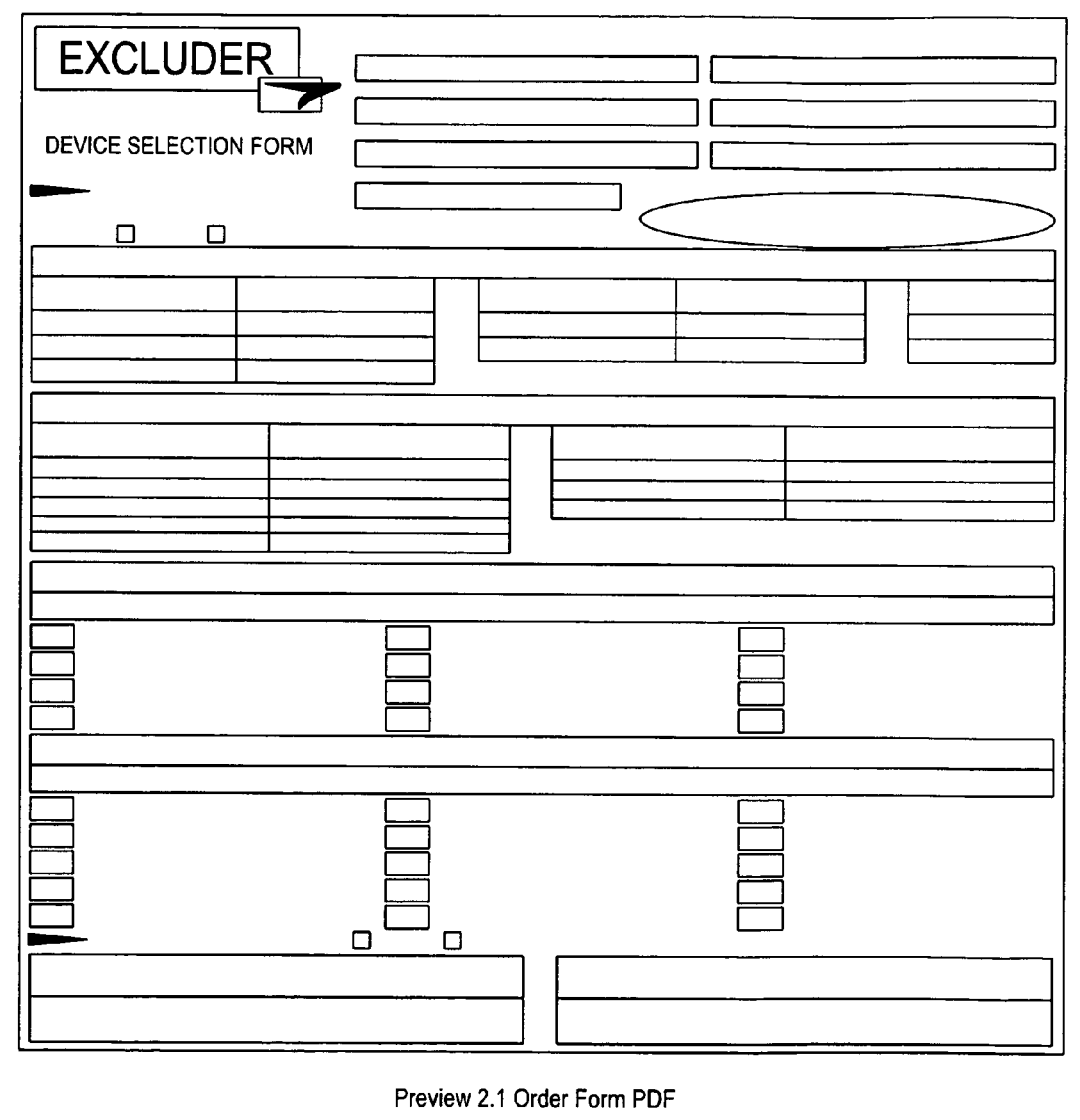

Finally, the desired graft component quantities are transferred via the Internet to a remote server where they are inserted into an Adobe PDF form (see FIG. 40) which is then kept with the model information on a remote server. This form is accessible over the Internet so that users can print it out and send it in, or use it for later reference. Further, the information for the desired graft can be sent directly to the stent graft manufacturer as part of an automated supply chain management system.

This order form is the completion of the validated and reliable transfer of information from the graft manufacturers' internal specifications, to the MSVG Designer, to the visualization module and finally to component order fulfillment. This entire process has been designed to prevent the errors caused by either working with incorrect data, not understanding specifications properly, and/or mistyping or otherwise confusing catalog items, from start to finish.

11.3 Twisteroo™. During endovascular AAA repair, a common surgical technique is to rotate the proximal end of the bifurcated endoprosthesis before it is deployed and then to pass the contralateral leg, either anterior or posterior, to the bifurcated leg before docking it. This technique is popular for many reasons. In some anatomies, it allows for a straighter shot out of the iliacs, making for an easier surgery. Some doctors also feel that it can either improve the device seal or can reduce the pressure from the blood flow on the graft. It can also simply be a useful method of deploying a graft to take up some of the "slack" in the limbs. By forcing a graft into a twisted configuration, it will presumably take a longer path, effectively shortening its run down the iliacs. This can be especially pertinent when occlusion of the internal iliac artery is a concern.

Previously, there has been no way for a surgeon to model this technique in a pre-operative effort to visualize the resultant graft paths or to gauge the effective "shortening" that this technique will have on the overall length of the graft. With the Twisteroo™ feature, users now have a tool to model various degrees of graft twist within a 3D reconstruction of the anatomy.

Figure 42:
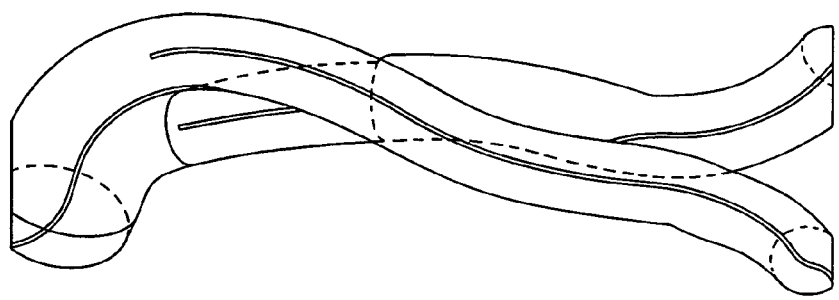
FIG. 42 is a schematic representation of a resultant MSVG.
Figure 41:
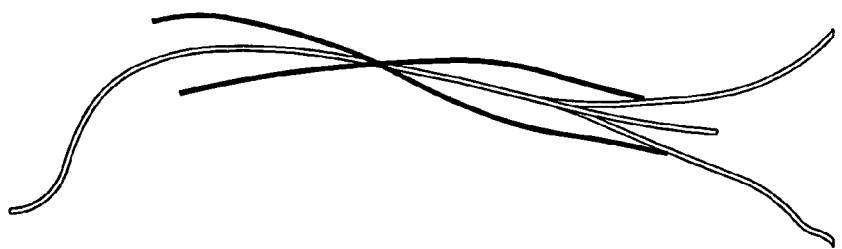
FIG. 41 is a schematic representation of "Twist Lines"

The Twisteroo™ calculation. From a high level view, the basic idea of the twist calculation is to create two new "twist lines", one for each iliac, which begin at the end of the graft trunk and continue until the original centerline splits. At this point, the graft will switch tracks and jump back onto the preexisting right iliac leg (RIL) and left iliac leg (LIL) centerlines. The existing centerlines are preferably used because they are a reviewed and validated system to predict the general path a graft will take though the anatomy. The twist lines start at the end of the graft trunk because the trunk will simply follow regular centerlines. Once the twist calculation is finished, the grafts begin using the regular RIL and LIL centerlines again, because they will correctly model the behavior of a graft leg through a tortuous anatomy. Thus, the Twisteroo™ is meant to model twisting primarily in the aneurismal sac. FIG. 41 is an example of two twist lines created for a 180-degree twist and FIG. 42 is an example of the Virtual Graft once it has followed the twist.

In this Twisteroo™ product, the iliac branches are assumed to lie in the coronal plane.

The first calculation made in the creation of a twist is to calculate the "spread" variable. This is how far the two legs will be pushed off the centerline as they spiral down. This spread=½ (Left leg diameter/Right leg diameter) which comes from either the MSVG device sizes or a user's generic device parameters. This calculation accounts for potentially different leg diameters for each leg.

The second calculation made is to determine where the twist lines should end. This is calculated for each side, and is termed the "attachment" site. In FIG. 41 above, this is the point on the green line, where the gray line ends. This point is calculated by running down the centerline until the RIL and LIL cubes are separated by a distance greater than the "spread". This is where the graft stops following the twist lines and jumps back onto the regular centerline. It is related to the spread because once the centerlines are that distance apart, the graft limbs are no longer capable of intersecting each other.

Figure 43:
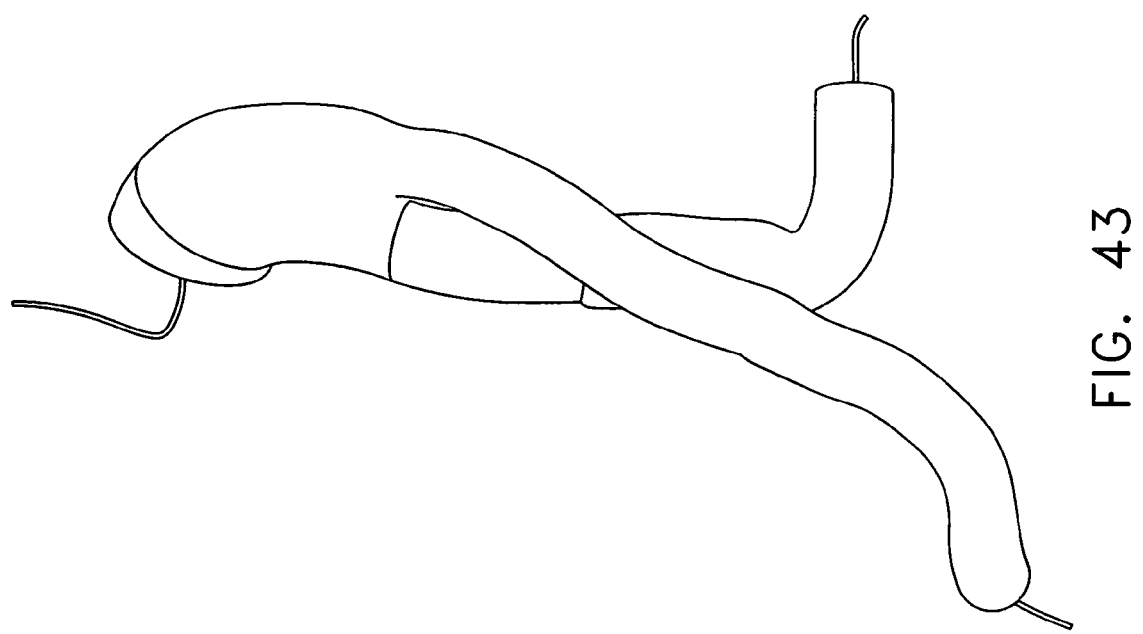
FIG. 43 is a schematic representation of an MSVG spline creation.

Spline Creation. Looking next at FIG. 43, splines are a way of connecting points or interpolating between points in a smooth and continuous manner. To do this, a spline takes into account a curve's energy and tries to connect the points in a smooth way. Catmull-Rom spline formulation is preferably used because it interpolates through all of the given control points and is resistant to kinking.

Six control points are used per side to create the spline. With the "septum" defined as the end of the graft trunk, there is one control point set proximal to the septum by 25 mm, one point at the septum, two mid-aneurysm control points each ⅓ of the way from the septum to the sides attachment, and finally one point at the attachment and one 25 mm distal to the attachment. The two points located 25 mm away from the ends of the graft are there to influence the path of the graft above. Their location along the centerline influences the endpoint tangents of the resulting splines so that the curve continues smoothly out of the iliac artery.

The next step is to add the "spread" into the equation in a way that naturally twists the graft down the length of the sac. To do this the most proximal 4 control points are translated away from the basic centerline. Through basic trigonometry, the degree of twist is plotted on the unit circle and the x and y components of the resulting vector obtained. It is known that at the bottom it is desirable to be directly on the centerline, so the amount of rotation is reduced smoothly as the centerline proceeds distally. Thus, for a 180 degree twist, the first two control points will be translated directly away from their eventual location, while the middle control points will be translated at 120 and then 60 degrees away. All translations are performed in the plane of the centerline cube that they are based on. With these 6 control points, a Catmull-Rom spline is created and the results stored.

Figure 44:
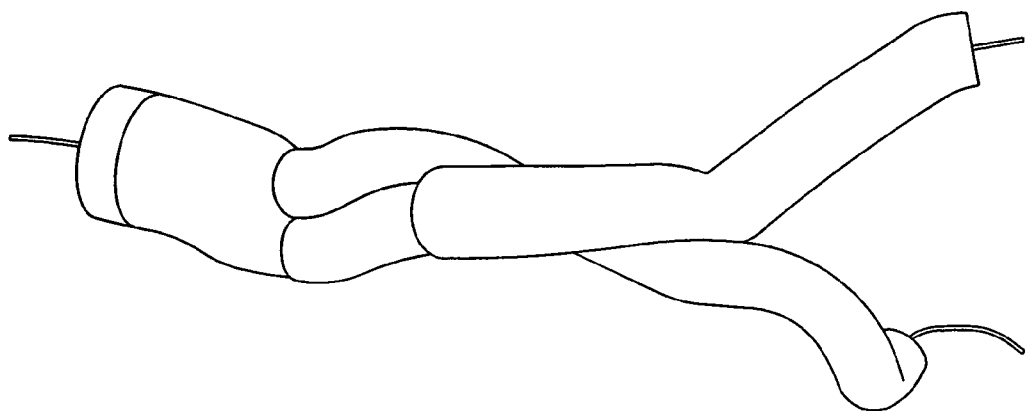
FIG. 44 is a schematic representation of an MSVG contact model.

Contact. Looking next at FIG. 44, the resulting splines can still end up running through each other, because each side has so far been created in isolation. Therefore, the next step is to implement a simple contact model. A preferred contact model is basically a function that increments down each of the twists, finding the nearest neighbor in the other twist line. Once it finds this neighbor, it then calculates the distance between them and then pushes the two points away from each other until they are at least the "spread" value apart. Any contact that is not removed from the legs via this algorithm is modeled later during the visualization process by calculating the distance from leg to leg, and then adjusting the geometry of the graft limbs to "ovalize" them with a minor axis in the direction of the opposite leg.

Filter. Finally, the point locations are convolved through a large triangle filter (30-way) which smoothes out any irregularities left behind by the twisting and contact process described above. This smoothing can result in reducing the distance between the two legs below the "spread" distance, which is actually a desirable effect because it allows the "ovalizing" process above to partially model the graft's actual deformation.

Completion. Finally, the files TwistLineRIL.asc and TwistLineLIL.asc are written out in an .asc format. Because the orientation of the resulting cubes is important for texturing and visualization purposes, a function is used to orient the cubes until they both face each other, but also line up smoothly with the corresponding first and last cubes on the original centerlines. Because these are two distinct orientation constraints, a function is used to blend the effect of each method based on where the cube is on the centerline. Preferably a polynomial function is used, such as $y=x^8$, which produces a graph with a characteristically wide base and highly sloped sides. Thus, the first and last cubes are more heavily weighted at the beginning and end of the twist line, but almost all orienting is done towards the neighboring cube through the middle of the twist line.

The MSVG can now be drawn along the twist lines. The most important benefit of this feature is that it can actually model the shortening that a twisted graft's legs will undergo relative to their final location in the iliacs. Previously there was no good way to account for this, and it was often simply assumed that it would shorten the graft by several millimeters.

11.4 Native Iliac Rotation (NIR) and TwisterooNIR™. In an improved version of the system, the system is capable of recognizing Native Iliac Rotation (NIR) and provides a TwisterooNIR™ product which takes Native Iliac Rotation (NIR) into account when conducting twist calculations.

Native Iliac Rotation (NIR). During the development of the original Twisteroo™, it was noticed that, for some anatomies, the "neutral" amount of twist (or 0 degrees) was actually not the most natural fit for the graft, since the bifurcation of the iliac arteries does not always occur in the coronal plane. Instead, it was found that in some anatomies, the bifurcation of the iliac arteries occurs at an angle from the coronal plane, i.e., the iliac arteries branch off in a twisted fashion, with one iliac more anterior than the other. For the purposes of the present invention, the term Native Iliac Rotation (NIR) can be used to describe the degree of twist of the iliac arteries away from the coronal plane.

Figure 45:
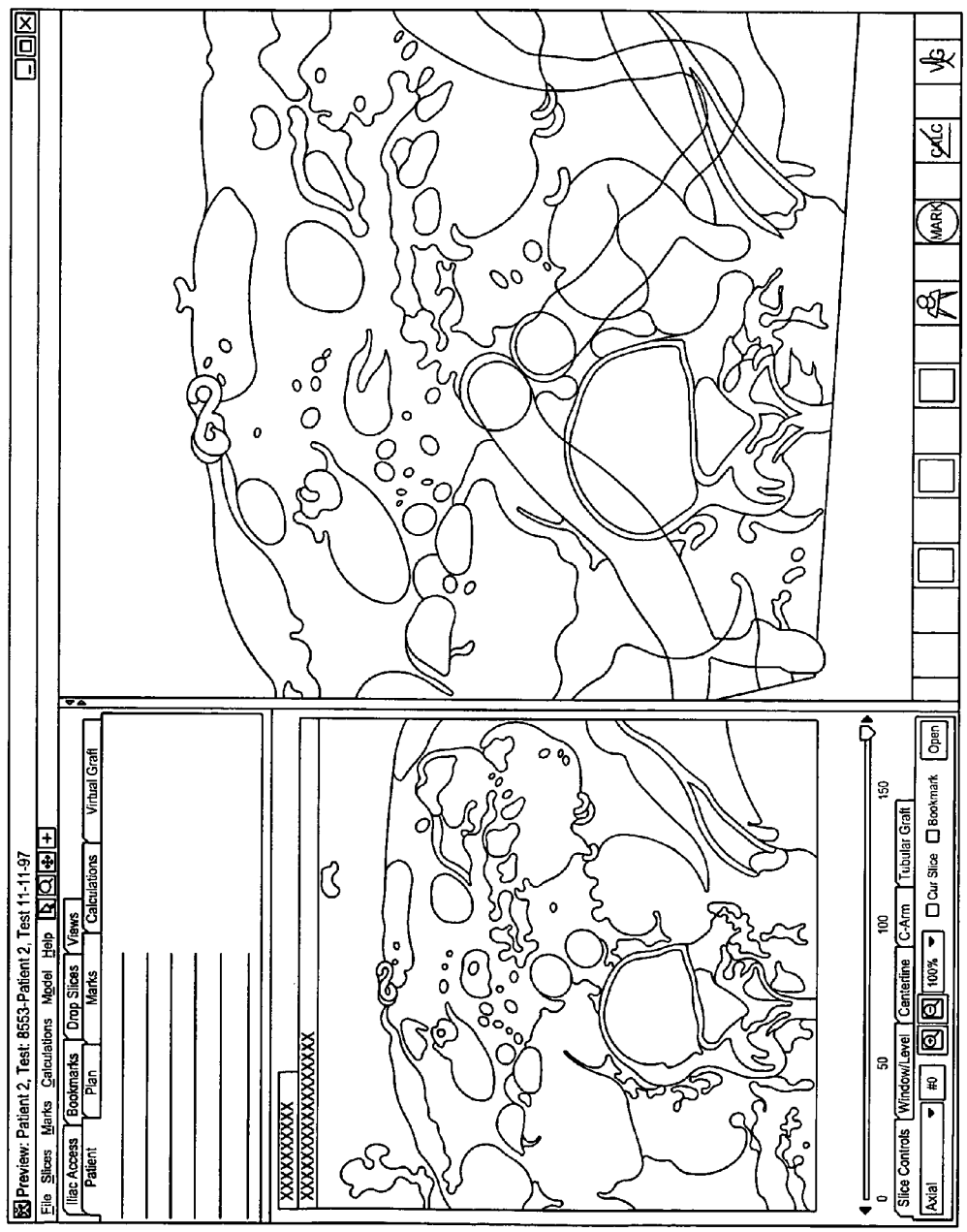
FIG. 45 illustrates a screen display from one preferred construction of the present invention, wherein the display simultaneously provides a 2D slice window and a 3D model window, and further wherein the images illustrate Native Iliac Rotation departing from the coronal plane.

Looking now at FIG. 45, there is shown an axial CT scan slice (left side of figure) just below the bifurcation point, and a virtual 3D model (right side of figure) showing the iliac branches extending out of this slice plane. These images show how the two iliac arteries may branch off from one another. More particularly, FIG. 45 shows an example of an anatomy wherein one branch of the iliac artery is significantly more posterior (i.e., closer to the backbone or bottom of the image) than the other branch.

Since the branching of the iliacs does not always happen strictly to the left and right of the anatomy (i.e., with a 0 degree twist off the coronal plane), the aforementioned Twisteroo™ technique for calculating the virtual graft twist does not always result in an accurate assessment of the optimal twist for some patient-specific anatomies.

Accordingly, in one preferred embodiment of the present invention, sometimes hereinafter referred to as the TwisterooNIR™ product, there is provided a new technique for measuring the NIR (i.e., the degree of rotation off the coronal plane) of the iliac arteries, which is then used to increase the accuracy of the aforementioned twist calculation and other tools and measurements.

Calculating Native Iliac Rotation (NIR). This technique begins by simplifying the anatomy into two centerlines, as was previously discussed above. These centerlines are formulated to travel down the center of each vessel as a series of cubes. From this formulation it is easy to determine the XYZ location of any of the cubes in 3D space.

In order to measure the Native Iliac Rotation (NIR) of a patient-specific anatomy, three different centerlines are first produced: (i) a left iliac (LIL) centerline; (ii) a right iliac (RIL) centerline; and (iii) an aorta (AO) centerline (which is coincident with the other two centerlines down through the aneurismal sac until the LIL and RIL centerlines begin to diverge down the left and right sides of the bifurcation, at which point, the AO centerline continues to proceed down the center of the anatomy, directly through the bifurcation and out a short way below the bifurcation.

Next, the XY positions (in the axial plane) of one point from the LIL centerline and one point from the RIL centerline are compared to determine how much the points rotate away from the horizontal. In other words, the two points are compared to see how much each point is rotated away from the coronal plane. It will be appreciated that the compared points from the LIL centerline and the RIL centerline preferably are at the same position in the Z-axis (i.e., along the coronal plane). In one preferred embodiment of the present invention, the left and right iliac centerlines are compared at points approximately one half centimeter below the bifurcation.

Figure 46:
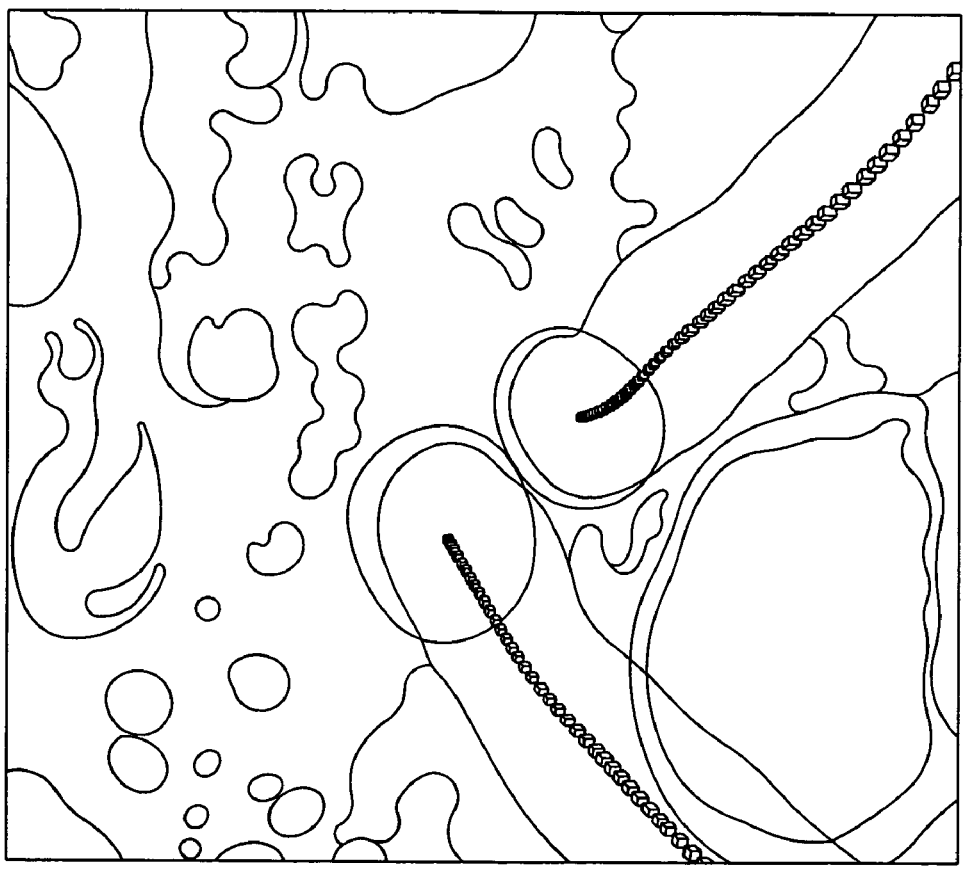
FIG. 46 is a schematic representation of the centerlines for the left iliac (LIL) branch, the right iliac (RIL) branch and the aorta (AO)
Figure 47:
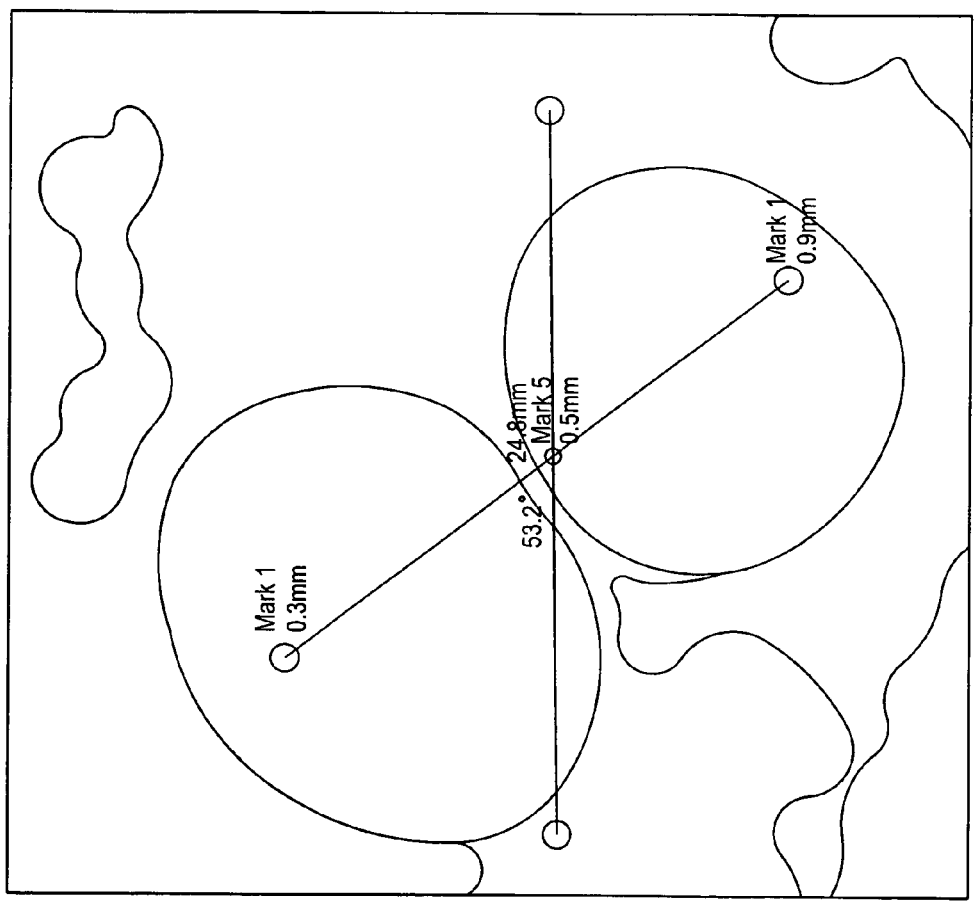
FIG. 47 is a schematic representation showing the calculation of Native Iliac Rotation off the coronal plane.

In another embodiment of the present invention, the length of the centerline is used as a guide to tell a user what part of the LIL and RIL centerlines to compare, since the AO centerline is always of a length defined to just make it past the bifurcation. More particularly, and looking now at FIG. 46, the total number of cubes in the AO centerline is first determined, and then the same number of cubes is used to index into the left and right centerlines. Thus, if there are N cubes in the AO centerline, the $n^{th}$ cube of the LIL centerline (LIL[N]), and the $n^{th}$ cube of the RIL centerline (RIL[N]), are compared. For each of these cubes (i.e., LIL[N] and RIL[N]), the X and Y positions (in 3D space) are determined. This method is further illustrated in FIG. 47, where a diagonal line has been drawn to extend through a centerline cube from both the left (LIL) and the right (RIL) centerline, and the horizontal line represents the coronal plane. Next, the differences (in X,Y terms) of the two points is calculated, and then the inverse tangent of their quotient is calculated. The angle thus derived from these calculations is the Native Iliac Rotation (NIR) of the two iliacs away from the coronal plane.

TwisterooNIR™. Finding the Native Iliac Rotation (NIR) of a patient-specific anatomy allows the calculation of a more natural twist of the virtual graft for each specific patient. Previously, and as noted above, the Twisteroo™ assumed that the natural state of the rotation was at precisely 0 degrees (i.e., Twisteroo™ assumed that every patient had a "neutral" Native Iliac Rotation). This meant that if the physician wanted to simulate a 180 degree twist, Twisteroo™ would simulate the graft legs twisting from 180 degrees all the way back to 0 degrees. In accordance with the present invention, there is now provided the TwisterooNIR™ product, which uses the previously-calculated Native Iliac Rotation (NIR) when calculating for twist. TwisterooNIR™ simulates the virtual graft legs twisting from the given degree of twist desired back to the patient-specific Natural Iliac Rotation. TwisterooNIR™ provides a more accurate simulation of the natural position at which the virtual graft legs would be as they enter the iliac arteries. In particular, this is an advantageous method of simulating the twist of a graft because, in an anatomy with a high degree of native twist (e.g., a large Natural Iliac Rotation), the graft's twist would end up turning too quickly and in effect overshooting the target, or doing the reverse and not twisting fast enough.

Previously, and as noted above, an algorithm would attempt to rotate the virtual graft from an inputted degree of twist to 0 degrees, by building a spline along two control points spaced between the start and end points. The control points would be set so that ⅓ of the twist would be achieved by the first point, ⅔ of the twist would be achieved by the second point and the rest of the twist would be achieved between the second point and the end point, where the graft centerline rejoins the regular graft centerline. Thus, to achieve a 90 degree twist of the virtual graft, the Twisteroo™ product would space control points at 66 degrees and 33 degrees of twist. As mentioned above, this creates an undesired path in some instances. Specifically, in the case where a patient's iliac limbs are rotated 50 degrees relative to the coronal plane (i.e., the patient has a 50 degree Native Iliac Rotation) and a 90 degree twist of the virtual graft is desired, the final point will be at 50 degrees, and the control points will proceed thus: 90 degrees, 66 degrees, 33 degrees, and 50 degrees, leaving an S-curve.

The TwisterooNIR™ performs its twist calculations by placing two control points in between the beginning and end points just as the Twisteroo™ algorithm did. However, the TwisterooNIR™ calculates the amount to twist desired as:

Total Twist Desired−Native Iliac Rotation=Amount To Twist The Virtual Graft

For the example noted above, the TwisterooNIR™ calculation comes out to 90 degrees−50 degrees=40 degrees. The TwisterooNIR™ then divides the Amount To Twist The Virtual Graft (i.e., 40 degrees) by 3 and performs an interpolation to give control points at: 90 degrees, 76 degrees, 63 degrees, and 50 degrees, leaving a much smoother curve than the S-curve described above.

Figure 48:
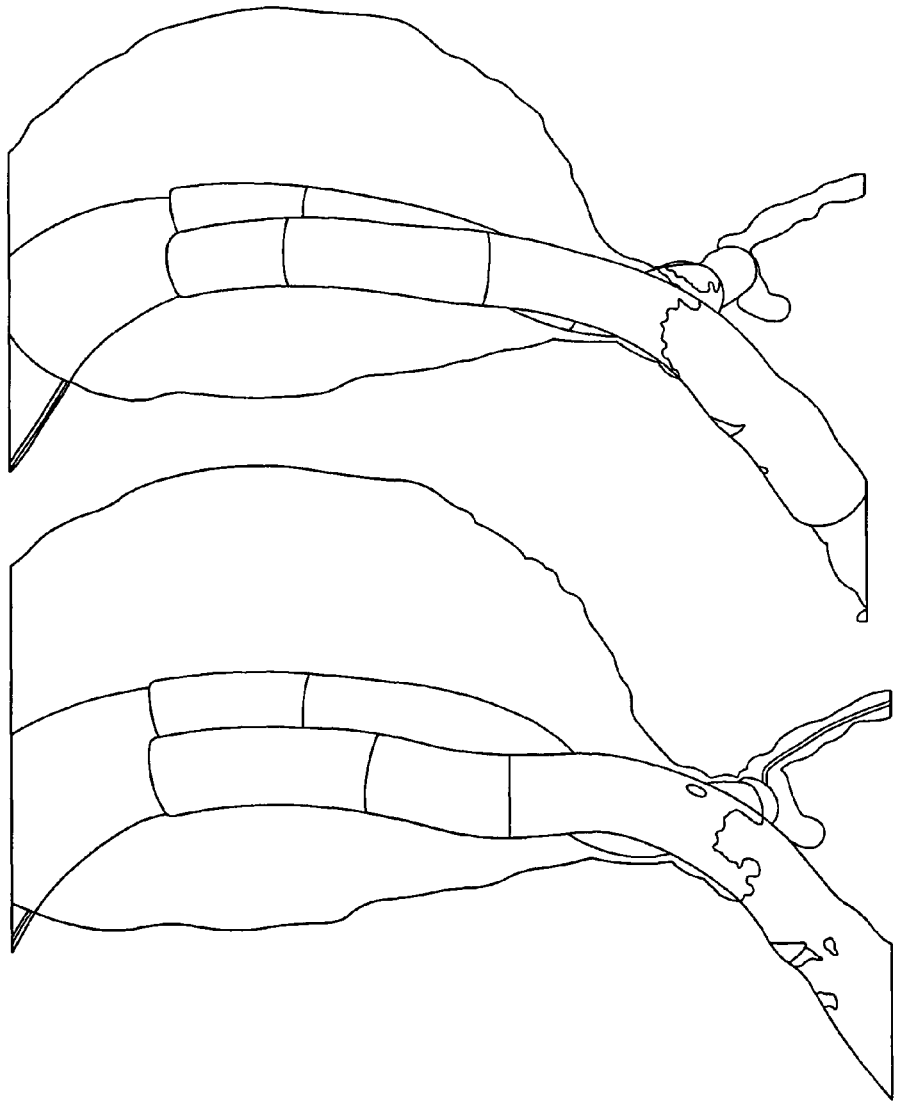
FIG. 48 is a schematic representation comparing the Twisteroo™ and the TwisterooNIR™ products for a patient having a 53 degree Native Iliac Rotation.

Looking now at FIG. 48, another example of the aforementioned problem is illustrated. This example illustrates a problem which may occur even when the graft is set to 0 degrees of twist. The Twisteroo™ product is on the left and the TwisterooNIR™ product is on the right. The degree of twist for both of these grafts is 0 degrees and the Native Iliac Rotation is 53 degrees. In the first case (i.e., the case on the left utilizing the Twisteroo™ product), the control points are at: 0 degrees, 0 degrees, 0 degrees, and 53 degrees. Since the algorithm cannot predict where the final point will be, it cannot approach this point gradually. This produces an unnatural "jerk" at the end of the graft. In the TwisterooNIR™ product, the control points are at: 0 degrees, 17 degrees, 35 degrees, and 53 degrees. These control point calculations produce a smooth and more realistic curve for the graft path.

Figure 49:
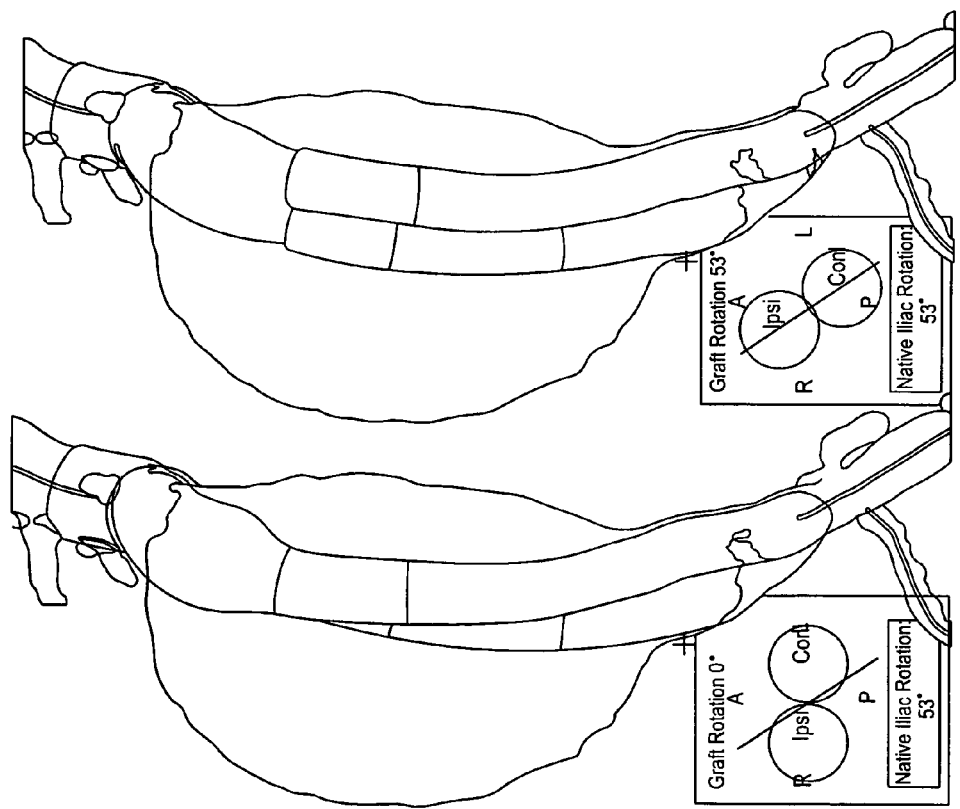
FIG. 49 is another schematic representation comparing the Twisteroo™ and the TwisterooNIR™ products for a patient having a 53 degree Native Iliac Rotation.

Because the grafts will be inserted in a manner that conforms to the twist of the anatomy, the TwisterooNIR™ product reports the Native Iliac Rotation to the user so that they may consider simulating the graft deployment in what has been calculated to be the natural state of the anatomy. Looking now at FIG. 49, this example shows how rotating the graft to the Native Iliac Rotation can produce a subtly different simulation of the way that a surgery may actually proceed. FIG. 49 illustrates how the graft legs are not required to do as much twisting when their rotation is adjusted to the Native Iliac Rotation (see the image on the right) and FIG. 49 further illustrates how these two simulations actually predict that the graft will terminate at a slightly different place in the iliacs due to the difference in the graft path.

11.5 "Click-Drag" Distance Calculations. This new feature is a method for creating distance calculations. A distance calculation is defined as the distance across the anatomy from one user-defined "Mark" to another. In simpler versions of the software system, a distance calculation can be defined by selecting 'New Distance Calculation' from a menu. This opens a Dialog through which beginning and ending points can be selected for the calculation from a list of all available Marks. This process has become much easier with the new method. To perform a "Click-Drag" distance calculation, the user simply has to click on the Slice Window, hold down the mouse button, and then drag the mouse to the desired endpoint. The system software will then check to make sure that both Marks of the calculation are within the slice volume and, if so, create two marks with a distance calculation between them. The system software will also automatically change the size of the marks created for the start and end points to be of a small size in order to reduce clutter on the screen. One final feature of the "Click-Drag" distance calculation is that, if the user drags the mouse back within a minimum distance of the start point, the program will no longer perform a distance calculation if the mouse is released and it will automatically return the size of the mark to normal.

11.6 Standard Mark And Calculation Types and the Name/Type Dichotomy. Another preferred new feature of the system is standardized Mark and Calculation types. In simpler versions of the system, Marks and Calculations could have names but these were user-defined and had to be manually typed in for every instance. A simple user-defined name is inherently problematic when trying to compare one user's calculations to someone else's.

This simple naming scheme has been extended by adding a new standard "type" field to all Calculations and Marks. This new "name-type" dichotomy allows users to classify their measurements according to a standardized system while still adding their own names if they would like. This can be particularly useful in the context of the software system where the same measurement can be made in different ways. The "Maximum AAA Diameter" type, for example, could be measured using either a mark diameter or a distance calculation. For this case the user would give all the measurements the same type, but different names.

As far as the interface is concerned, the first step after creating a mark should be to select its type from menu. This menu is a drop-down list with cascading submenus for aortic types, as well as right and left iliac types. Once the user selects a type, the program will automatically create an abbreviated version of name as the measurement's name. The user is then free to modify this name if they would like to. The program will not overwrite any name that the user has already chosen. When a calculation is edited and the type changed, the program will only change the name of the measurement if the old name was one of the abbreviated ones created by the program.

A list of all standard mark and calc types can be found in Appendix A attached hereto.

12. Additional Feature—Iliac Access Tool

Another additional feature is the iliac access evaluator. This feature addresses the need of the physician to evaluate the feasibility of an endovascular repair for a given patient. Obstacles to endovascular repair include: calcium deposits within the blood vessels, excessive tortuosity of the blood vessels, and insufficient diameter of the iliac branches (the iliacs). Physicians may need to choose between the devices of different manufacturers based on the individual characteristics of their sheath products. Additionally, physicians will often have a choice of which side to insert the main body of a bifurcated endoprosthesis, and which side to put the typically smaller diameter contralateral leg device. For this reason, it can be important to be able to readily evaluate the receptiveness of each iliac for a host of different device sizes.

12.1 Sheath-Sizing Tool. The sheath-sizing tool is provided as a visualization aid for analysis of vessel diameters over the course of the iliac. The sheath-sizing tool displays virtual tubes for each of the iliacs of the vessel at a specified diameter. The virtual tubes begin at the aortic bifurcation (calculated by using the end of the aortic centerline) and terminate at the end of the pre-determined iliac centerline. The diameter of each iliac's virtual tube is individually controllable with a slider, and the transparency of the tubes can be changed granularly from fully opaque to fully transparent. Where the virtual tubes in the model appear to be bigger than the surrounding vessel, this represents areas where the given sheath will be larger than the vessel and possibly prevent iliac access.

Figure 50:
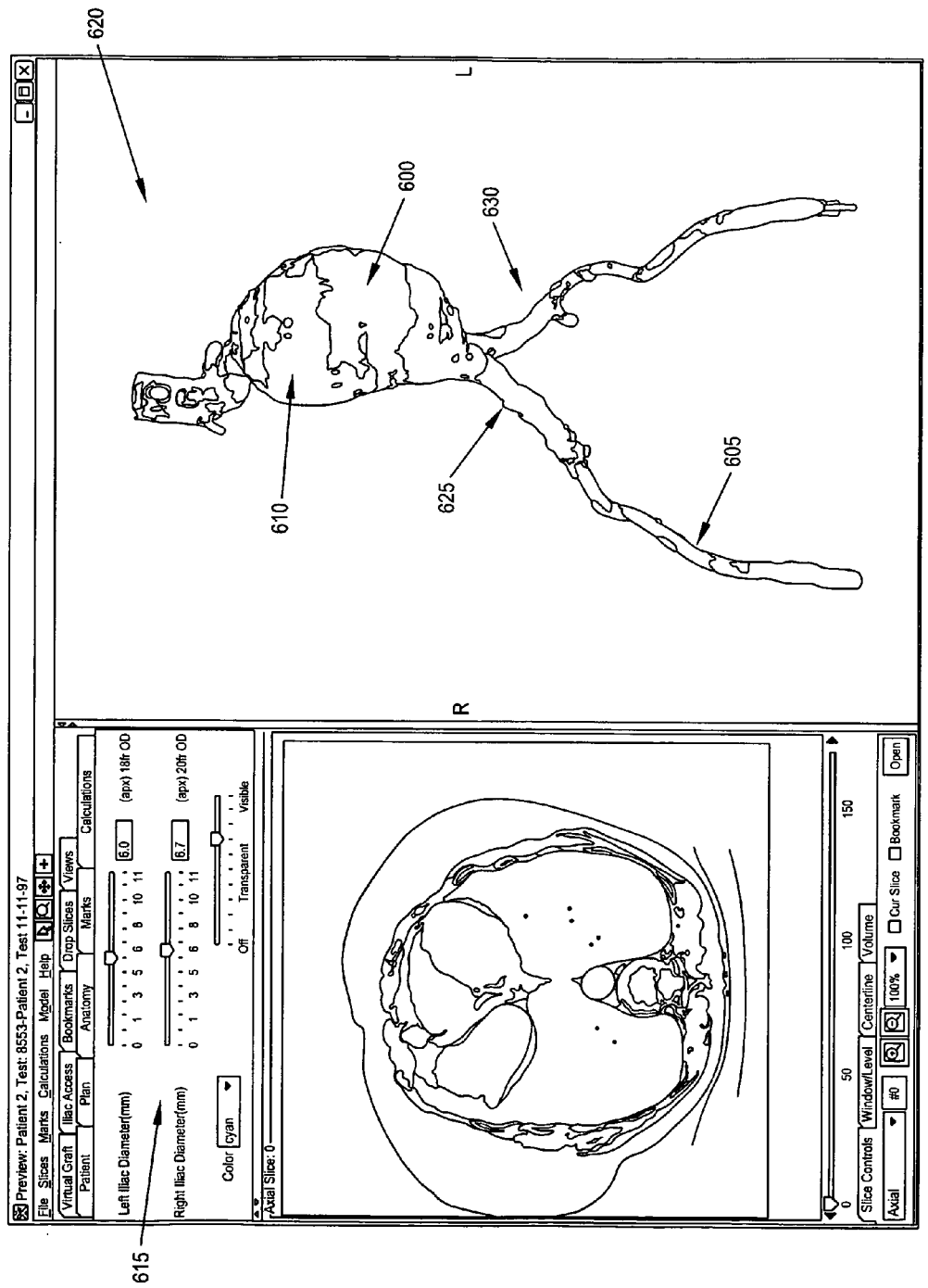
FIG. 50 is a schematic representation of a sheath-sizing tool.

More particularly, and looking now at FIG. 50, there is shown a schematic representation of the patient's anatomy, with the color red 600 representing blood flow, the color blue 605 representing a virtual tube device of selected diameter, and the color yellow 610 representing plaque. In this view, the wall of the blood vessel is rendered transparent, such that the blood vessel is essentially seen in the context of its internal blood flow. Furthermore, in this view, the user interface 615 for the sheath-sizing tool is in the upper-left while the semi-transparent virtual blue tubes 605 in the model window 620 to the right show the chosen sheath sizes relative to the 3D blood vessel model. The model tube 605 of the left iliac 625 is set to 18 French (fr)—a common unit for sizing sheaths and catheters while the model tube 605 of the right iliac 630 is at 20 fr.

The visualization for the virtual sheath-sizing tool builds upon structures that have been described in the foregoing disclosure: the 3D model of the blood vessel, the centerline structure that is constructed and the centerline calculations that are part of the present invention. Furthermore, the virtual tube devices 605 comprise virtual objects which are inserted into the 3D computer model of the patient's anatomy.

12.2 Diameter Plot. The diameter plot is another tool that can be used in the present invention to evaluate iliac access. Essentially, by using the pre-computed diameters of the iliac and displaying them along an axis, a cross-sectional representation of the aorta can be generated along each iliac. By laying a line across this plot at a specified diameter, a visual indication can be obtained of how much of the vessel is larger than, or smaller than, the diameter represented by the line across the plot. Calcium and thrombus preferably show up separately from the lumen on this plot as well, aiding an evaluation of the plaque's location. The diameter plot tool can be intermingled with the sheath-sizing tool described above to afford two views of essentially the same information.

Figure 51:
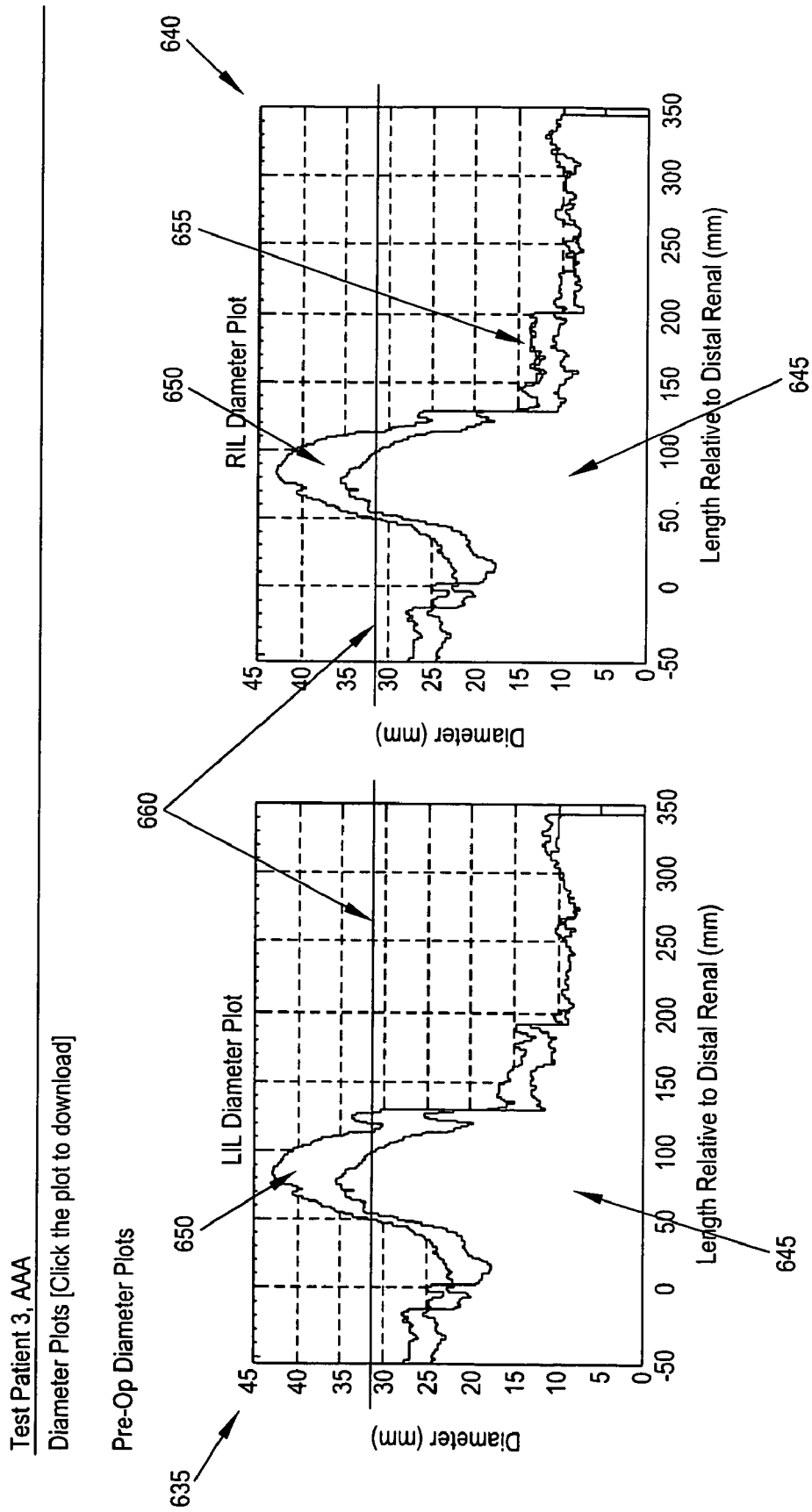
FIG. 51 is a schematic representation of left and right iliac diameter plots.

Looking next at FIG. 51, left and right iliac diameter plots are shown at 635 and 640, respectively. Length is along the x-axis while diameter is along the y-axis. In this figure, red 645 shows the diameter of the bloodflow lumen, yellow 650 is the thrombus and blue 655 is the calcified plaque. Note that on the right iliac plot, around 175 mm, there is considerable calcification. The aforementioned plot line 660 shows how much of the vessel is larger than, or smaller than, the diameter represented by the plot line.

The information used to construct the diameter plots has already been discussed above. More particularly, from the segmentation of the blood vessel done in axial slices, and the centerline object of the blood vessel that is calculated, reformatted (oblique) slices can be defined that are always perpendicular to the centerline. By constructing oblique slices of the underlying segmentation, the diameter along the vessel centerline can be analyzed in a number of different ways.

Consider the bloodflow diameter. By counting the number of pixels in each slice that labels blood and multiplying by the PixelSpacing (squared) conversion factor, the surface area of the blood can be calculated in each slice. Assuming the idealization that the vessel has a circular shape perpendicular to the constructed centerline, the well known relationship for a circle of that area A can be used, i.e., $$A=\pi r^2$$

And so the diameter D is $$D=2r=2 \text{ sqrt}(A/\pi)$$

A second construction for the bloodflow diameter on an oblique slice is based on first finding the centroid for the bloodflow segmentation. Successive chords can be drawn through the centroid with endpoints defined where the bloodflow segmentation ends. The plotted diameter can then be defined as the maximum chord that intersects the centroid for each location along the centerline.

12.3 Coded Tortuosity. In an effort to better quantify the degree of tortuosity of a vessel, improved means have been devised for displaying the tortuosity of the vessel (i) in the vessel, or (ii) on a diameter plot. There are many different methods for calculating tortuosity, and any of these can be the basis for this visualization. The coded tortuosity tool for displaying tortuosity on the vessel is very much like the visualization tools described above, except that the virtual vessel will be colored according to the tortuosity at each point along its length. A simple stop light color-mapping scheme would give the physician an immediate indication of where the highly tortuous areas of iliac occur. The diameter plot can be colored according to this code as well, thus alerting the physician to problematic conditions when there is a combination of high tortuosity and calcium deposits or small diameter.

As mentioned above, centerline tortuosity can be defined in several ways. These include ratio of curved to straight-line lengths, average of the curvature, average of the curvature squared, average of the magnitude of the second derivative of the curve, etc.

Figure 52:
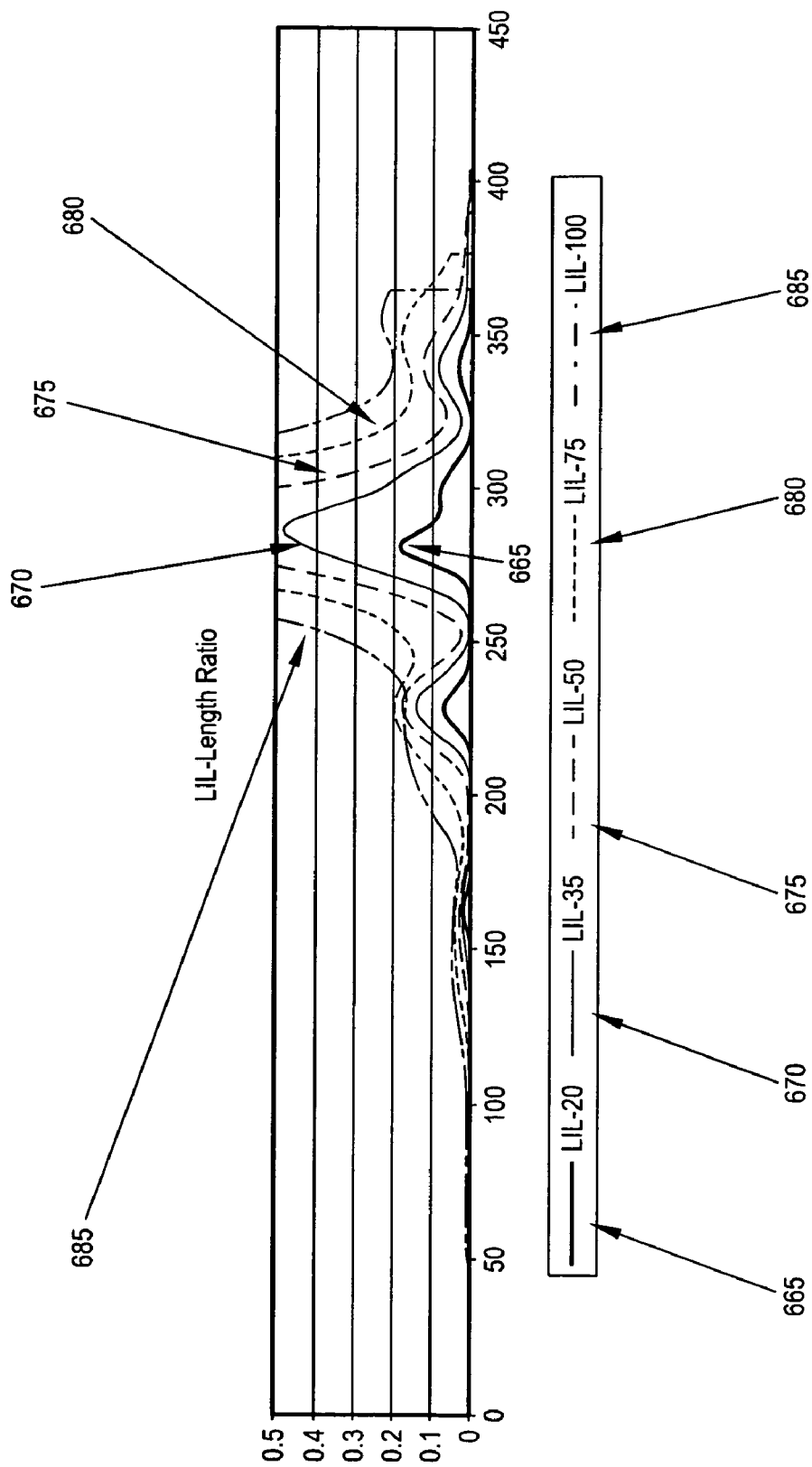
FIGS. 52 and 53 are schematic representations showing a tortuosity plot based on the ratio of curved to straight-line lengths.
Figure 53:
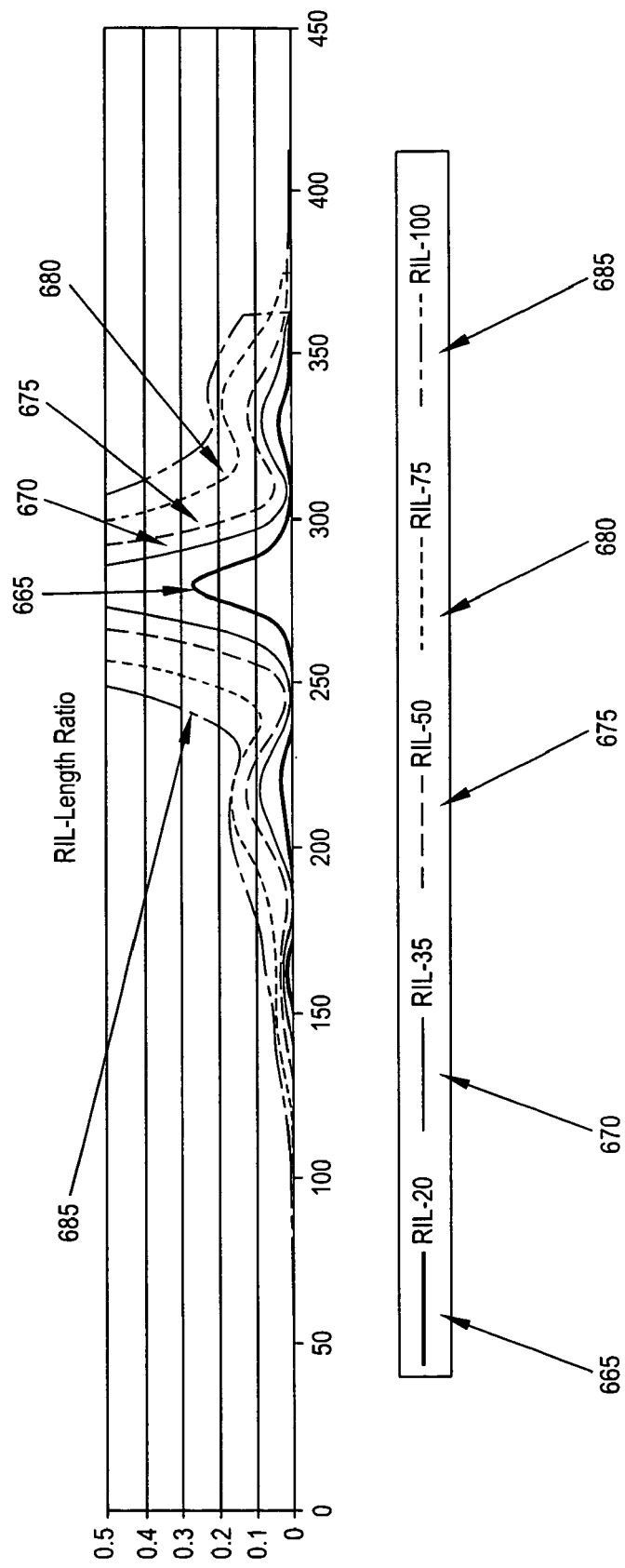

Looking now at FIGS. 52 and 53, these figures show a tortuosity plot based on the ratio of curved to straight-line lengths. Note that this definition is meaningful only for a particular choice of window size. That is, for any location along the curved path, an interval must be chosen to define the endpoints for the ratio calculations. The colored lines 665, 670, 675, 680 and 685 in the plots shown in FIGS. 52 and 53 represent variable interval sizes from 20 mm to 100 mm.

12.4 Access Score. It is also possible to provide a total Access Score which is a function of the risk associated with all of the various measurable obstacles discussed above. The Access Score algorithm can take into account such things as presence and thickness of calcium, tortuosity, vessel diameter along the entire length of the iliacs, etc., and output a single score for a patient's candidacy for catheter-based surgery. This Access Score can be used as a quick assessment of a patient or for categorizing patients for further analysis of their procedure.

By way of example but not limitation, these relationships can be formalized as follows. The patient specific "access availability" (AA) is defined to be a function of the calcification, tortuosity and diameter.

$$AA=f(\text{calcification,tortuosity,diameter})$$

The device-specific "access requirement" (AR) is a function of the device diameter and stiffness.

$$AR=g(\text{stiffness,device diameter})$$

Then access in a given iliac is possible if AA>AR for the entire length of the vessel.

12.5 Calcium and Plaque Alerts. Calcium and plaque alerts can be setup to flash or otherwise distinguish the plaques deemed to be in problematic positions by the algorithm described above. Using arrows in the model window or diameter plot, or flashing the virtual structures on and off, dangerous plaques can be highlighted as an alert to potentially problematic areas for femoral access.

13. Additional Feature—Automatic Cranio-Caudal Angle Calculation

The Automatic Cranio-Caudal Angle Calculation tool automates the creation of an angle calculation based on a particular vessel centerline. This saves the physician the time and effort involved in trying to describe an angle in 3-dimensional space. The tool begins by simply taking the number of an aortic slice (see, for example, FIGS. 14 and 31) at the press of a button. The tool then gets the orientation of this slice and calculates the angle of this slice in the sagittal plane relative to the axial plane. The Automatic Cranio-Caudal Angle Calculation tool places three marks, one in the center of the slice, one directly anterior to this mark, and one at the anterior crossing of this oblique plane with the sagittal plane through the first mark. The angle is then calculated between these three marks, putting the mark in the center of the oblique slice at the apex of the angle. This angle represents the angle of the oblique slice in the cranio-caudal plane and is used for a physician pre-operative assessment of the proper C-Arm angle.

Figure 54:
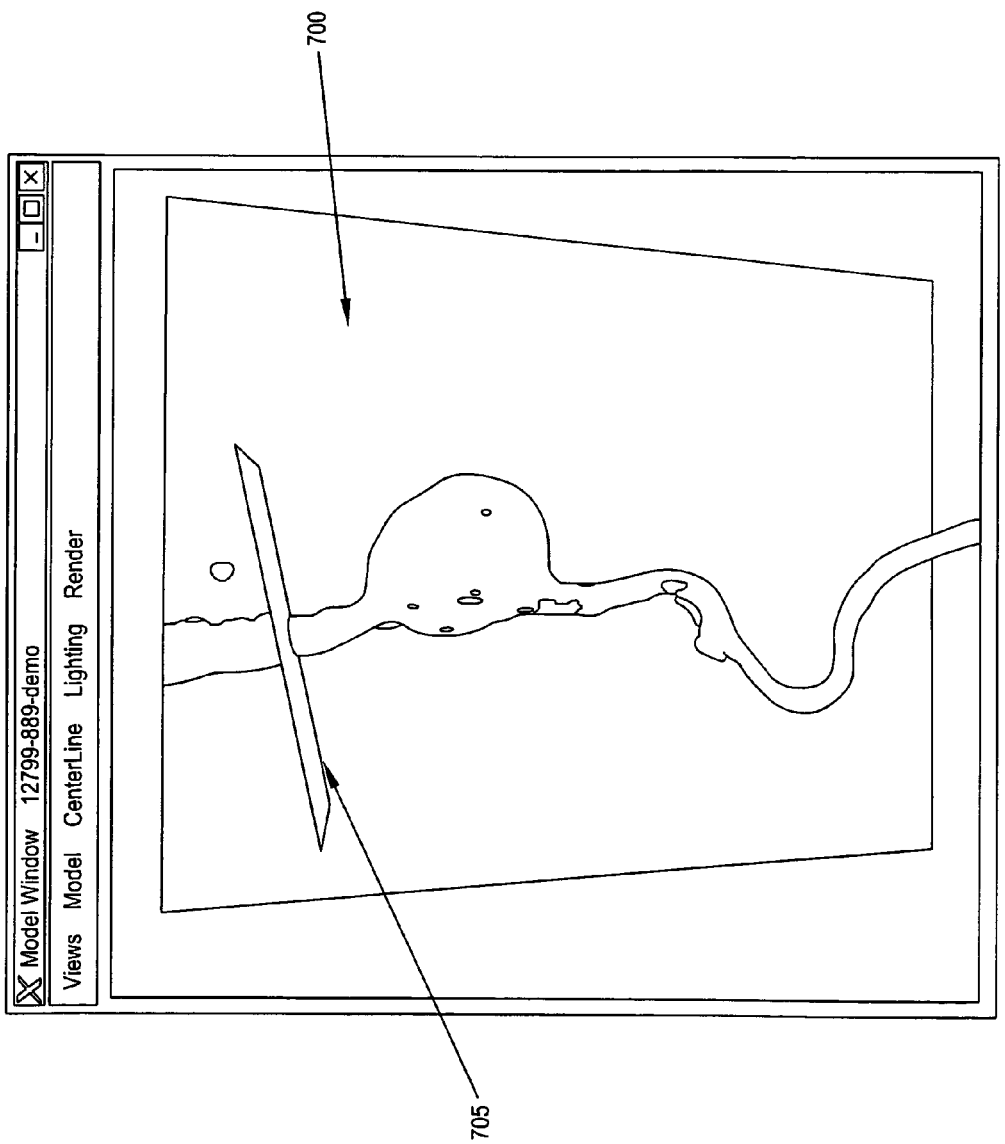
FIG. 54 is a schematic representation showing the geometry of a blood vessel, and two planes in space.
Figure 55:
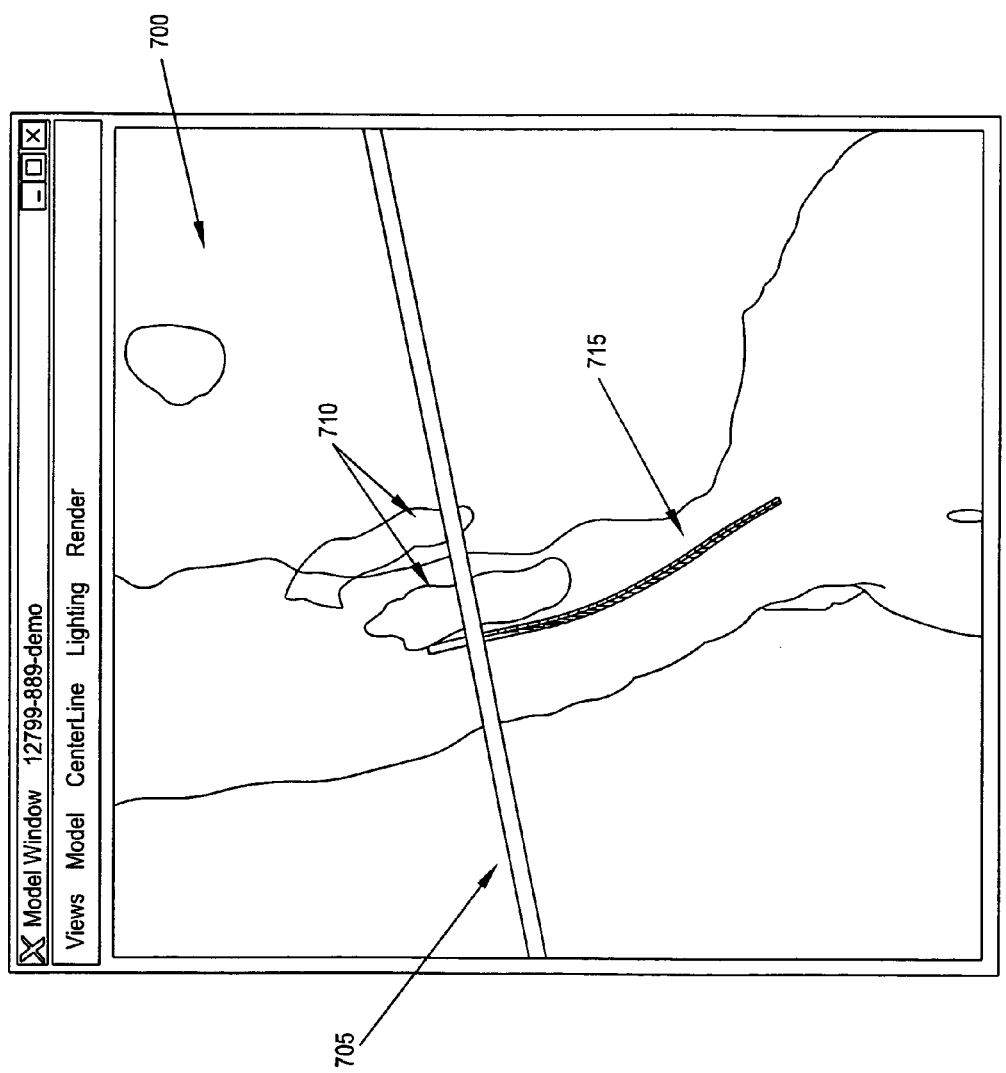
FIG. 55 is a schematic representation showing the geometry of the blood vessel and two planes in space, and points along a centerline of an anatomical object.
Figure 56:
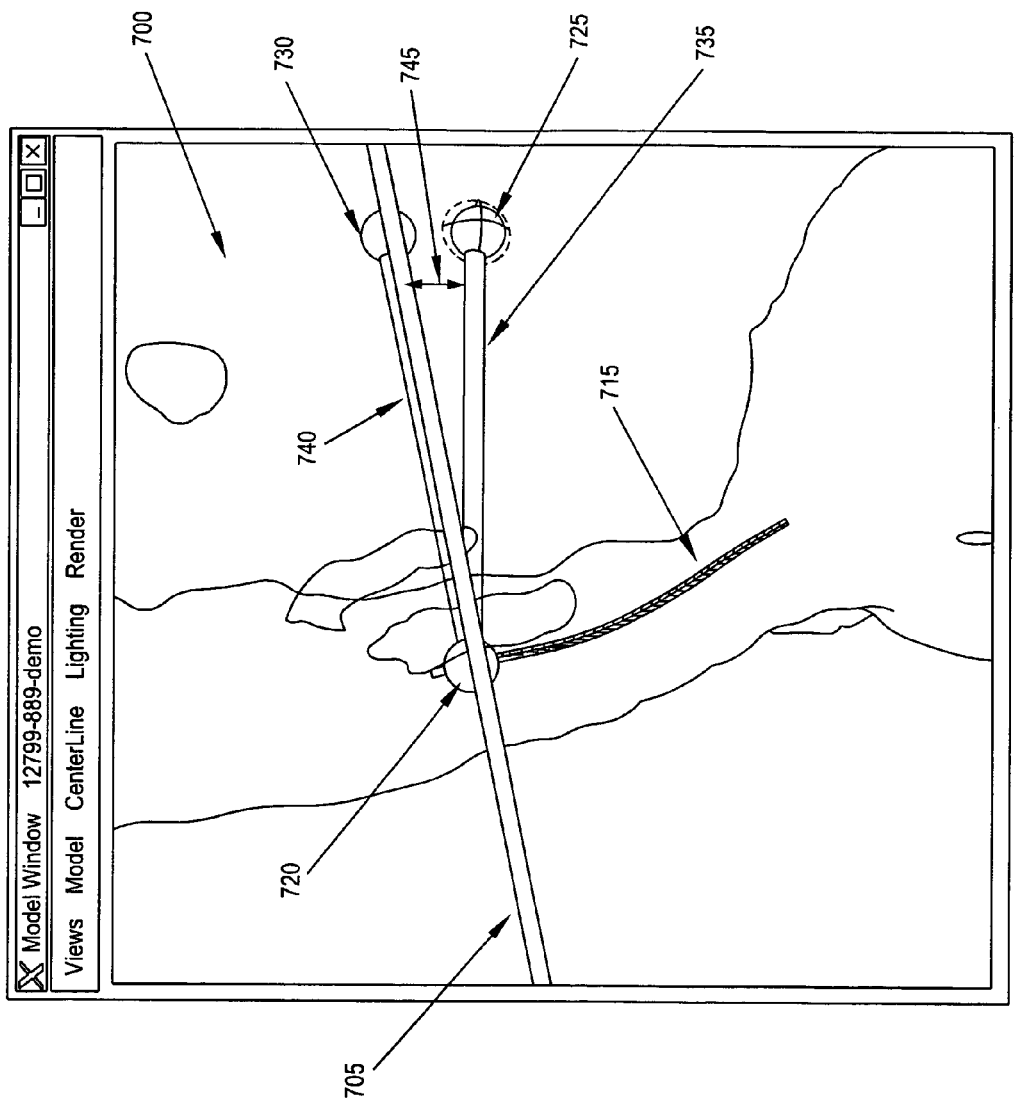
FIG. 56 is a schematic representation showing the geometry of the blood vessel and two planes in space, points along a centerline of an anatomical object and an angle calculation.

Looking now at FIG. 54-56, FIG. 54 illustrates the geometry of the blood vessel. The blue plane 700 is sagittal to the bloodflow through the centerline at the proximal neck of the aorta. The purple plane 705 is perpendicular to the centerline at the same location. FIG. 55 shows an anatomical detail 710, with the bloodflow transparent. The light interior cubes 715 represent points along the centerline of the anatomy.

In this case, the C-arm gantry correction is defined to be the interior angle from the intersection of the sagittal slice (blue) 700 to the axial slice, and the intersection of the sagittal slice 700 to the oblique slice (purple) 705.

FIG. 56 shows the resulting angle calculation as the lines in green, i.e., a first point 720 in the center of the slice, a second point 725 directly anterior to this mark, and a third point 730 at the anterior crossing of this oblique plane with the sagittal plane through the first mark. The intersection of the line 735 (defined by the points 720 and 725) with the line 740 (defined by the points 720 and 730) defines the angle 745 of C-arm gantry correction. For this patient, the C-arm gantry correction is 11.5 degrees.

More particularly, suppose the location on the centerline is $P_{cl}$. The vector defined by the sagittal/axial intersection $V_{sa}$ has a single direction component along the y-axis of the coordinate system and can be written $$V_{sa}=P_{cl}+\{0\text{radius}0\}$$

The vector normal to the oblique (purple) plane 705 is the tangent to the centerline curve, and may be called $V_{cl\_tan}$. Then the C-arm correction vector $V_{carm}$ is simply the cross product, $$V_{carm}=V_{sa}\text{cross}V_{cl\_tan}$$

13.1 C-Arm View. The C-Arm view tool takes the automatic angle calculation described above one step further and allows the user to visualize what the anatomy will look like after a cranio-caudal, and left/right rotation, of the C-Arm.

The C-Arm view tool works by taking the same angle calculated above, but rather than creating an angle, it centers the model window on the selected centerline cube and rotates the view until it is looking at the anatomy at this angle. The user may then rotate the model, which now pivots around this new center axis. At all times the angle of the view in latitude and longitude is displayed in the model window. When the physician is satisfied that they have found the ideal combination of left/right and up/down angle, they can click a "save" button, and the system will save this view along with the other views.

14. Tools and Definitions for Measuring Large Vessels Such as the Thoracic Aorta Two key features of the foregoing system are (i) the ability to make length measurements along a three-dimensional centerline that is representative of a blood vessel, and (ii) the ability to make volume measurements of that vessel. Centerline measurements are often used to characterize patient geometry for stent placement, such as the length of the non-aneurysmal proximal neck of an abdominal aortic aneurysm (AAA) or the expected length of a candidate graft. Longitudinal volume measurements have proven to be a good marker for device effectiveness.

These tools have proven very useful in characterizing AAA disease. However, larger, more tortuous vessels, such as the thoracic aorta, present unique challenges. The present invention comprises two new features, tools and definitions for measuring large, tortuous vessels such as the thoracic aorta:

(i) Longitudinal Analysis of a Generalized-Cylinder Constructed from a Curvilinear Centerline; and (ii) The VolumeOblique Calculation.

14.1 Longitudinal Analysis of a Generalized-Cylinder Constructed from a Curvilinear Centerline. The visualization software of the present invention may be used to aid physicians in the implantation of grafts or stents into various parts of the vascular anatomy. In any situation, but particularly in the thoracic aorta where the curvature of the vessel can be dramatic and the devices become much wider, there can be significant differences in the length along the inside and outside curves of any device that travels along the vessel. The problem can be well represented by a simple diagram. See FIG. 57.

Figure 57:
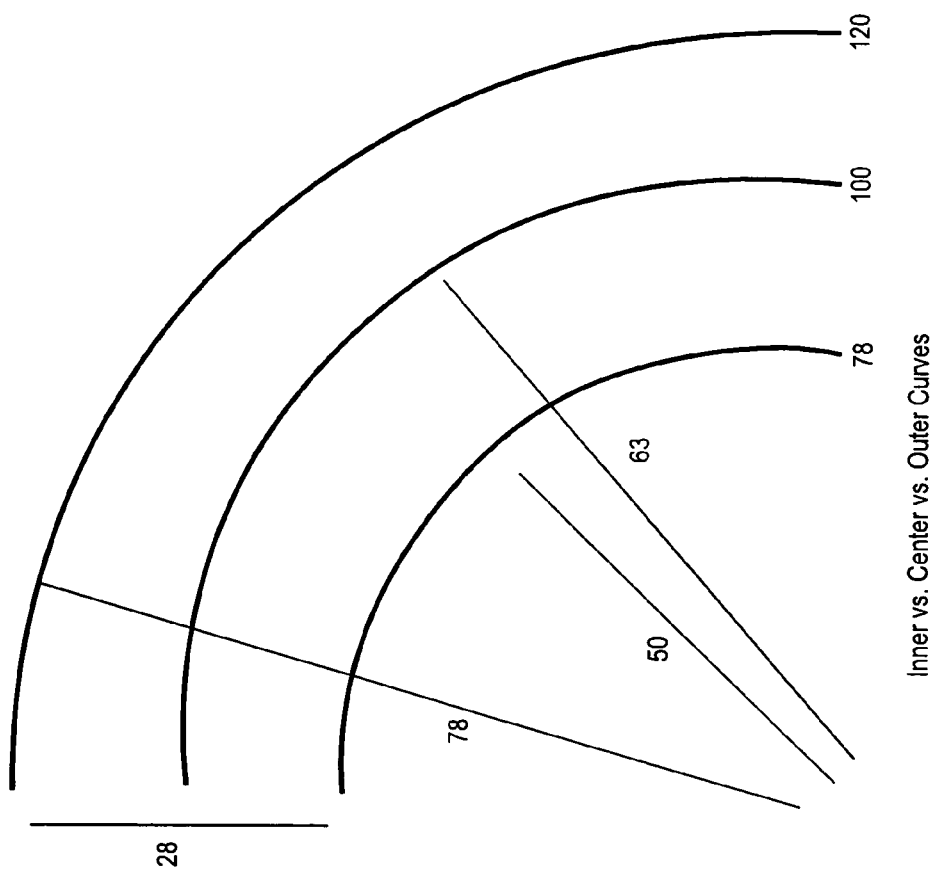
FIG. 57 shows the distances in millimeters between inner curves, center curves, and outer curves.

In FIG. 57, we examine a hypothetical tube device of width 28 mm as it goes around a 90 degree corner. This approximates a graft with an interior radius of 50 mm, a central radius of 63 mm and an outer radius of 78 mm. A simple calculation (taking ¼ of the circumference of three different circles with these diameters) shows us that the inner curve of this tube will be approximately 78 mm, the center curve will travel 100 mm and the outer curve length is 120 mm.

The challenge arises when we seek to predict the excursion of a graft of known length (such as 100 mm) when implanted into a patient with highly curved vessel geometry. Currently the vessel centerline is used for all graft length calculations. This means that the curves above are a good representation for the current system if we were visualizing a 100 mm graft with a diameter of 28 mm extending along a 90 degree corner. Using the centerline as the predictive path, however, assumes that the graft will be equally capable of expanding to 120 mm on one side and compressing to 78 mm on the other if it is to deploy as predicted. While most grafts are able to both expand and compress in some manner, it is desirable to know the minimum and maximum length that our predicted tubes will travel if we are to make better graft length predictions.

Furthermore, it is common in some TAA devices, such as the GORE TAG Thoracic Endoprosthesis, in the Anatomical Requirements section of the "Instructions for Use", to specify a minimum distance (such as 2 cm) from the left subclavian/left common carotid artery to the proximal end of the aneurysm. This minimum distance specification corresponds to the "outer curve" as described above.

14.1.1 Our Solution. Our solution is to measure the length along the perimeter of the device at a set numbers of "longitudes". Because most grafts are more able to compress than expand, we may expect a more physiologically relevant result if we limit our predicted extension to that which has a maximum longitudinal length equal to the graft's natural length.

Figure 58:
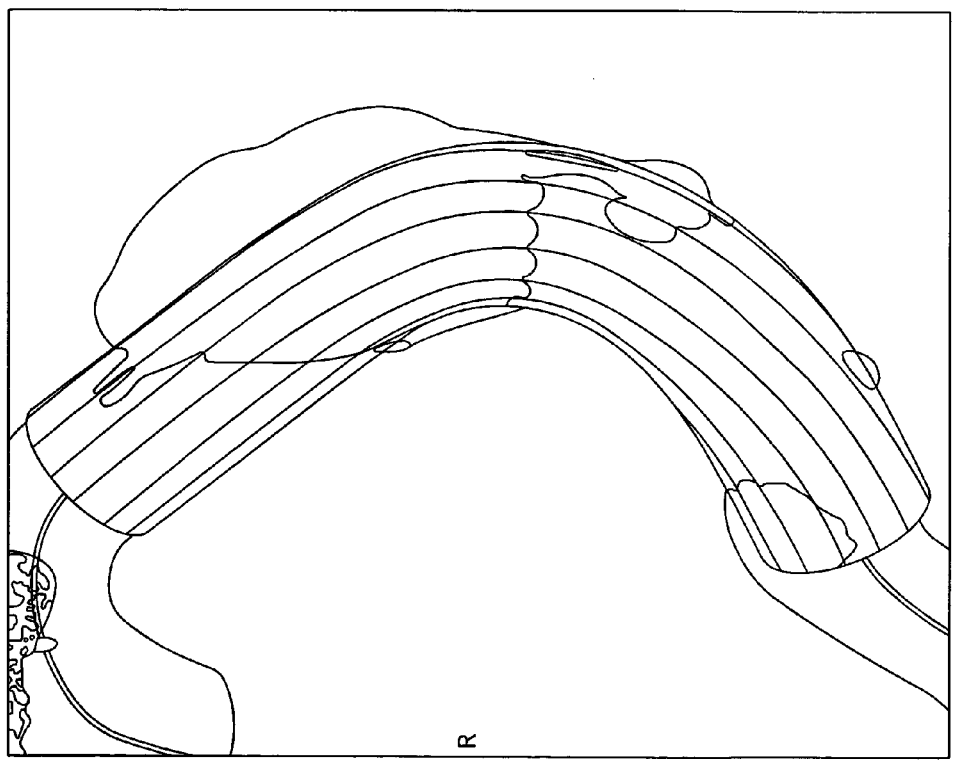
FIG. 58 is a schematic representation of a virtual thoracic graft virtually emplaced in situ.

FIG. 58 shows an example of a Virtual Graft visualization occluding an aneurysm while making a 90 degree turn. The thoracic aorta is frequently this tortuous. Also depicted in FIG. 58 are some of the 16 longitudinally-distributed contours that are defined by this particular "generalized cylinder" representation.

These paths (i.e., the 16 longitudinally-extending lines) represent the contour lines along which the length is calculated. The lines described above and depicted in FIG. 58 range from 170 mm to 228 mm in length. The vessel centerline running down the middle of the device travels 199 mm from the beginning to the end of the virtual device.

14.1.2 Method For Longitudinal Analysis Along A Centerline. FIG. 79 outlines the basic algorithm for calculating the length along an arbitrary number of longitudes. The concept is to march down the centerline, incrementally adding to a bank of longitudinal length counters as we go. The amount to be added is calculated by looking at the orientation of the centerline at the point in question. From the centerline's orientation vector, we create a perpendicular vector. From this new vector (i.e., the perpendicular vector), we rotate around the centerline's axis by a number of degrees relative to the number of longitudinal lengths to be calculated. Pushing this vector out to the radius of the tube gives us the location of a point on the outside of the tube. We then calculate the distance from this point to the last point for this longitude and add this to the total length so far.

Note that the algorithm as described above lends itself easily to a number of extensions.

First, the initial vessel centerline is not limited in any way; it can define an arbitrary three-space path.

Second, the radius does not need to be constant; a convenient formulation is to make the radius a function of the arc-length along the vessel centerline. In this way, it is simple to characterize "graft-shaped" tubes.

In addition to the foregoing, a second analysis method has been added to handle the case in which there is a significant amount of twist in the input centerline. If the centerline twists, it is possible to find a minimum path along a single longitude that does not correspond to a "global" minimum. Additionally, the maximum longitude found in this case will tend to spiral around the vessel and thus not correspond to the TAA anatomy of interest.

In order to handle this case of the centerline that includes a twisting component, a "state-space" search algorithm, such as A* is employed to first find the shortest path on the TAA vessel, between a pair of extents on the defined centerline. The "outer curve" can then be constructed by rotating the "minimum points" by 180 degrees around the given centerline.

The A* cost function is easily defined through the construction of our generalized cylinder as the straight-line approximation moving from latitude line to latitude line. Each state change can be optimized to consider both the vertices and the interpolated path for each latitude. The goal state is defined as any point on the final latitude line. Finally, we can use the steps from the longitudinal analysis above to define the heuristic component of the cost function needed by the A* search.

14.1.3 Summary. In summary, this new tool allows us to better predict the extension of a tube along a curvilinear centerline. Previous methods considered the length on only one path for a given centerline, namely the centerline itself. This new method allows us to predict the length along a number of paths, given a diameter (or diameter function) and curvilinear centerline. The longest one of these paths is likely to be a more accurate predictor of the ending point for stents in situ.

14.2 The VolumeOblique Measurement.

14.2.1 Introduction. The change in total vessel volume is a critical measure for assessing the effectiveness of surgical repair of aneurysms in both the abdominal aorta aneurysm (AAA) and thoracic aorta aneurysm (TAA). The previous volume measurement calculates volumes through counting voxels within Regions of Interest (ROI, or segmentation) defined in the axial slices acquired from computed topographic angiography (CTA) imaging. However, this method is not as easily utilized in the TAA case, since the ascending and descending portions of the flow lumen are both captured within the same axial image. It is important to measure volume changes in the ascending or descending portion of the thoracic aorta independently for assessing changes within the TAA. Thus, there is hereinafter provided a novel volume measurement strategy with the aid of oblique planes perpendicular to the vessel centerline which provides a precise and convenient tool to calculate vessel volume along a medial curve.

14.2.3 Methodology. The two basic inputs to the VolumeOblique measurement are:

(i) ROIs derived from the medical image that define the vessel anatomy to be measured; and (ii) centerlines that define the three-dimensional path taken by the vessel and from which oblique planes perpendicular to the vessel can be derived.

The VolumeOblique measurement comprises the technique of integrating the surface visualization with medical image processing, for which four steps are performed:

(A) selection of beginning and ending planes for the oblique volume;

(B) volume removal through the 3D seed flood algorithm through selected ROIs;

(C) partitioning of the oblique volume through analysis of the vessel centerline to define the "integrable" space; and (D) VolumeOblique measurement reporting.

Figure 59:
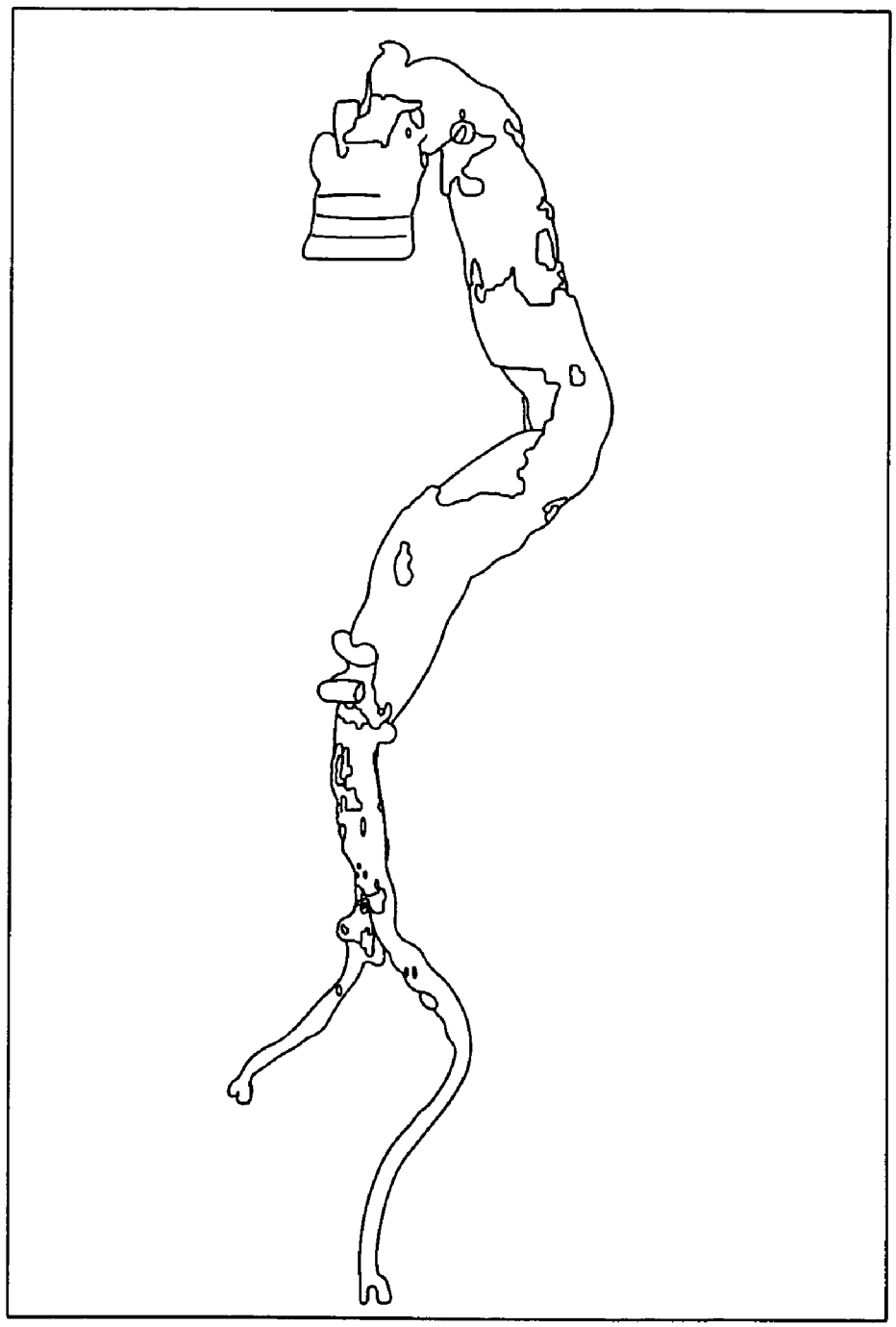
FIG. 59 is a schematic representation of the anatomical region of interest showing blood flow (in red), calcified plaque (in yellow), and thrombus (in white)
Figure 60:
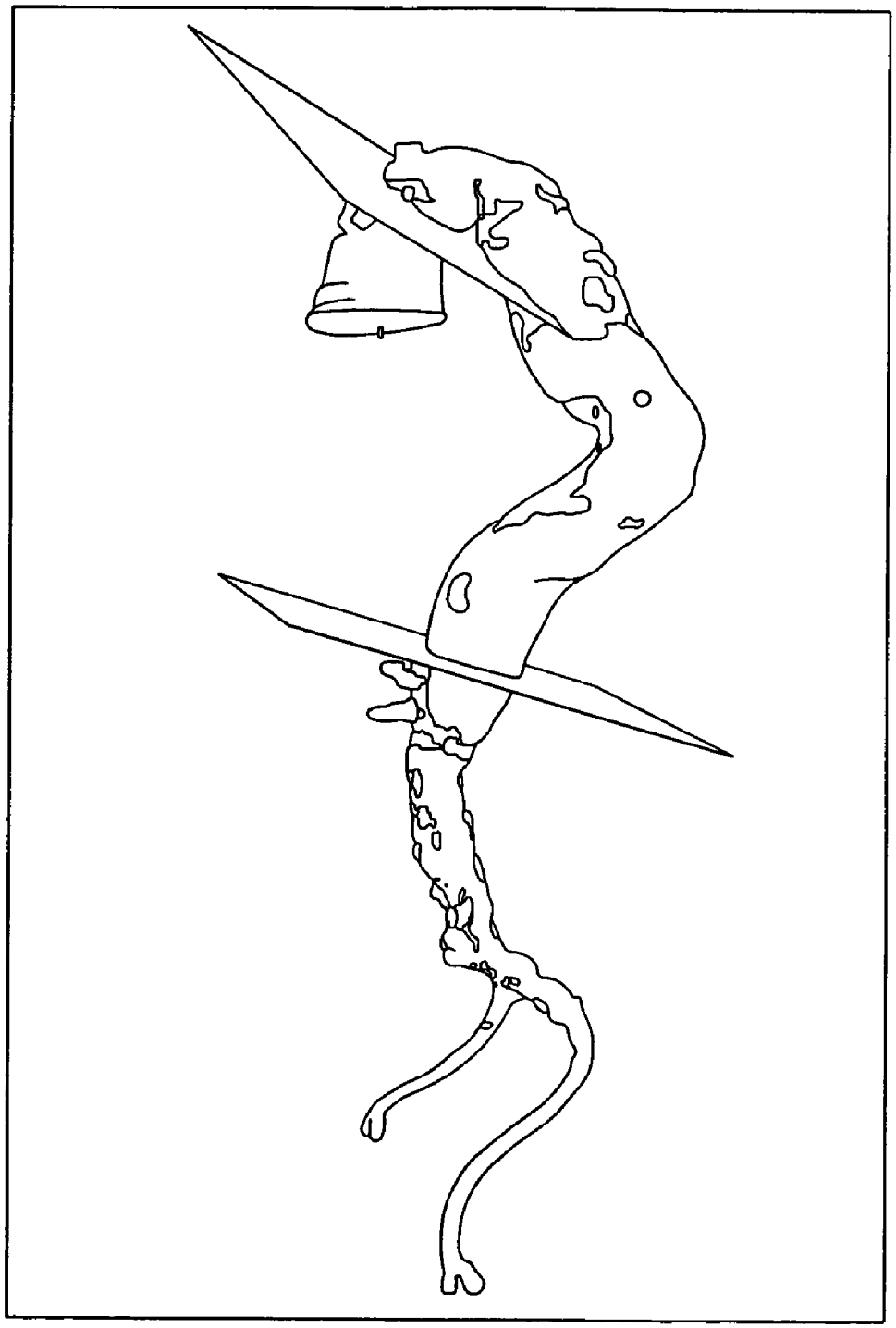
FIG. 60 is a schematic representation showing a volume region defined by two oblique MPR planes.
Figure 61:
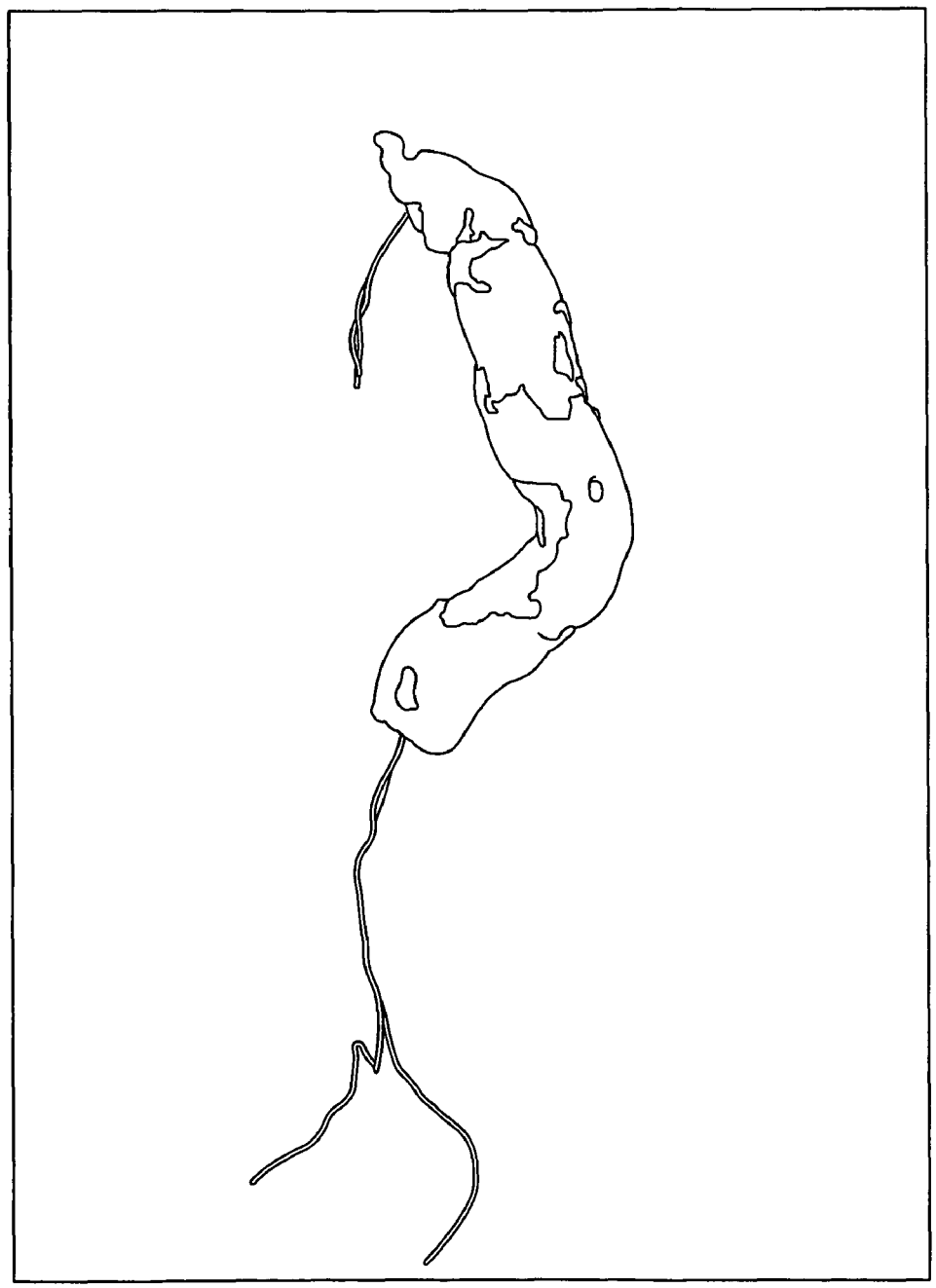
FIG. 61 is a schematic representation showing the surface model of a target volume.

The workflow for creating the VolumeOblique measurement is shown in FIGS. 59, 60 and 61. FIG. 59 shows the original surface model defining the TAA within the source CT scan. FIG. 60 shows the selection of the oblique volume endpoints with two oblique planes. FIG. 61 shows the surface model of the target volume to be reported after the VolumeOblique method has been run.

14.2.3A. Selection of Beginning and Ending Planes for the Oblique Volume. The present system provides the tools to construct the 3D shaded geometric surface model of blood flow, calcified plaque, and thrombus from the regions of interest defined by pre-segmented data. The medial curve paths (centerlines) are automatically extracted for aorta, aorta left iliac, and aorta right iliac arteries. The oblique planes along each medial curve path are reconstructed with a multi-planar reformatting (MPR) algorithm.

For TAA data, the ascending and descending portions of aorta are acquired within the same axial image. The primary objective of the volume oblique measurement is to find a way to divide the ascending and descending portions of TAA into separate volumes. With two oblique planes (start and end planes) specified by the user interactively along the medial curve path, an enclosed region between two planes is defined as the target region for the volume measurement.

The parametric formulation of a 3D plane is represented by:

$$N_x \cdot x + N_y \cdot y + N_z \cdot z = D \quad (1)$$

in which the normal vector to the plane $(N_x, N_y, N_z)$ defines the space inside or outside of the plane.

The two oblique planes defining the end points for the calculation are formulated as:

$$\text{Start plane:} A_1 \cdot x + B_1 \cdot y + C_1 \cdot z = D_1 \quad (2)$$

$$\text{End plane:} A_2 \cdot x + B_2 \cdot y + C_2 \cdot z = D_2 \quad (3)$$

in which $(A_1, B_1, C_1)$ and $(A_2, B_2, C_2)$ are the normal vectors of the start and end planes.

A closed oblique volume region will be defined by choosing two oblique MPR planes: (1) outside the start plane toward the normal direction, and (2) inside the end plane toward the opposite direction of normal. The oblique volume is represented by:

$$\begin{cases} A_1 \cdot x + B_1 \cdot y + C_1 \cdot z > D_1 \\ A_2 \cdot x + B_2 \cdot y + C_2 \cdot z < D_2 \end{cases} \quad (4)$$

14.2.3B Volume Removal Through 3D Recursive Seed Flood Through Defined ROIs. We apply volume removal instead of volume accumulation, since the latter method has the potential problem of accumulating an enclosed oblique region more than once. In our strategy, the desired 3D volume is first removed between two oblique planes, then a "masking" operation is performed to obtain the desired segmented volume that comprises our target region.

Figure 63:
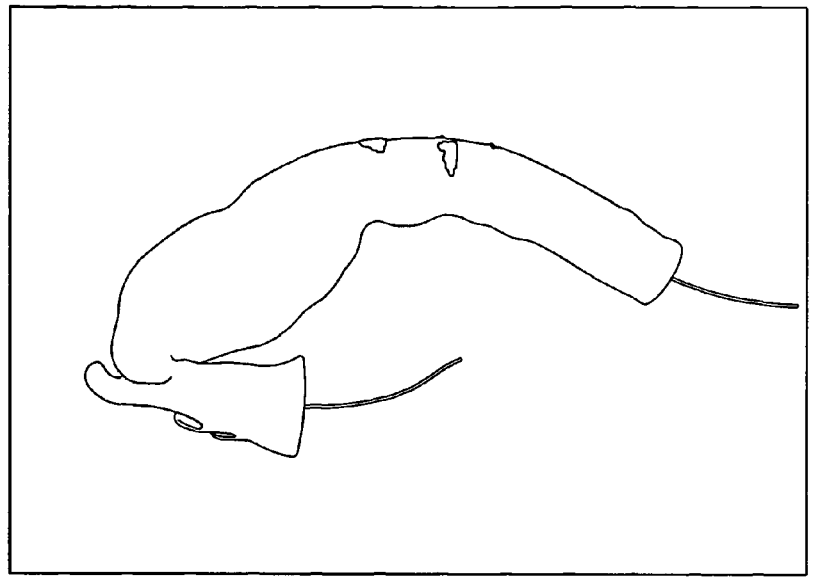
FIG. 63 is a schematic representation showing the surface models for the start and end oblique planes at slices 65 and 360, respectively.
Figure 62:
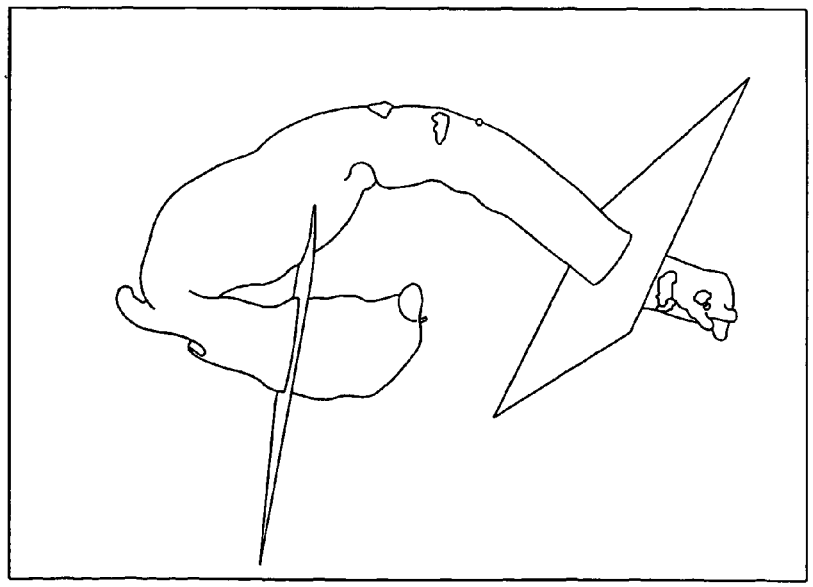
FIG. 62 is a schematic representation showing the original surface models of TAA data before the oblique volume removal.
Figure 65:
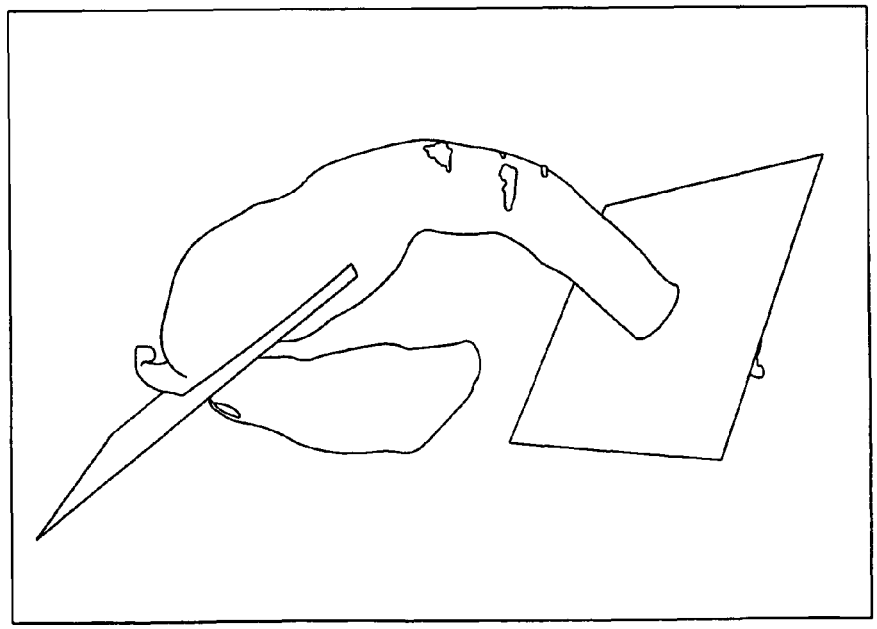
FIG. 65 is a schematic representation showing the volume oblique removal method leading to an incorrect result due to use of a single flood.
Figure 64:
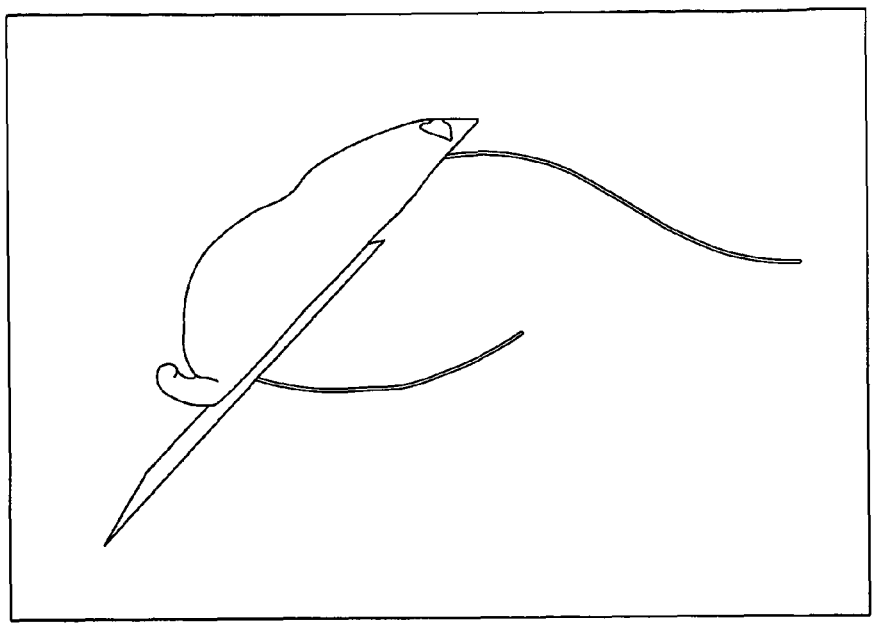
FIG. 64 is a schematic representation showing the difficult case where the start and end oblique planes are at slices 115 and 360, respectively.

The 3D seed flood algorithm is applied recursively for volume removal on a "6-connected" neighborhood. The points on the medial curve between start and end planes are first appended onto a seeds list. If the interior color is equal to the desired segmented region (blood flow, calcified plaque, and/or thrombus), the color of that voxel will be changed to the mask color for volume removal. This algorithm for 3D seed flood removal is described as follows:

(1) Input x, y, z coordinates of seed, color of segmented areas (segColor), and color of mask (maskColor);

(2) If color (x,y,z)==segColor, then color(x,y,z)=maskColor; and (3) x=x+1, go to step 1;
x=x−1, go to step 1;
y=y+1, go to step 1;
y=y−1, go to step 1;
z=z+1, go to step 1;
z=z−1, go to step 1;

14.2.3C Partitioning Of The Oblique Volume. In some extreme cases, due to the tortuous nature of the vessel, the start and end planes may not clearly define an isolated volume region. We will show such a difficult case for volume oblique removal algorithm. FIG. 62 shows the original surface models of TAA data before the oblique volume removal. FIG. 63 shows the surface models for the simple case where the start and end plane numbers are 65 mm and 360 mm from the TAA origin to the heart, respectively. FIG. 64 shows the difficult case when we select the start and end plane numbers as 115 and 360, respectively. FIG. 65 shows volume oblique removal with incorrect result by using a single flood operation.

We have developed a novel strategy to partition the whole of the desired volume into sub-volumes, which are enclosed by two intermediate oblique planes between the selected start and end planes. Each time, we apply the seed flood removal within this new sub-volume and then repeat the process until the whole volume has been completely "masked".

Consider the normal vector defined by each of the oblique planes along the centerline. Note that this vector corresponds exactly to the 3D tangent along the curve and can be easily written as a tensor function of arc length. The interior angle between any two vectors can be easily found by taking the dot product of those vectors.

The interior angle transition from ascending to descending portion of TAA surface is dramatic. Because of the way in which the normal vectors "flip" from up to down, this angle can approach 180 degrees.

Our method for partitioning a three-space based on obliquely defined cutting planes is based on the angle changes along the medial curve path. We search from the start plane and consider tangent vectors at increasing arc lengths. If the angle change is equal to or greater than 45 degrees, we select this plane as an intermediate end plane. The region between this intermediate end plane and start plane will be treated as a sub-volume. Then, we set the intermediate plane as the start plane and continue this process until the whole volume is fully partitioned into sub-volumes. Then the points of the medial curve within the sub-volume are added into the seed list (we preferably use 1 mm increments).

This procedure for subdivision of the oblique volume by considering angle changes for the curve's tangent vectors is illustrated as follows:

(1) search from the centerline point of start plane $P_{start}$;

(2) calculate the angle change between the normal of the following plane along the medial curve path and that of start plane $P_{start}$;

(3) if the angle change of the normal is greater than 45 degree, then set this plane as intermediate end plane $P_{end}$; the region between $P_{start}$ and $P_{end}$ is defined as a sub-volume;

(4) continue this process until the whole volume is divided into sub-volumes;

(5) the points along the medial curve within the sub-volume are appended onto the seed list; and (6) apply seed flood removal algorithm within each sub-volume continuously to remove whole enclosed volume.

Figure 67:
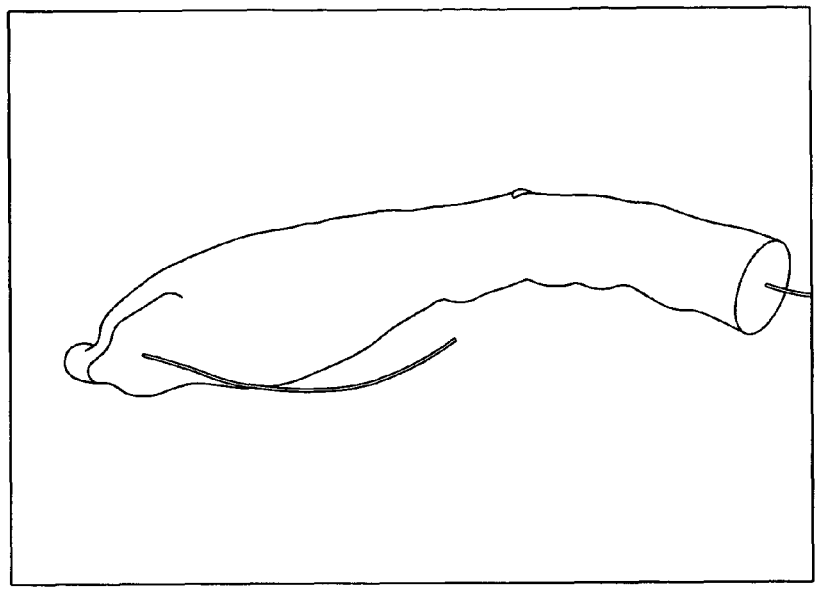
FIG. 67 is a schematic representation showing detail of the transition region from ascending to descending arch of TAA.
Figure 66:
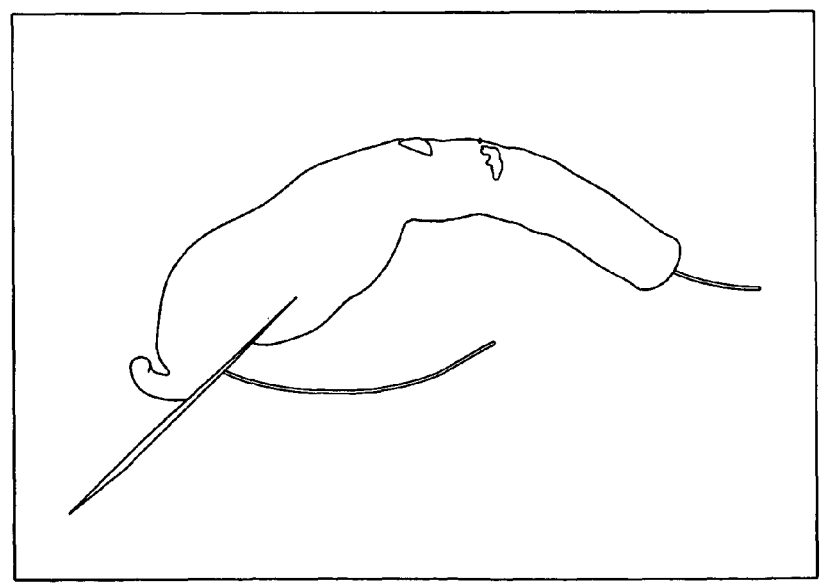
FIG. 66 is a schematic representation showing anterior-posterior (AP) view of the surface model with cut plane after volume oblique removal.

FIG. 66 shows the anterior view of the surface model after VolumeOblique removal. FIG. 67 shows a detail of the cut plane around the arch region transition from ascending to descending after VolumeOblique removal.

14.2.3D VolumeOblique Measurement Reporting. An image volume will be generated including the segmented areas after the volume oblique removal. The target volume is calculated by multiplying the number of voxels for the segmented area (blood flow, thrombus, and calcified plaque) with the physical volume of a voxel, which is expressed as:

$$\text{Volume} = N \cdot V_{pixel} = N \cdot V_x \cdot V_y \cdot V_z \quad (5)$$

in which N is the total number of voxels for the segmented area; and $V_x$, $V_y$ and $V_z$ are the voxel spacing in x, y, z directions, respectively. For a typical CT scan, these values are 0.7 mm, 0.7 mm and 2 mm.

Figure 68:
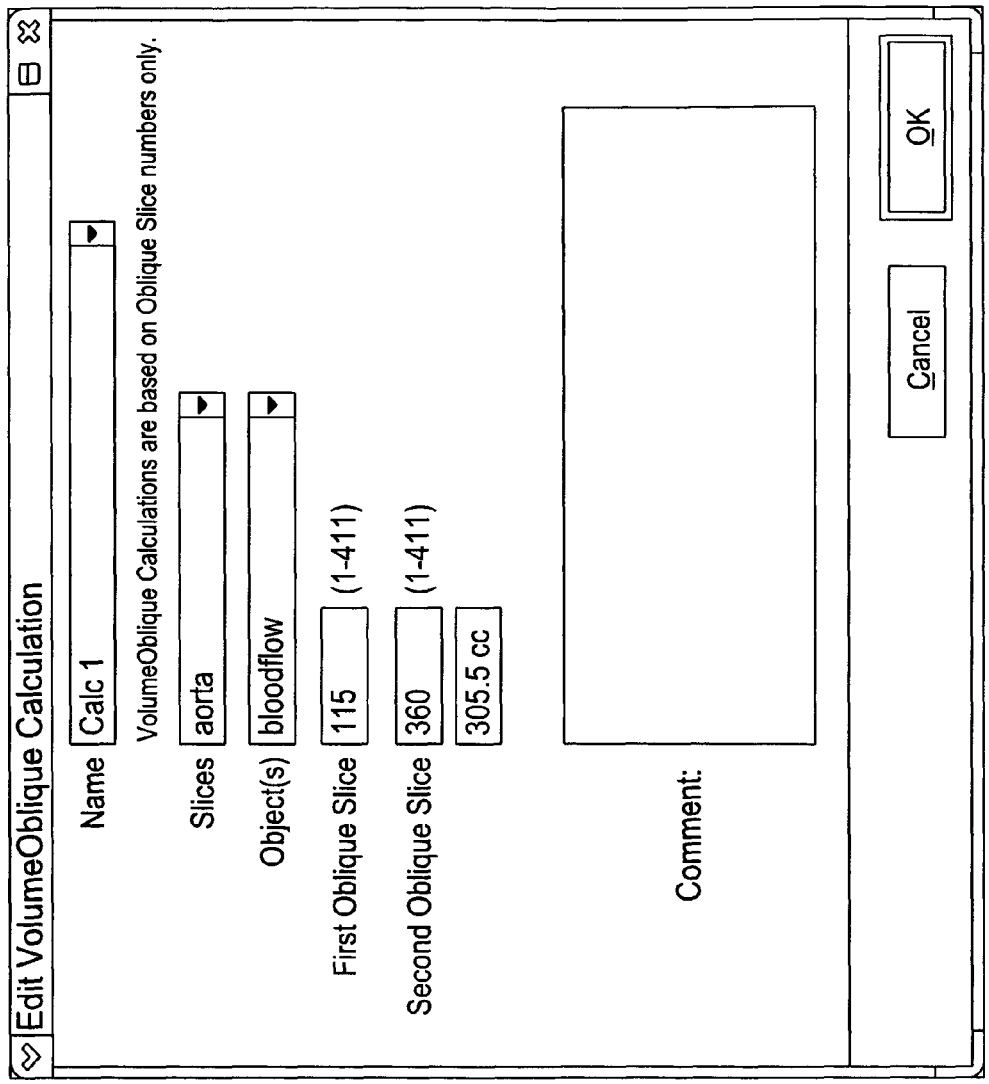
FIG. 68 shows a graphical user interface (GUI) for use with the volume oblique measurement apparatus.

FIG. 68 shows our graphical user interface (GUI) for performing the VolumeOblique measurement. The user can set the type of medial curve path (aorta, aorta left iliac or aorta right iliac), select from among predefined regions of interest (bloodlflow, thrombus, calcium, or all) as well as the first and second oblique MPR planes. The volume of the desired segmented area between two oblique planes is then calculated and displayed on the fly (e.g., typically about a second). The unit of volume is cubic centimeters.

14.2.4 Validation. To verify the accuracy of our volume oblique measurement algorithm, a file with the segmentation areas is automatically generated which represents the object to be measured. The 3D surface model of the object can then be built and visualized to validate the algorithm.

Another validation has been performed to ensure that the new volume calculation algorithm provides an accurate measure of vessel volume for the area defined. In order to confirm the volume calculation, we first created a volume oblique measurement using this volume oblique strategy at the left carotid origin to divide the TAA into ascending and descending portions.

An estimate of this TAA volume was then made by finding the volume of the whole TAA, then subtracting half the volume from just the arch portion. This represents the only way with the current tools to estimate the volume of the aorta in the region required and does not differentiate between aneurysm in the ascending versus descending portions appropriately.

14.2.5 Conclusion. A novel strategy to measure volume oblique has been provided herein. By "integrating" the volume defined by pre-determined regions of interest and user selected oblique cutting planes, it demonstrates the ability to accurately measure TAA volumes. Experiments have been conducted to validate this volume measurement algorithm, which we believe provides an accurate and convenient measure for characterizing the effectiveness of TAA repair.

15. Inner and Outer Curve Calculation 15.1 The Problem. As noted above, the aforementioned system, sometimes referred to as the Preview® product by M2S, Inc. (formerly Medical Metrx Solutions, Inc. of West Lebanon, N.H.), is intended to be used to aid physicians in the implantation of grafts or stents, among other things.

Figure 69:
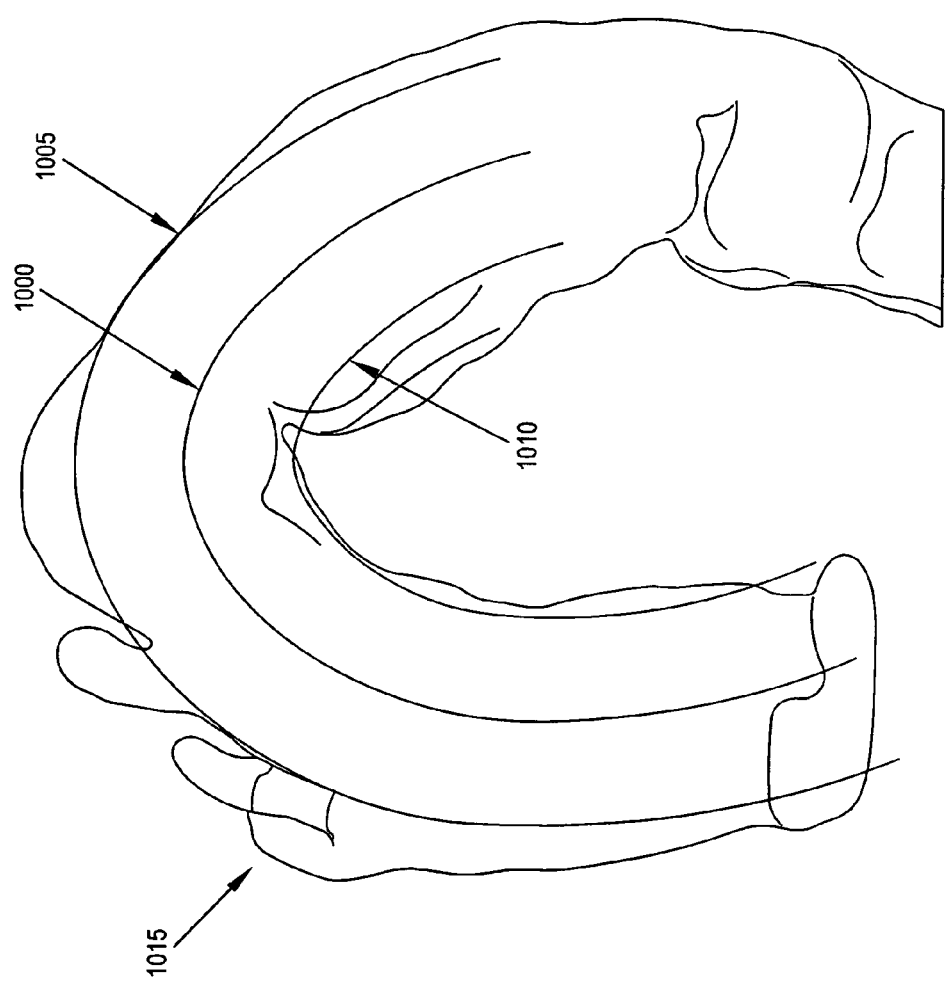
FIG. 69 is a schematic view showing the centerline, inner and outer curves for a tortuous vessel.

In some forms of the invention, the length of a graft or stent is determined by the three-dimensional centerline that is representative of a blood vessel. The Preview® product has proven to be a very useful tool in characterizing the nature of Abdominal Aortic Aneurysms (AAA) and determining the size and type of stents to be used to treat the same. However, for Thoracic Aorta Aneurysms (TAA), where the vessel is larger and more tortuous, the length along the inside and outside curves of the graft or stent that will be implanted along the vessel could be significantly different. Thus, this raises the question of whether the length of the device (i.e., graft or stent) chosen by the centerline length is long enough to cover the tortuous vessel. See, for example, FIG. 69, where three curves (i.e., a centerline 1000, an outer curve 1005 and an inner curve 1010) are drawn on a real TAA vessel 1015.

In a typical patient, the actual length measured on inner curve 1010, centerline 1000 and outer curve 1005 might be 140.4 mm, 188.9 mm and 237.3 mm, respectively. Thus, the difference between the centerline and outer curve is 48.4 mm. This is a substantial number which, if known in advance, might results in the selection of a different size graft or stent than if only the length of the centerline were taken into consideration.

In the preceding section, two new approaches are disclosed for measuring large, tortuous vessels such as the thoracic aorta:

(i) Longitudinal Analysis of a Generalized-Cylinder Constructed from a Curvilinear Centerline; and (ii) The VolumeOblique Calculation.

Approach (i) is an efficient and simple approach to calculate the inner and outer curves. In this approach, a set of longitudes are constructed from the centerline with an offset of the radius of the graft or stent. The shortest and longest longitudes along the perimeter of the device (i.e., the graft or stent) are defined separately as the inner and outer curves. While this approach is efficient and simple, it can be inadequate in cases where the centerline is twisted. This is because the constructed longitudes will spiral in the case of a twisted centerline. Obviously, the longest longitude in this case will not necessarily be the same as outer curve 1005 shown in FIG. 69. See, for example, FIG. 70, which shows a device (i.e., graft or stent) 1020 constructed from a twisted centerline 1025.

15.2 The Solution. The present invention provides an approach for eliminating the inaccuracies associated with twisted centerlines. As a result, the problem of spiraling longitudes is eliminated, thereby permitting accurate calculations of the inner and outer curves of a tortuous vessel, e.g., the thoracic aorta.

Furthermore, the present invention provides an approach which can be used retroactively with previously-conducted patient studies with or without twisted centerlines. This feature is important, since it leaves the centerline unchanged. Leaving the centerline unchanged is highly desirable since oblique slices are built from the centerline. In this way, the graft or stent can be constructed in the 3D visualization without any wrinkled or wavy surface, but the centerline still keeps its original status, thereby simplifying the presentation of oblique slices.

Figure 70:
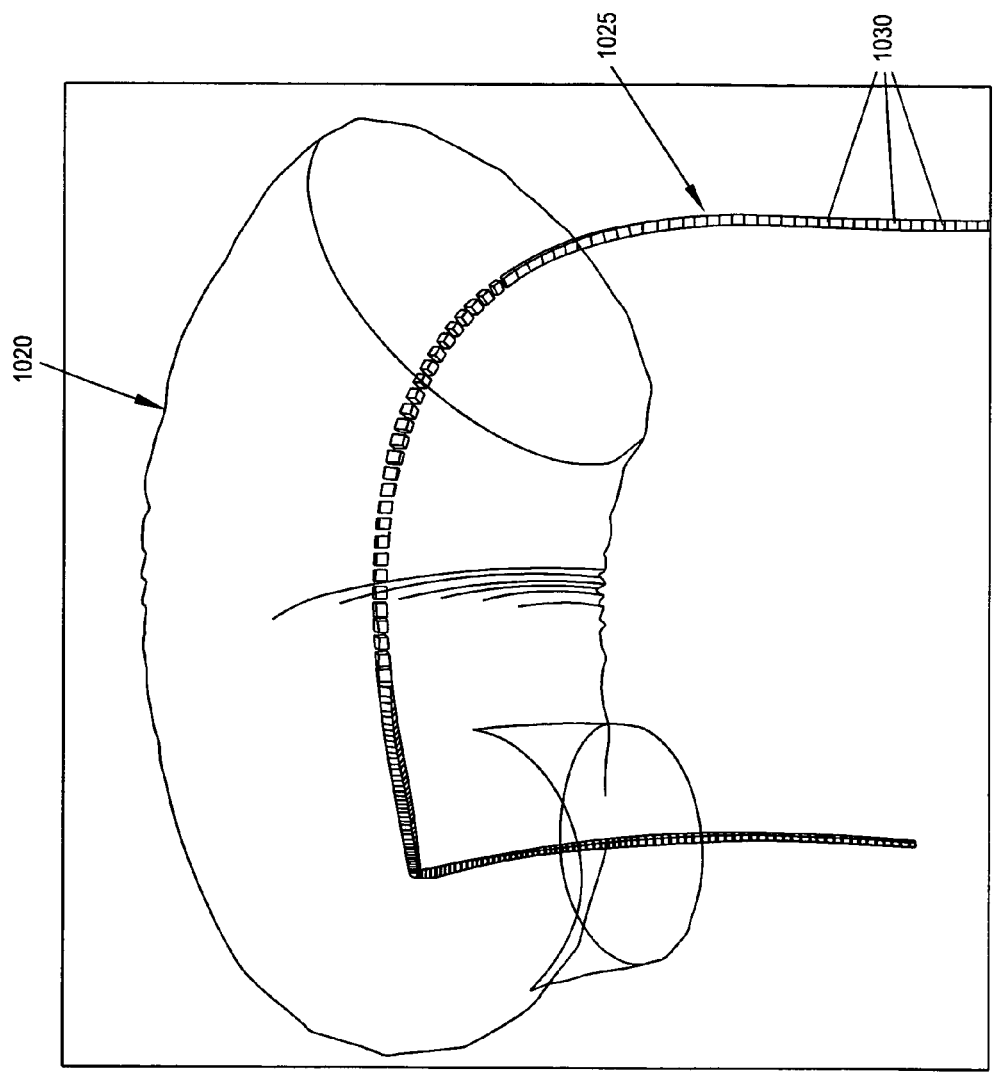
FIG. 70 is a schematic view showing a twisted centerline within a virtual graft or stent.

As seen in FIG. 70, the three-dimensional centerline 1025 consists of a set of cubes 1030. Each cube 1030 is located in the model geometry space by its center point and directed by three directional vectors such as X-, Y- and Z-vectors. The present invention eliminates the effects of twisted centerlines by determining the center point of each cube and re-calculating the three directional vectors so that the effects of centerline twisting is eliminated. Then, the longitudes are built based on the re-calculated results.

Figure 71:
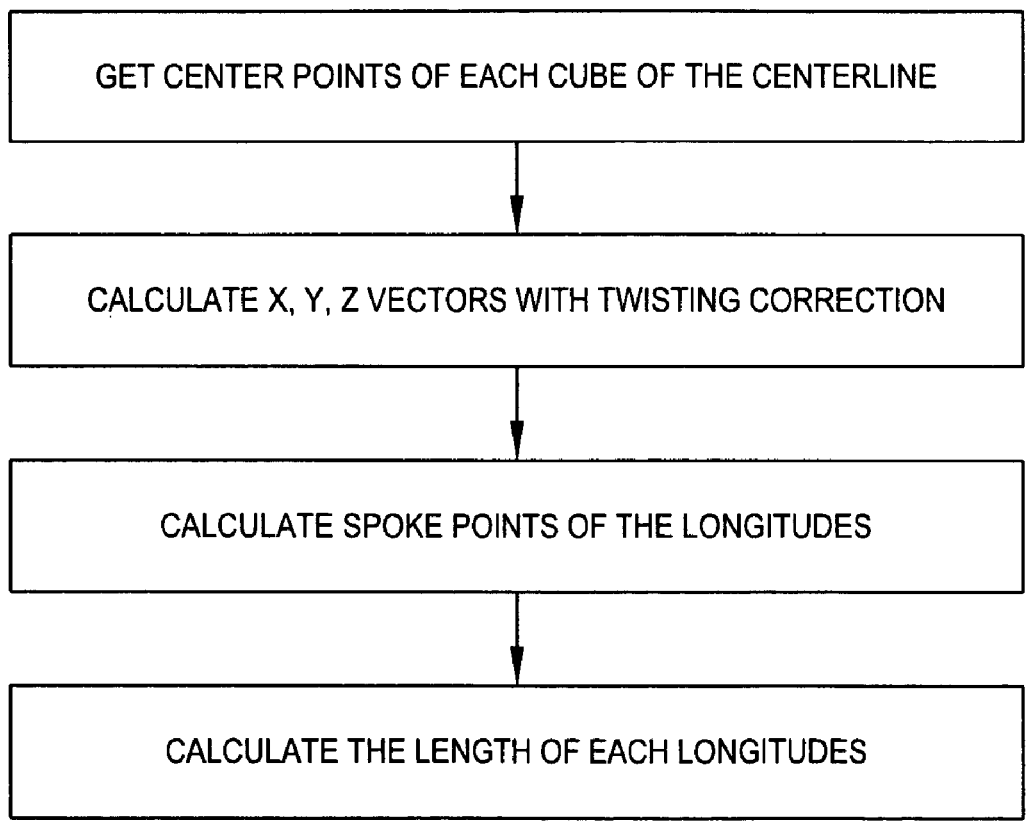
FIG. 71 is a flow chart showing how the inaccuracies associated with twisted centerlines may be eliminated.

FIG. 71 is a flowchart illustrating the basic steps taken in building longitudes which are not affected by twisting centerlines. More particularly, and as will hereinafter be discussed in further detail, the center point of each cube 1030 in centerline 1025 is first acquired. Then the X-, Y- and Z-vectors are calculated, correcting for any twisting. Next, the spoke points of the longitudes are calculated. And then the length of each longitude is calculated. Once the length of each longitude is calculated, it is then an easy matter to select the longest and shortest longitudes simply by traversing all of the longitudes as described above.

Figure 72:
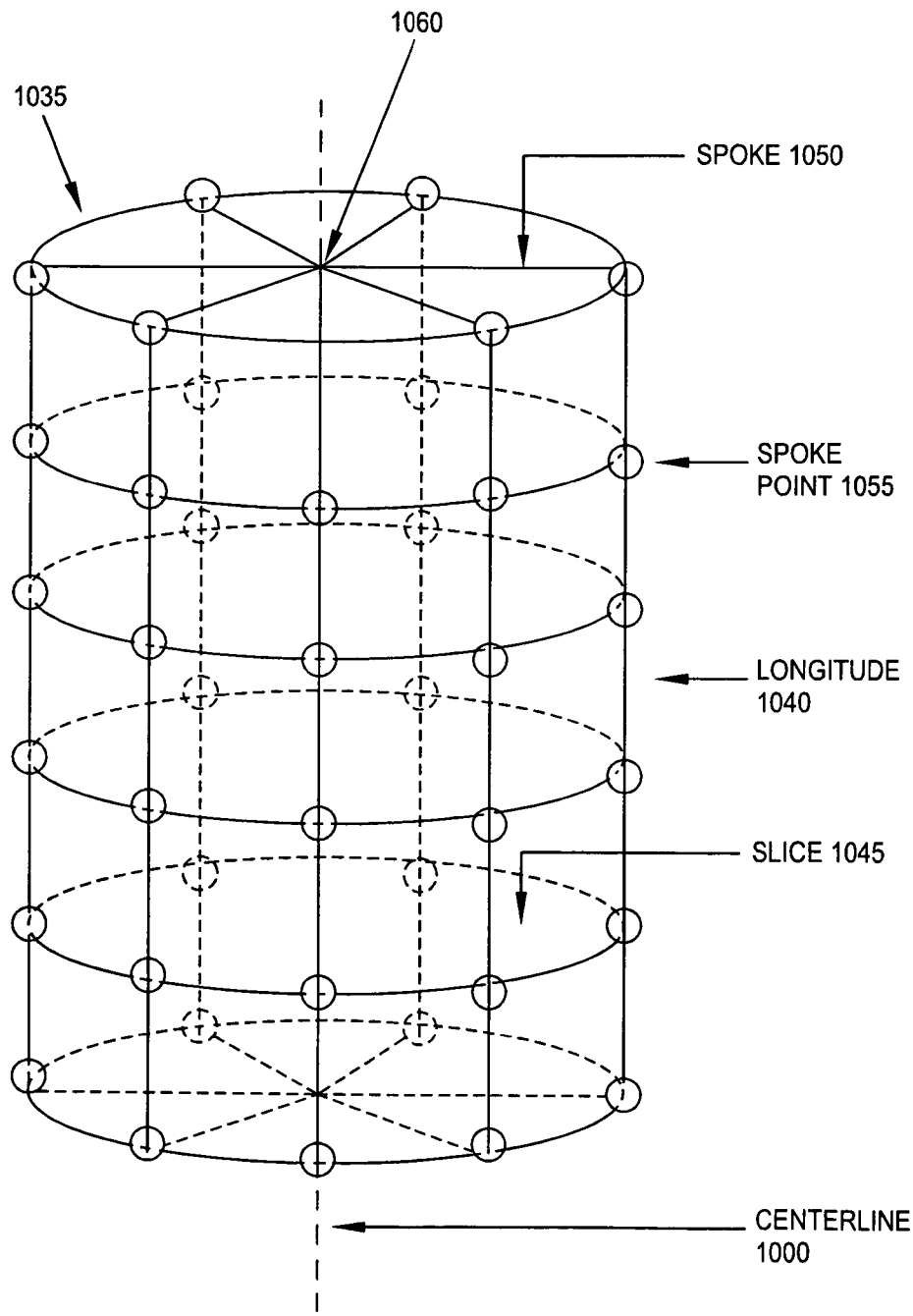
FIG. 72 is a schematic view showing the 3D components of a hypothetical tube device.

15.3 3D Components. Looking next at FIG. 72, it will be seen that the 3D components of a hypothetical tube device 1035 generally comprise longitudes 1040, slices 1045, spokes 1050 and spoke points 1055, with hypothetical tube device 1035 being set about centerline 1000. It will be seen that a spoke point 1055 is a point constructed by moving the center point 1060 of centerline 1000 with the offset of the radius of the device along the axis of the centerline. The number of spokes 1050 associated to a centerline point 1060 is decided by the number of longitudes 1040, and each longitude is constructed from a set of spoke points 1055 (the end point of the spoke) that are along the same radiating direction. The direction is decided by $\alpha$, the angle between radii. Then the number of longitude points is decided by the number of center points between the start slice and the end slice.

FIG. 80 provides exemplary pseudocode for calculating inner and outer curves 1010 and 1005, respectively.

From the pseudocode shown in FIG. 80, it will be seen that the calculation is simple and efficient, and can be done in linear time. The calculation starts from the start slice and travels on all spoke points along the same longitude and simply adds the distance between any two adjacent points together. When the calculation ends at the end slice, the length of the longitude is stored (e.g., in the array of pathLength). The index of the array corresponds to an individual longitude.

15.4 Parameters. As shown in the pseudocode shown in FIG. 80, the length of the longitude/curve is determined by three parameters:

(i) the radius or diameter of the device;

(ii) the start and end slice; and (iii) the number of longitudes.

The first two parameters are supplied by inputs from the user. The third parameter is set as a constant.

Figure 73:
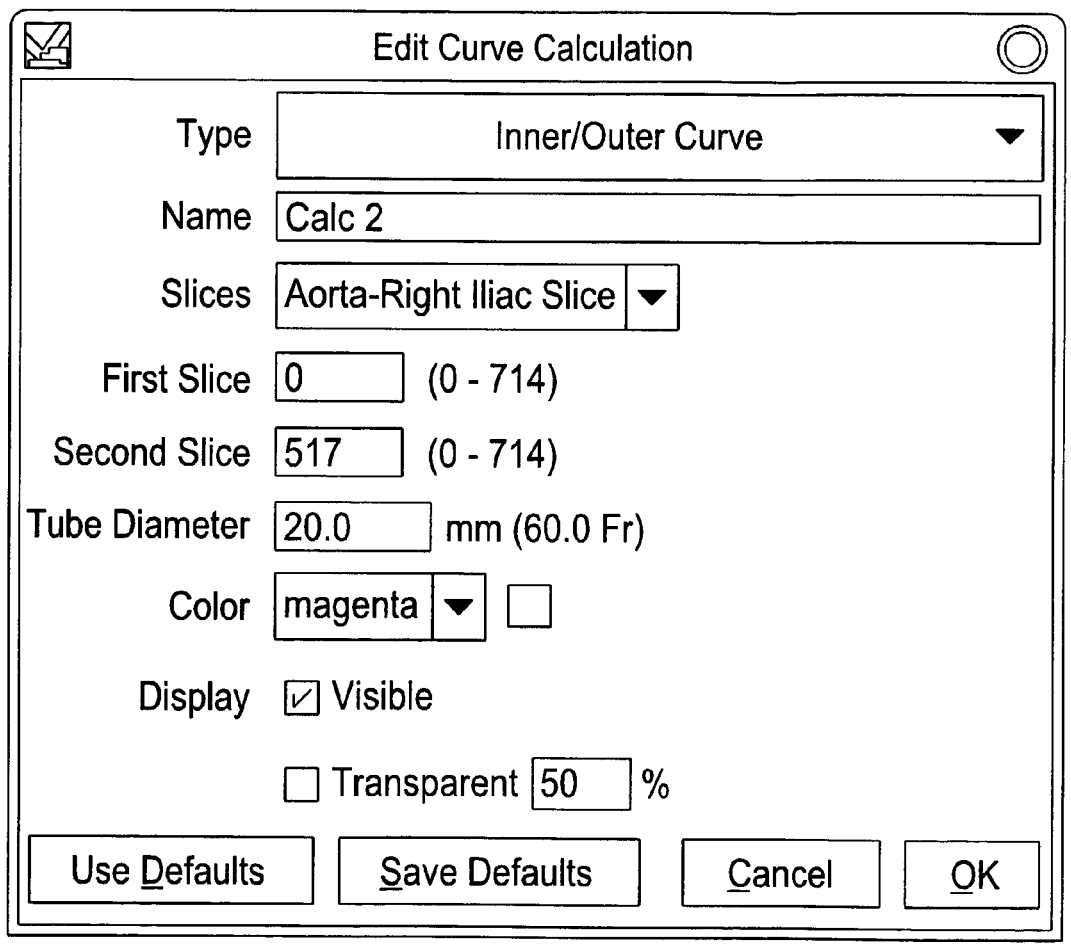
FIGS. 73-77 are various dialogs and menus which may be presented to the user in one preferred implementation of the present invention.

15.5 Curve Calculation Dialog. In one preferred implementation of the present invention, the curve calculation can be accessed from a main menu or calculations tab. The curve calculation dialog is shown in FIG. 73. The particulars of the dialog box are as follows:

Type: select measurement of Inner Curve or Outer Curve or both of them

Name: customize calculation name if users prefer

Slices: select a slice type (for TAA, there is no difference on slice types)

First Slice: where the device would be placed

Second Slice: where the device ends

Tube Diameter: the diameter of the placed device

Color: color used to paint the curve

Figure 74:
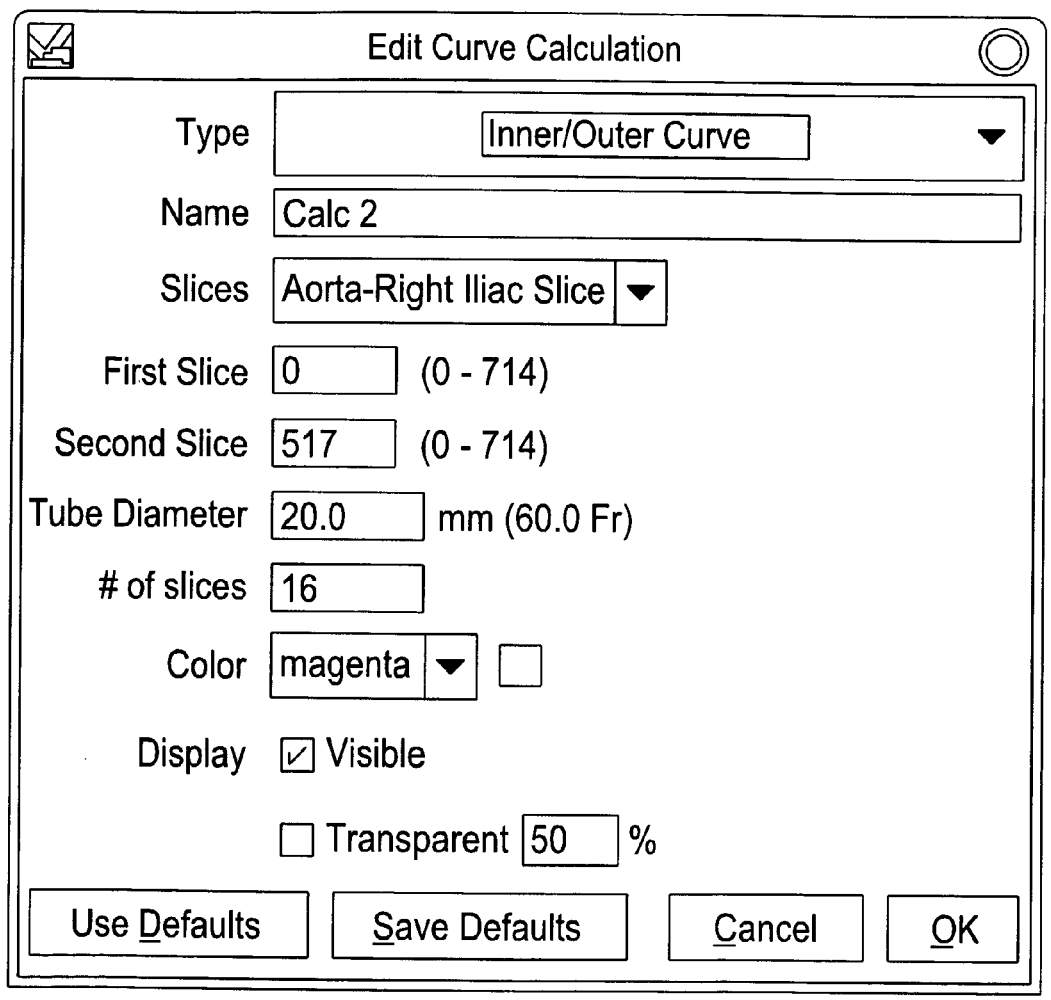

Display: can be hidden or set with transparent level 15.6 "curvez" Curve Calculation Dialog. In one preferred form of the invention, the curve validation tool can be activated by typing "curvez". FIG. 74 illustrates the "curvez" dialog that has the same fields as the regular curve dialog shown in FIG. 73. The only difference is the "# of Sides" field where the number of longitudes can be set.

Figure 75:
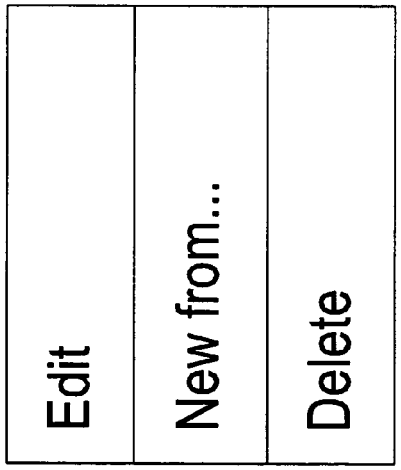

15.7 Curve Calculation Popup Menu. The curve calculation popup menu is shown in FIG. 75. The particulars of the curve calculation popup menu are as follows:

Edit: open the curve calculation dialog shown in FIG. 73

New from: clone an existing curve calculation

Figure 76:
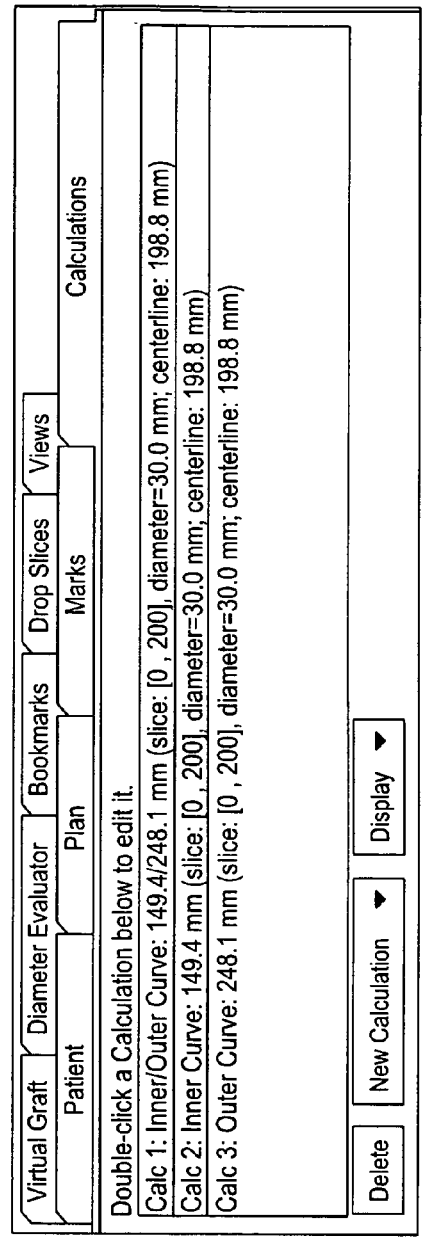

Delete: remove the calculation 15.8 Result Display Window. The calculation results are displayed to the user, preferably in a "Calculations" tab such as in the format shown in FIG. 76.

Figure 77:
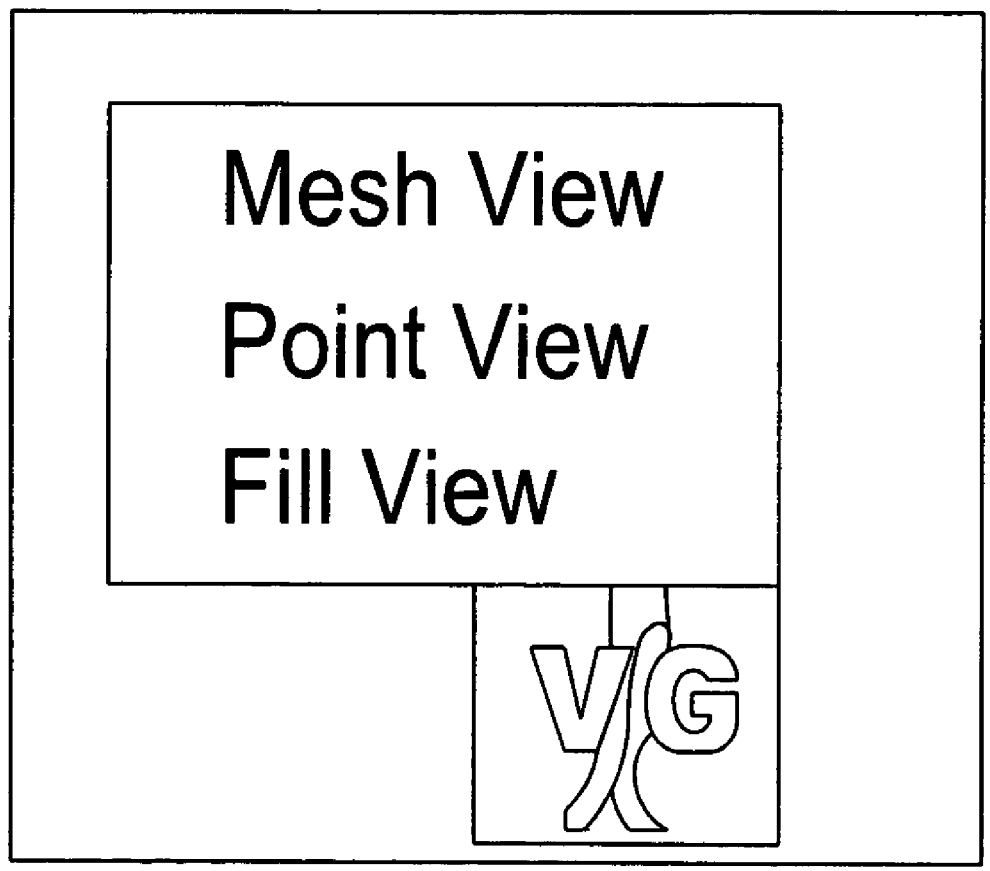
Figure 78:
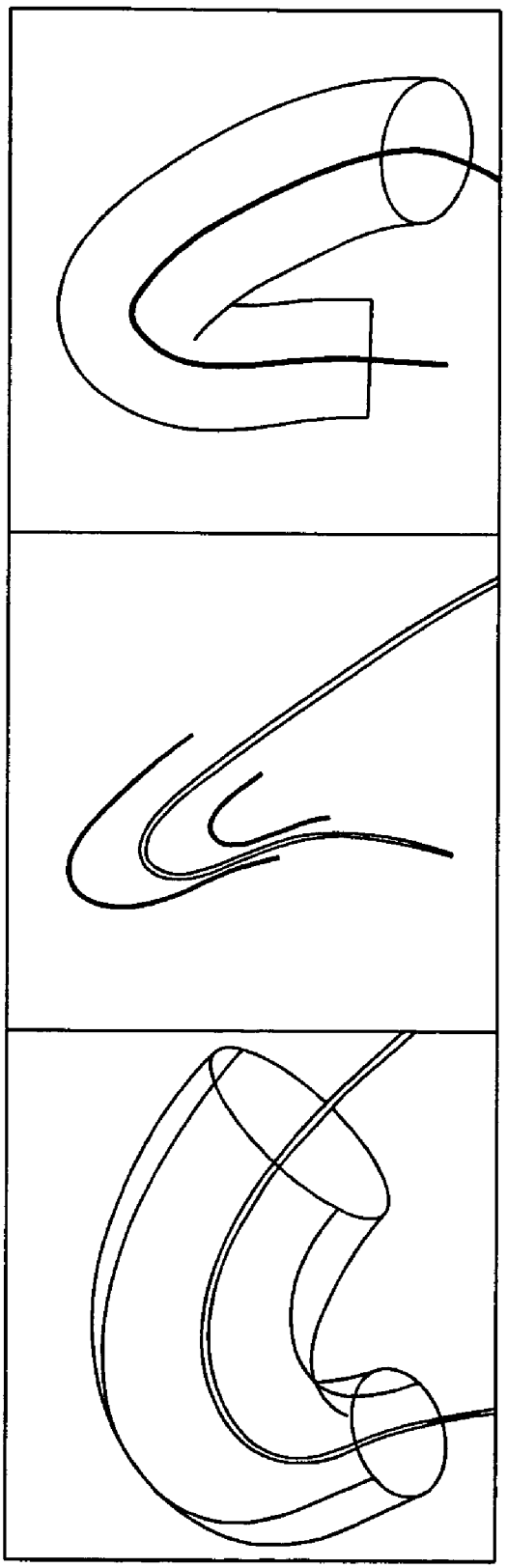
FIG. 78 is a schematic view showing mesh, point and fill views generated in connection with the present invention.

15.9 Change View Mode. In one preferred implementation of the system, the user can choose different view modes, such as by using the menu choices shown in FIG. 77. These are the three different modes of viewing Mesh view: show polygons and longitudes Point view: show longitudes in dotted lines Fill view: regular view FIG. 78 shows the corresponding results for selecting the mesh, point and fill modes, respectively.

Preview® Product of Medical Metrx Solutions

Numerous of the foregoing features are implemented in the Preview® product offered by M2S, Inc. (formerly Medical Metrx Solutions, Inc., formerly Medical Media Systems) of West Lebanon, N.H.

Further Modifications

It is also to be understood that the present invention is by no means limited to the particular construction herein disclosed and/or shown in the drawings, but also comprises any modifications or equivalents within the scope of the claims.

What is claimed is:

1. A method for deploying a device in a tortuous vessel, comprising:
   creating, by a processor, a virtual representation of the tortuous vessel;
   placing, by the processor, a virtual generalized-cylinder within the virtual representation of the tortuous vessel, wherein the virtual generalized-cylinder is placed within the virtual representation of the tortuous vessel by the processor (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;
   measuring, by the processor, length along the perimeter of the virtual generalized-cylinder at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline;
   determining, by the processor, the maximum measured length;
   selecting, by a physician, a device based upon the maximum measured length; and
   deploying, by the physician, the device in the tortuous vessel.

2. A method according to claim 1 wherein the amount to be added to the array of longitudinal length counters is calculated by the processor performing the steps of:
   (i) looking at the orientation of the centerline at the point in question;
   (ii) correcting for any twist of the centerline at the point in question;
   (iii) determining a perpendicular vector;
   (iv) pushing the perpendicular vector out to the radius of the virtual generalized-cylinder so as to determine the location of a point on the outside of the virtual generalized-cylinder;
   (v) calculating the distance from this point to the last point for this longitude and adding this to the total length previously determined in the longitudinal length counter; and
   (vi) repeating steps (iv) and (v) for the remaining longitudinal lengths to be calculated by rotating around the centerlines axis by a number of degrees relative to the number of longitudinal lengths to be calculated.

3. A method according to claim 1 wherein the centerline comprises a set of cubes, and further wherein correcting for any twist of the centerline at the point in question comprises the processor correcting for any twist of the cubes.

4. A method according to claim 3 wherein correcting for any twist of the cubes comprises the processor aligning the cubes so that their faces extend parallel to one another.

5. A method according to claim 1 wherein the device is selected by the physician based upon the maximum measured length.

6. A method, performed by a processor, for measuring a length along a tortuous vessel, comprising:
   creating a virtual representation of the tortuous vessel;
   placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;
   measuring length along the perimeter of the virtual generalized-cylinder at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline; and
   determining, by the processor, at least one of the maximum measured length and the minimum measured length.

7. A method according to claim 6 wherein the amount to be added to the array of longitudinal length counters is calculated by the processor performing the steps of:
   (i) looking at the orientation of the centerline at the point in question;
   (ii) correcting for any twist of the centerline at the point in question;
   (iii) determining a perpendicular vector;
   (iv) pushing the perpendicular vector out to the radius of the virtual generalized-cylinder so as to determine the location of a point on the outside of the virtual generalized-cylinder;
   (v) calculating the distance from this point to the last point for this longitude and adding this to the total length previously determined in the longitudinal length counter; and
   (vi) repeating steps (iv) and (v) for the remaining longitudinal lengths to be calculated by rotating around the centerlines axis by a number of degrees relative to the number of longitudinal lengths to be calculated.

8. A method according to claim 6 wherein the centerline comprises a set of cubes, and further wherein correcting for any twist of the centerline at the point in question comprises the processor correcting for any twist of the cubes.

9. A method according to claim 8 wherein correcting for any twist of the cubes comprises the processor aligning the cubes so that their faces extend parallel to one another.

10. Apparatus for use in measuring a length along a tortuous vessel, comprising:
    a storage medium storing a virtual representation of the tortuous vessel; and
    a processor accessing the virtual representation of the tortuous vessel in the storage medium and executing software components for:
    creating a virtual representation of the tortuous vessel;
    placing a virtual generalized-cylinder within the virtual representation of the tortuous vessel, wherein the virtual generalized-cylinder is placed within the virtual representation of the tortuous vessel by (i) calculating the centerline of the virtual representation of the tortuous vessel, and (ii) generating the virtual generalized-cylinder by defining an extent along the centerline of the virtual representation of the tortuous vessel and constructing the virtual generalized-cylinder about the centerline;

measuring length along the perimeter of the virtual device at a pre-determined number of longitudes, wherein the longitudes extend parallel to the centerline, and further wherein measuring length along the perimeter of the virtual device at a pre-determined number of longitudes comprises marching down the centerline of the virtual generalized-cylinder, incrementally adding to an array of longitudinal length counters as progressing along the centerline; and determining at least one of the maximum measured length and the minimum measured length.

11. Apparatus according to claim 10 wherein the amount to be added to the array of longitudinal length counters is calculated by the processor performing the steps of:
(i) looking at the orientation of the centerline at the point in question;
(ii) correcting for any twist of the centerline at the point in question;
(iii) determining a perpendicular vector;
(iv) pushing the perpendicular vector out to the radius of the virtual generalized-cylinder so as to determine the location of a point on the outside of the virtual generalized-cylinder;
(v) calculating the distance from this point to the last point for this longitude and adding this to the total length previously determined in the longitudinal length counter; and
(vi) repeating steps (iv) and (v) for the remaining longitudinal lengths to be calculated by rotating around the centerlines axis by a number of degrees relative to the number of longitudinal lengths to be calculated.

12. Apparatus according to claim 10 wherein the centerline comprises a set of cubes, and further wherein correcting for any twist of the centerline at the point in question comprises the processor correcting for any twist of the cubes.

13. Apparatus according to claim 12 wherein correcting for any twist of the cubes comprises the processor aligning the cubes so that their faces extend parallel to one another.

* * * * *